United States Patent
Sumida et al.

[11] Patent Number: 5,956,001
[45] Date of Patent: Sep. 21, 1999

[54] IMAGE DISPLAY DEVICE

[75] Inventors: Yukihiro Sumida, Nara; Akiyoshi Fujii, Ikoma-gun; Takashi Shibatani, Tenri; Hiroshi Hamada, Nara; Hiroshi Nakanishi, Sakurai; Kenji Nishiguchi, Osaka, all of Japan

[73] Assignee: Sharp Kabushiki Kaisha, Osaka, Japan

[21] Appl. No.: 08/819,864

[22] Filed: Mar. 14, 1997

[30] Foreign Application Priority Data

Mar. 15, 1996 [JP] Japan .................................... 8-059852
Jan. 20, 1997 [JP] Japan .................................... 9-008109
Jan. 22, 1997 [JP] Japan .................................... 9-009814

[51] Int. Cl.$^6$ ............................................... G09G 3/20
[52] U.S. Cl. .................................................. 345/55
[58] Field of Search .............................. 345/55, 54, 56; 358/92, 63

[56] References Cited

U.S. PATENT DOCUMENTS

| | | | |
|---|---|---|---|
| 4,772,943 | 9/1988 | Nakagawa et al. | 358/92 |
| 4,987,487 | 1/1991 | Ichinose et al. | 358/92 |
| 5,052,783 | 10/1991 | Hamada | 359/40 |
| 5,402,191 | 3/1995 | Dean et al. | 352/63 |
| 5,467,205 | 11/1995 | Kuba et al. | 359/40 |
| 5,552,840 | 9/1996 | Ishii et al. | 348/751 |
| 5,629,798 | 5/1997 | Gaudreau | 359/465 |
| 5,640,273 | 6/1997 | Hamagishi et al. | 359/462 |
| 5,649,897 | 7/1997 | Nakamura et al. | 600/111 |

FOREIGN PATENT DOCUMENTS

| | | |
|---|---|---|
| 62-135810 | 6/1987 | Japan . |
| 4-16092 | 1/1992 | Japan . |
| 58-184929 | 10/1993 | Japan . |
| 6-335030 | 12/1994 | Japan . |

OTHER PUBLICATIONS

Isono et al., "Eight–eye Autostereoscopic Television," NHK Giken R&D No. 38, pp. 51–53, Nov. 1995.

*Primary Examiner*—Mark K. Zimmerman
*Assistant Examiner*—Ronald Laneau
*Attorney, Agent, or Firm*—Dike, Bronstein, Roberts & Cushman; David G. Conlin; George W. Neuner

[57] ABSTRACT

An image display device of the present invention includes: a display element having pixels which are arranged in columns and rows and are grouped into a plurality of right eye pixel groups and a plurality of left eye pixel groups, each of the right eye pixel groups and the left eye pixel groups including at least one pixel; a driver which supplies driving signals to the right eye pixel groups and the left eye pixel groups independently; an optical member for making a polarization state of light exiting from the right eye pixel groups different from a polarization state of light exiting from the left eye pixel groups; and an array of microlenses which is disposed in the vicinity of the optical member, wherein each of the microlenses collimates light exiting from a corresponding one group of the right eye pixel groups and the left eye pixel groups.

20 Claims, 23 Drawing Sheets

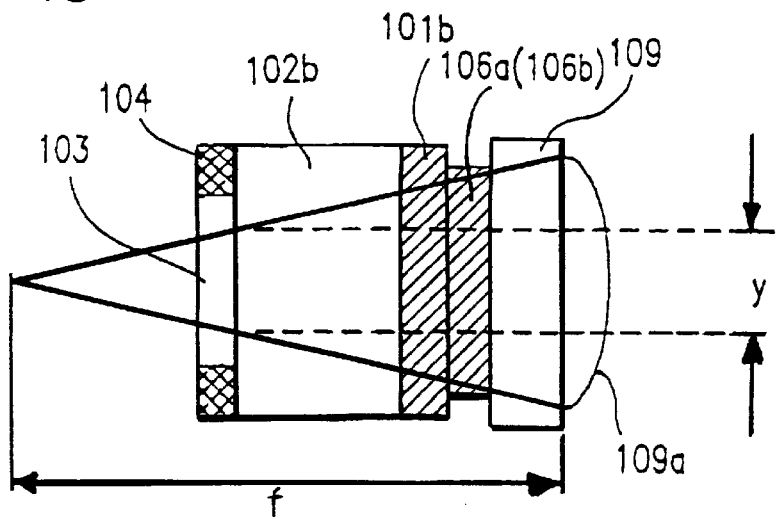
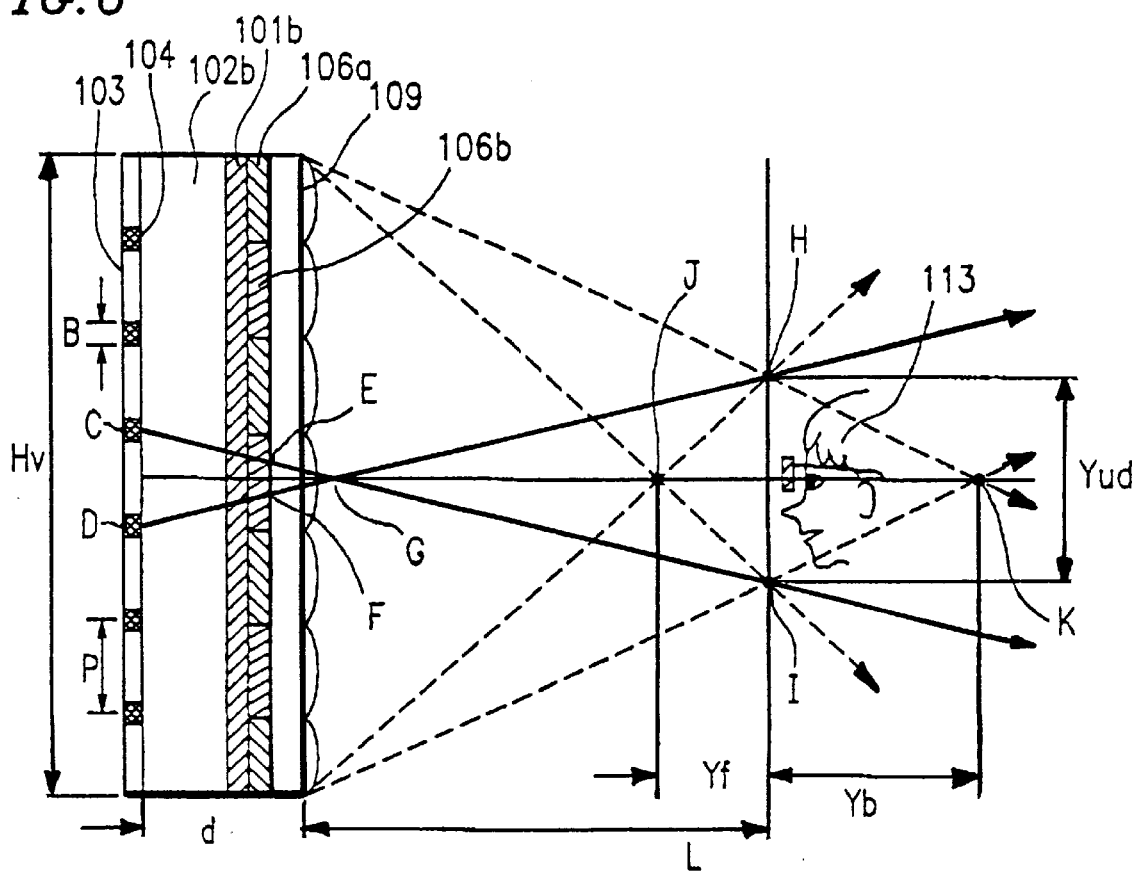

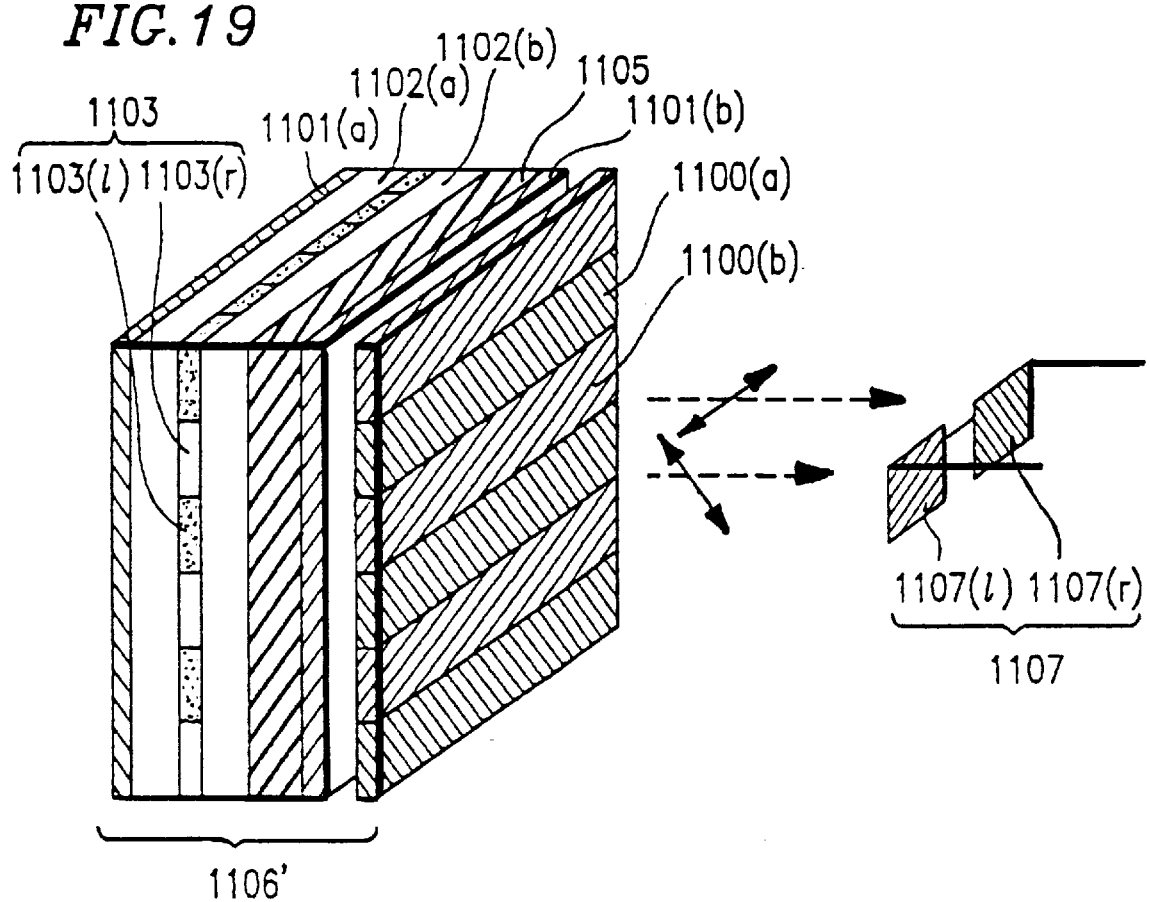

FIG.20A
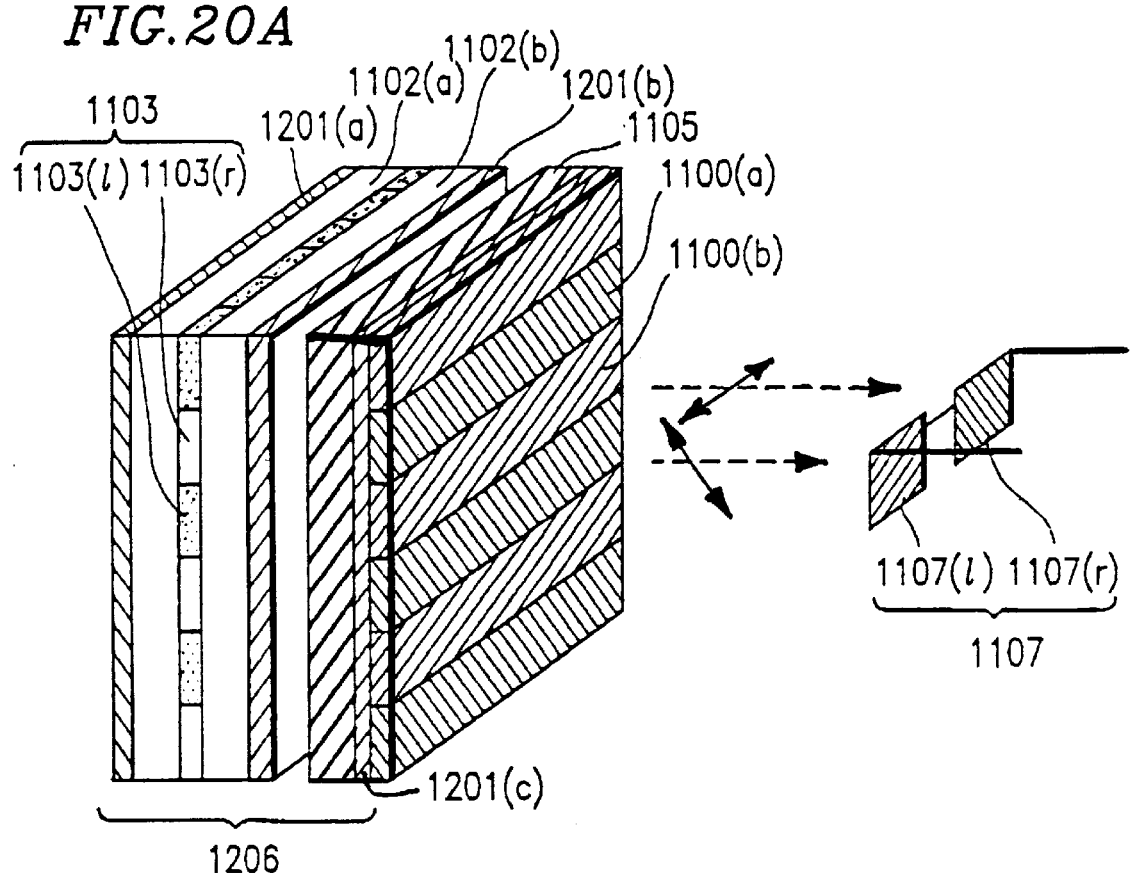
FIG.20B
FIG.20C
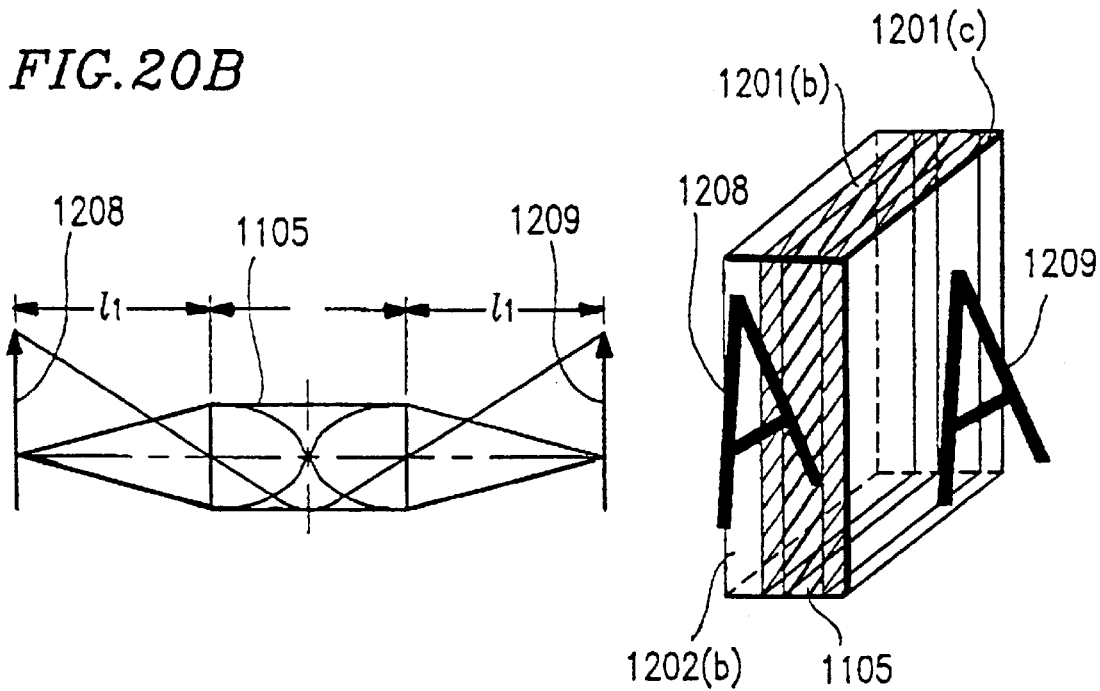

IMAGE DISPLAY DEVICE

BACKGROUND OF THE INVENTION

1. Field of the Invention

The present invention relates to an image display device. In particular, the present invention relates to an image display device capable of displaying three-dimensional images to a viewer wearing polarizing glasses by utilizing the viewer's interocular parallax, and capable of displaying high-resolution two-dimensional images to a viewer not wearing such polarizing glasses, the polarizing glasses being inexpensive and lightweight.

2. Description of the Related Art

There is a relatively long history of attempts at reproducing three-dimensional (3D) or stereoscopic images, which resulted in a vast variety of systems including laser holograms and the like. However, only a few can display 3D motion images in full color at a practically acceptable level. Examples of such systems include methods (1) to (3) described below (all of these systems are based on the principle of separately displaying an image for the right eye and an image for the left eye so as to evoke the illusion of a "depth" of the displayed image to a viewer, the difference in position between the image for the right eye and the image for the left eye being called an "interocular parallax"):

(1) A shutter glass method. A single display device is employed to alternately display an image for the right eye and an image for the left eye on a time-division basis, while a viewer watches the images through special glasses having electrical shutters which alternately open or close in synchronization with the displayed images, thereby displaying a 3D image. This method is applicable to both projection displays and direct-view type displays.

(2) An autostereoscopic method (i.e., a method which does not require the use of any special glasses). Stripes of an image for the right eye and an image for the left eye, displayed on an image display device, are respectively allocated to the right eye and the left eye by means of a lenticular lens plate or a slit plate located in front of the display device. Under this system, a viewer can observe a 3D image without wearing any specially-designed glasses or the like.

(3) A polarizing glasses method. A 3D image is displayed by supplying a linearly-polarized image for the right eye and a linearly-polarized image for the left eye to a viewer wearing polarizing glasses, the directions of polarization of the glasses constituting 90° with respect to each other. In the case of a projection display, this method typically employs two polarizing projectors for superimposing the respective images on each other on a display screen. In the case of a direct-viewing type display, this method employs two display devices, whose displayed images are synthesized by means of a half mirror or a polarizing mirror.

Method (1) described above provides an advantage of requiring only one display device to display a 3D image. However, it has a disadvantage in that the viewer is required to wear special glasses (e.g., liquid crystal shutter glasses) which are capable of electrically shutting or opening the view. Such glasses inevitably become heavy and therefore tend to cause fatigue to the viewer wearing them over a long period of time. Moreover, such glasses are costly. Given that one pair of such glasses is required for each viewer, the total expense for a number of viewers may become very high.

Method (2) provides an advantage in that the viewer can observe a 3D image without wearing any special glasses or the like. However, it is disadvantageous in that the zone within which the viewer is able to observe a 3D image view is very narrow. The reasons for this problem are described below, with reference to FIGS. 23 and 24 (illustrating a case where a lenticular lens plate is employed).

FIG. 23 illustrates a zone Ylr provided by method (2) within which a viewer can observe a proper 3D image (hereinafter, this zone will be referred to as "3D-viewable zone"). The display device shown in FIG. 23 includes a plurality of pixels, i.e., pixels 2001(r) for the right eye and pixels 2001(l) for the left eye, with a black matrix 2002 provided in regions not occupied by the pixels 2001(r) and 2001(l). A lenticular lens plate 2005 is disposed in front of the display device, the lenticular lens plate 2005 including cylindrical lenses 2006 at a pitch corresponding to every two pixels (i.e., one for the right eye and one for the left eye). Thus, the lenticular lens plate 2005 functions to allocate appropriate images for the right eye and the left eye of a viewer 2007.

In FIG. 23, the viewer 2007 can observe a proper 3D image when the left eye thereof is positioned within the range C-D and the right eye thereof is positioned within the range E-F. However, if the viewer's eyes are moved, e.g, so that one eye is positioned in the range D-E, the viewer 2007 can no longer see a 3D image because the eye positioned in the range D-E is in fact seeing a dark portion 2002 (i.e., a portion of the black matrix) present between pixels. Similar failures to produce a 3D image occur while one eye is in the range B-C or the range F-G. Furthermore, when the left eye is positioned in the range E-F and the right eye is positioned in the range G-H, an image in which the component right image and left image are reversed is produced to the viewer, instead of a proper 3D image. Thus, the principle of method (2) has the disadvantage of providing a 3D-viewable zone which is confined within a small distance equal to the interval between the eyes of the viewer 2007.

Furthermore, if the viewer's eyes move farther away from the range where the right and left images are reversed, they will reach areas where they will observe the proper 3D image once again (referred to as a "sub-lobe"). In the autostereoscopic method, such sub-lobes may be utilized to allow a few people to simultaneously enjoy the 3D image, but the 3D-viewable zone provided in each sub-lobe is also very narrow.

Next, the 3D-viewable zone along the front-back direction (i.e., how close to and far away from the image display device the 3D-viewable zone extends) is described with reference to FIG. 24. In FIG. 24, 1, 2, . . . 7, and 8 each denote a light beam exiting a pair of display pixels (right and left) at either side or the central portion of the display device. The 3D-viewable zone, having a front-back dimension and a right-left dimension, is indicated by the hatched portion in FIG. 24. The following is assumed in this exemplary case: the eyes of the viewer 2007 are located at an interval of e; the display device has a horizontal dimension Hh; and the size of the horizontal dimension (i.e., the dimension along the right-left direction) of the 3D-viewable zone is maximized when the display device is viewed at a viewing distance L. Under such conditions, the forward dimension Yf of the 3D-viewable zone (i.e., the distance along which the viewer 2007 can move forward from the position defined by the optimum distance L without losing the 3D image), and the backward dimension Yb of the 3D-viewable zone (i.e., the distance along which the viewer 2007 can move backward from the position defined by the optimum distance L without losing the 3D image) are expressed by equations (1) and (2), respectively, according to the equations described in NHK GIKEN R&D No.38, p.52 (eight-eye autostereoscopic television: ISONO, YASUDA, et al. pp.43–54, NHK GIKEN R&D, No.38, November 1995):

Forward dimension $Yf$ of the 3D-viewable zone $= e \times L/(Hh+2 \times e)$ (1)

Backward dimension $Yb$ of the 3D-viewable zone $= e \times L/Hh$ eq. (2)

For example, the distances Yf and Yb along which the viewer 2007 can move forward or backward from the position defined by the optimum distance L without losing the 3D image are derived to be 67 mm and 109 mm, respectively, under the conditions that a TFT liquid crystal display panel having a diagonal dimension of 10.4 inches (i.e., with a vertical dimension Hv: 156 mm and a horizontal dimension Hh: 208 mm) is used as a display device; the viewer's eyes are located apart by 65 mm; and the display device is viewed at a distance L of 350 mm. If the viewer moves either closer to (i.e., forward) or away from (i.e., backward) the above-defined zone, the 3D image will be lost from the sight of the viewer 2007.

There is also a problem in that the 3D images provided in sub-lobes have poor image quality. In fact, Japanese Laid-Open Publication No.4-16092 discloses a method for eliminating sub-lobes by using light shielding plates, in order to solve this problem.

FIG. 25 schematically illustrates the concept of the method disclosed in the Laid-Open Publication No.4-16092. As shown in FIG. 25, this method employs a light shielding plate 2013 for restricting the viewing angle along the horizontal direction of the display screen, the light shielding plate 2013 being located in front of a lenticular lens plate 2012 having cylindrical lenses that are disposed at a predetermined period along the horizontal direction of the display screen. Each cylindrical lens extends in parallel to the vertical direction of the display screen. The light shielding plate 2013 includes a plurality of light shielding layers 2014 each extending along the vertical direction of the display screen for shielding any portion of light other than that from each appropriate pair of right and left pixels, thereby eliminating the above-mentioned sub-lobes. Thus, this method achieves 3D viewing only in the main lobe, which provides high image quality. However, this method limits the viewing of the 3D image in the range within the main lobe, and therefore the 3D viewable zone is not expanded.

Japanese Laid-Open Publication No.6-335030 discloses a 3D image display device including a masking means located between a lenticular lens plate and the display device so as to correspond to the light-intercepting portions (i.e., black stripes) of the display device, the masking means being capable of altering optical paths. As shown in the schematic conceptual diagram in FIG. 26, a diffusion plate 2026 serves as the masking means, having a plurality of diffusion layers 2022 and a plurality of masking layers present between the diffusion layers 2022. The diffusion plate 2026 is arranged so that the masking layers are located in front of non-displaying region 2025 (i.e., black stripes) present between each pixel for the right eye and each pixel for the left eye, so as to block portions of light from the non-displaying portions and to diffuse portions of light from the openings (pixels). Thus, this method substantially prevents black belts from being generated in the eight of the viewer. However, this method, while preventing the generation of black belts, does not expand the 3D-viewable zone because the diffused light makes a larger region susceptible to crosstalk.

Finally, method (3) allows a viewer to observe a 3D image without flickering problems by wearing polarizing glasses, which generally are very cheap and lightweight. However, this method requires two display devices or projector devices for simultaneously providing two images having different axes of polarization, inevitably resulting in high cost and therefore being unsuitable for home-oriented use.

A variant of method (3) intended to solve the above-mentioned problem is disclosed in Japanese Laid-Open Publication No.58-184929. According to this method, a mosaic pattern of polarizing layers such that the axes of polarization of adjoining layers extend perpendicularly to each other is placed in close contact on the front face of a single display device, with the viewer wearing polarizing glasses to observe a 3D image. As shown in FIG. 27, this method employs polarizing plates 2034a and 2034b having axes of polarization extending perpendicularly to each other, the polarizing plates 2034a and 2034b being disposed in front of the display surface of a CRT (cathode ray tube) having pixels 2031(r) for the right eye and pixels 2031(l) for the left eye. The viewer can observe a stereoscopic image by viewing the images displayed on the CRT through polarizing glasses 2035 with a right lens and a left lens having respectively appropriate axes of polarization.

Furthermore, Japanese Laid-Open Publication No.62-135810 discloses a system capable of producing a 3D image by employing a single display device along with polarizing layers including portions with different axes of polarization provided on the inside of a glass substrate of the liquid crystal display device. As shown in the schematic conceptual diagram in FIG. 28, the liquid crystal display device includes a pair of glass substrates 2041a and 2041b and a liquid crystal layer 2045 sealed therebetween. Wiring layers 2043a and 2043b for applying an electric field to the liquid crystal layer 2045 and alignment films 2044a and 2044b for aligning the liquid crystal molecules within the liquid crystal layer 2045 are provided on the glass substrates 2041a and 2041b. As seen from FIG. 28, the polarizing layers 2042a and 2042b having portions with different axes of polarization are provided between the wiring layer 2043a and the glass substrate 2041a, and between the wiring layer 2043b and the glass substrate 2041b, respectively.

As described above, the autostereoscopic method described in (2) above has a problem in that the 3D-viewable zone is restricted in its horizontal (i.e., right-left) width, as well as in its depth (i.e., front-back width).

The image display devices disclosed in Japanese Laid-Open Publication No.4-16092 and Japanese Laid-open Publication No.6-335030 can display a 3D image in the main lobe alone, thereby providing high image quality, or display a 3D image while reducing the occurrence of black belts due to the non-displaying portions. However, both of these devices employ a lenticular lens plate as a means for allocating images for the right eye and the left eye. Since a lenticular lens plate includes cylindrical lenses disposed so that each cylindrical lens corresponds to two pixels (i.e., one for the right eye and one for the left eye) arranged along the horizontal direction on the display screen. Therefore, in the case where a two-dimensional (2D) image is displayed by these image display devices to a viewer, the horizontal resolution of such a 2D image is ½ of the actual horizontal resolution that is inherent to the display device. Moreover, the horizontally alternate arrangement of the pixels for the right eye and the pixels for the left eye requires an accurately-timed alternate switching, e.g., at a period of (1 horizontal period)/(number of pixels along the horizontal direction), between the signals (i.e., one for the right eye and one for the left eye) which are supplied for the display device. This inevitably complicates the driving circuitry of the display device. Furthermore, eliminating sub-lobes as does the device disclosed in Japanese Laid-Open Publication No.4-16092 increases the difficulty for a large number of viewers to simultaneously observe a 3D image.

On the other hand, the stereoscopic image display device in accordance with method (3) (shown in FIG. 27) has the following disadvantages. As shown in FIG. 27, a glass substrate (face plate) 2033 is present between the pixels 2031(r) for the right eye and the polarizing plate 2034a for the right eye, and between the pixels 2031(l) for the left eye and the polarizing plate 2034b for the left eye. Therefore, a proper 3D image can be observed by a viewer situated orthogonally to the displayed image on the CRT. However, if the positions of the viewer's eyes shift along the vertical direction, the image for the right eye and the image for the left eye may reach the wrong eyes (such a phenomenon is referred to as "crosstalk"), so that a proper 3D image can no longer be obtained.

The "crosstalk" phenomenon in the above case is further described with reference to FIG. 29. FIG. 29 illustrates a 3D-viewable zone provide by a stereoscopic image display device of the structure shown in FIG. 27.

The 3D-viewable zone Yud which allows for the viewer's movement along the vertical direction without losing the proper 3D image can be expressed by the following equation (3):

$$Yud = B \times L / d \qquad \text{eq. (3)}$$

where P denotes the pitch of the display pixels 2031; B denotes the width of the non-displaying portions (black stripes) 2032; L denotes the distance between the display element and a viewer 2037; and d denotes an adjusted thickness of the transparent substrate for a vacuum which is calculated from the refractive index and the actual thickness thereof.

As shown in FIG. 29, the viewer 2037 is free to move between J and K without losing the proper 3D image. Therefore, the front-back dimensions of the 3D-viewable zone can be expressed by the following equations (4) and (5):

$$Yf = Yud \times L / (Hv + Yud) \qquad \text{eq. (4)}$$

$$Yb = Yud \times L / (Hv - Yud) \qquad \text{eq. (5)}$$

where Yf denotes the distance along which the viewer 2037 is allowed to move forward from a position defined by the optimum observation distance L without losing the proper 3D image; Yb deiotes the distance along which the viewer 2037 is allowed to move backward from the position defined by the optimum observation distance L without losing the proper 3D image; Hv denotes the vertical (i.e., along the direction parallel to the signal lines) dimension of the display element.

In eq. (5), Yb takes a negative value when Yud≧Hv, indicating that there is no limit to the backward dimension of the 3D-viewable zone.

For example, a case is considered where a TFT liquid crystal display panel having a diagonal dimension of 10.4 inches (i.e., with a vertical dimension Hv: 156 mm and a horizontal dimension Rh: 208 mm), a pixel pitch P of 0.33 mm, and black stripes with a width B of 0.03 mm is used as a display device. If a counter glass substrate 2033 of the liquid crystal panel has a thickness d1 of 1.1 mm and a refractive index n of 1.52, the counter glass substrate 2033 has an adjusted thickness of 0.72 mm (an actual thickness of 1.1 mm). Therefore, if the display device is designed so that the distance L from the display device to the viewer is 350 mm, the 3D-viewable zone Yud along the vertical direction is derived to be 14.5 mm according to eq.(3). In other words, along the vertical direction, the viewer can only move by about 7 mm up or about 7 mm down from the center of the display screen without allowing crosstalk to occur. Moreover, according to eq.(4) and eq.(5), the 3D-viewable zone along the front-back direction has the following dimensions: Yf=29.9 mm and Yb=36 mm. If the viewer moves either closer to (i.e., forward) or away from (i.e., backward) the above-defined zone, the 3D image is lost.

On the other hand,. as mentioned above, Japanese Laid-Open Publication No.62-135810 discloses providing a polarizing plate having portions with different polarization axes on the inside of a liquid crystal display panel in order to prevent crosstalk between the image for the right eye and the image for the left eye. However, this publication does not disclose any specific methods for producing such a device.

Moreover, in order to eliminate the crosstalk phenomenon when viewing a 3D image as described in this publication, it is necessary to place a polarizing plate on the inside of each one of the pair of substrates (i.e., a TFT substrate and a counter substrate) of the liquid crystal display panel, each polarizing plate having portions with different polarization axes. However, display modes which are currently adopted for commercial products, i.e., the TN mode and the GH mode, require an alignment film (for aligning liquid crystal molecules) to be disposed on the polarizing plate, thereby introducing the following problem:

In general, alignment films used in liquid crystal display panels of the TN mode or the GH mode are obtained by forming a thin film of an organic polymeric material precursor (e.g., polyimide) by spincoating followed by annealing at about 180° to about 250° for imidizing the thin film, or alternatively depositing an inorganic material such as $SiO_2$ at about 200°. Therefore, in either case, the polarizing plates will be exposed to a high temperature during the formation of the alignment films.

However, iodine or dye type polarizing plates composed essentially of an organic polymer material, e.g., polyvinyl alcohol (PVA), polarizing plates are not heat-resistant, and therefore may lose the orientation order of the molecules of iodine or a dye, thereby resulting in insufficient polarizing ability. Hence, it is presumable that when the 3D image display device disclosed in Japanese Laid-Open Publication No.62-135810 is implemented by utilizing the technique commonly employed in the art at present, the polarizing ability of the polarizing plate may deteriorate, thereby resulting in a low display quality.

Similarly, when employing an active matrix type liquid crystal display panel (AM-LCD) including thin film transistors (hereinafter referred to as "TFTs") formed thereon, the polarizing plate will be exposed to a high temperature such as about several hundred degrees centigrade during the process of forming the TFTS. Hence, for the above-described reasons, it is impractical to form polarizing plates composed of commercially available materials for forming polarizing plates before the TFTs are formed.

SUMMARY OF THE INVENTION

According to one aspect of the present invention, an image display device includes: a display element having a plurality of pixels arranged in columns and rows, the pixels being grouped into a plurality of right eye pixel groups and a plurality of left eye pixel groups, each of the right eye pixel groups and the left eye pixel groups including at least one pixel; a driver which supplies driving signals to the right eye pixel groups and the left eye pixel groups independently; an optical member for making a polarization state of light exiting from the right eye pixel groups different from a polarization state of light exiting from the left eye pixel groups; and an array of microlenses which is disposed in the vicinity of the optical member, wherein each of the microlenses collimates light exiting from a corresponding one group of the right eye pixel groups and the left eye pixel groups.

In one embodiment of the invention, each group of the right eye pixel groups and the left eye pixel groups includes one column of pixels; the right eye pixel groups and the left eye pixel groups are disposed alternately in a row direction which is parallel to the rows of pixels; and the array of microlenses is a lenticular lens plate having a plurality of cylindrical lenses which extend along the columns of pixels and are arranged in the row direction so that the cylindrical lenses are aligned with the columns of pixels, respectively.

In another embodiment of the invention, each group of the right eye pixel groups and the left eye pixel groups comprises one row of pixels; the right eye pixel groups and the left eye pixel groups are disposed alternately in a column direction which is parallel to the columns of pixels; and the array of microlenses is a lenticular lens plate having a plurality of cylindrical lenses which extend along the rows of pixels and are arranged in the column direction so that the cylindrical lenses are aligned with the columns of pixels, respectively.

In still another embodiment of the invention, the focal length of the array of microlenses is larger than the distance between the display element and the array of microlenses.

In still another embodiment of the invention, the array of microlenses has a pitch P1 satisfying the following relationship:

$$P1 = P \times L/(L+d)$$

where d represents a distance, as adjusted for a vacuum, between a plane on which the pixels of the display element are disposed and a plane on which the array of microlenses is disposed; L represents a distance between the plane on which the array of microlenses is disposed and a viewer; and P represents a pitch of the pixels of the display element.

According another aspect of the invention, an image display device includes: a display element having a plurality of pixels arranged in columns and rows, the pixels being grouped into a plurality of right eye pixel groups and a plurality of left eye pixel groups, each of the right eye pixel groups and the left eye pixel groups including at least one pixel; a driver which supplies driving signals to the right eye pixel groups and left eye pixel groups independently; an optical member for making a polarization state of light exiting from the right eye pixel groups different from a polarization state of light exiting from the left eye pixel groups; and an angular restriction means for limiting an outgoing angle of each group of the right eye pixel groups and the left eye pixel groups.

In one embodiment of the invention, the angular restriction member is a light shielding plate having a plurality of light shielding layers. Each group of the right eye pixel groups and the left eye pixel groups may include one column of pixels, and the right eye pixel groups and the left eye pixel groups may be disposed alternately in a row direction which is parallel to the rows of pixels. In this case, the light shielding layers extend along the columns of pixels and are arranged in the row direction so as to be aligned with the columns of pixels, respectively.

Alternatively, each group of the right eye pixel groups and the left eye pixel groups may include one row of pixels, and the right eye pixel groups and the left eye pixel groups may be disposed alternately in a column direction which is parallel to the columns of pixels. In this case, the light shielding layers extend along the rows of pixels and are arranged in the column direction so as to be aligned with the rows of pixels, respectively.

Preferably, the light shielding plate may have a pitch P1 of the light shielding layers satisfying the following relationship:

$$P1 = P \times L/(L+d)$$

where d represents a distance, as adjusted for a vacuum, between a plane on which the pixels of the display element are disposed and a plane on which the light shielding plate is disposed; L represents the distance between the plane on which the light shielding plate is disposed and a viewer; and P represents the pitch of the pixels of the display element.

In another embodiment of the invention, the angular restriction member is a slitted plate having a plurality of openings. Each group of the right eye pixel groups and the left eye pixel groups may include one column of pixels, and the right eye pixel groups and the left eye pixel groups may be disposed alternately in a row direction which is parallel to the rows of pixels. In this case, the openings extend along the columns of pixels and are arranged in the row direction so as to be aligned with the columns of pixels, respectively.

Alternatively, each group of the right eye pixel groups and the left eye pixel groups may include one row of pixels, and the right eye pixel groups and the left eye pixel groups may be disposed alternately in a column direction which is parallel to the columns of pixels. In this case, the openings extend along the rows of pixels and are arranged in the column direction so as to be aligned with the rows of pixels, respectively.

Preferably, the slitted plate may have a pitch P1 of the openings satisfying the following relationship:

$$P1 = P \times L/(L+d)$$

where d represents a distance, as adjusted for a vacuum, between a plane on which the pixels of the display element are disposed and a plane on which the slitted plate is disposed; L represents the distance between the plane on which the slitted plate is disposed and a viewer; and P represents the pitch of the pixels of the display element.

In any one of the above-described image display devices, a field lens may be further provided for converging a light ray parallel to an optical axis of light exiting from the display element.

In any one of the above-described image display devices, the optical member may include: a first phase plate for providing light exiting from the right eye pixel groups with a first polarization state; a second phase plate for providing light exiting form the left eye pixel groups with a second polarization state which is different from the first polarization state; and a polarizing plate disposed in the vicinity of the first phase plate and the second phase plate.

According to still another aspect of the invention, an image display device includes: a display element having a plurality of pixels arranged in columns and rows, the pixels being grouped into a plurality of right eye pixel groups and a plurality of left eye pixel groups, each of the right eye pixel groups and the left eye pixel groups including at least one pixel; a driver which supplies driving signals to the right eye pixel groups and left eye pixel groups independently; a first optical member for forming a non-reversed image of a displayed image displayed by each of the pixels, the non-reversed image having the same size as that of the displayed image; and a second optical member for making a polarization state of light exiting from the right eye pixel groups different from a polarization state of light exiting from the left eye pixel groups, wherein the second optical member is disposed in the vicinity of a region where the non-reversed image is formed by the first optical member.

The first optical member may be an array of graded index lenses. Alternatively, the first optical member may be a fiber plate disposed on a light exiting side of the display element. In this case, the second optical member is disposed in the vicinity of a light exiting surface of the fiber plate. Moreover, it is preferable that the light exiting surface of the fiber plate is a scattering surface.

In one embodiment of the invention, the image display device further includes at least one polarizing plate having a polarization axis which is the same over the entire surface of the polarizing plate, the polarizing plate being disposed in the vicinity of the first optical member.

In another embodiment of the invention, the second optical member is a patterned phase plate including first phase regions and second phase regions which correspond to the right eye pixel groups and the left eye pixel groups, respectively, thereby the light exiting from the right eye pixel groups and the light exiting from the left eye pixel groups have polarizations perpendicular to each other.

In still another embodiment of the invention, the second optical member has a scattering surface.

Thus, the invention described herein makes possible the advantage of providing an image display device with polarizing plates disposed externally to the display device, such that the display device is capable of providing a 3D image to multiple viewers without reducing the 3D-viewable zone.

This and other advantages of the present invention will become apparent to those skilled in the art upon reading and understanding the following detailed description with reference to the accompanying figures.

BRIEF DESCRIPTION OF THE DRAWINGS

FIG. 5 is a diagram illustrating the focal length and the action of each cylindrical lens of the lenticular lens plate according to Example 1 of the invention.

FIG. 6 is a diagram illustrating the 3D-viewable zone according to Example 1 of the invention.

FIG. 19 is a cross-sectional view illustrating one variant of the image display device according to Example 7 of the present invention.

FIG. 20A is a cross-sectional view illustrating an image display device according to Example 8 of the present invention.

FIG. 20B is a diagram illustrating a graded index lens employed in Example 8 of the present invention.

FIG. 20C is a diagram illustrating a non-reserved image bearing the same rate of magnification as the original image.

DESCRIPTION OF THE PREFERRED EMBODIMENTS

Hereinafter, the present invention will be described by way of examples, with reference to the accompanying figures.

EXAMPLE 1

Figure 1:
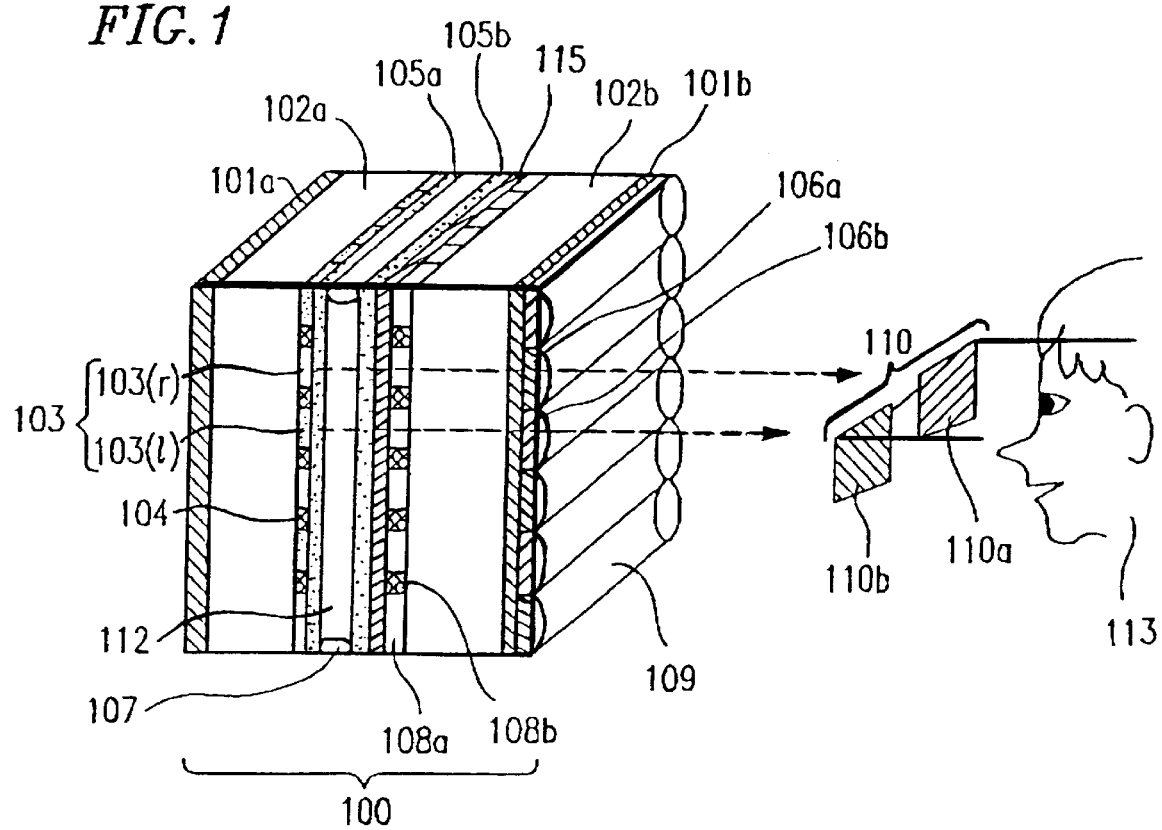
FIG. 1 is a cross-sectional view illustrating an image display device according to Example 1 of the present invention.

FIG. 1 is a cross-sectional view showing an image display device according to Example 1 of the present invention.

First, the structure of a liquid crystal display panel employed as a display element in the display device 100 and a method for producing the same are described with reference to FIG. 1. Scanning lines (not shown), signal lines (not shown), pixel electrodes (not shown), and TFTs 104 are formed on a glass substrate 102a. One pixel electrode is provided for each one of pixels 103 arranged in a matrix shape. The scanning lines are provided along the horizontal direction of the display element (i.e., the liquid crystal display panel) of the image display device 100 so that each scanning line corresponds to one row of pixels 103. The signal lines are provided so as to orthogonally intersect the scanning lines, each signal line corresponding to one column of pixels 103. The scanning lines, the signal lines, and the pixel electrodes are interconnected with one another via the TFTs 104. The scanning lines, the signal lines, the TFTs 104 and the pixel electrodes can be formed by any suitable method. Herein, the direction parallel to the scanning lines is referred to as the "row direction" or the "horizontal direction", whereas the direction parallel to the signal lines is referred to as the "column direction" or the "vertical direction".

The pixels 103 arranged in a matrix shape are grouped into pixels 103(r) for the right eye and pixels 103(l) for the left eye. The groups of pixels 103(r) for the right eye and the groups of pixels 103(l) for the left eye are disposed so as to alternately correspond to each scanning line.

An alignment film 105a is formed over the entire surface of the glass substrate 102a having the TFTs 104 formed thereon. The alignment film 105a can be formed by applying an organic polymeric material precursor (e.g., polyimide) over the entire surface of the glass substrate 102a by e.g., spincoating, followed by annealing. Thus, the TFT substrate of the liquid crystal display panel is obtained.

On a counter glass substrate 102b (opposing the TFT substrate), a color filter 108a, and a black matrix 108b for intercepting the light entering the TFTs 104 formed on the glass substrate 102a are formed. The color filter 108a and the black matrix 108b can be formed by any suitable method. In the present example, the color filter 108a is formed in such a manner that the filtering portions of R, G, and B of the color filter 108a define stripes parallel to the signal lines and that the stripes R, G, and B are arranged periodically along the scanning line (or along the "row direction"). The black matrix 108b is formed in a lattice shape with each mesh surrounding each pixel. Then, a transparent conductive film of e.g., ITO (indium tin oxide) is formed over the entire surface of the glass substrate 102b by e.g., sputtering, the transparent conductive film defining transparent electrodes 115, whereupon an alignment film 105b is further formed in a manner similar to forming the alignment film 105a. Thus, the counter substrate is obtained.

The TFT substrate and the counter substrate, having been obtained as described above, are each subjected to a rubbing treatment. Thereafter, the substrates are attached to each other with spacers 107 interposed therebetween to secure a predetermined interspace between the substrates. Then, liquid crystal material is vacuum-injected into the interspace between the substrates to form a liquid crystal layer 112. Thus, the liquid crystal display panel is completed. In the present Example, the liquid crystal display panel is of the TN liquid crystal display mode.

A polarizing plate 101b having the same polarization axis over the entire surface is provided adjoining the glass substrate 102b of the liquid crystal display panel thus obtained. Then, stripe-shaped phase plates 106a and 106b are provided on the polarizing plate 101b so as to alternately correspond to every scanning line. In other words, the phase plates 106a and 106b are alternately provided for each row of pixels so that each phase plate 106a or 106b has a width corresponding to a row of pixels along the horizontal direction. The slow axis of the phase plate 106a is shifted by 45° with respect to the polarization axis of the polarizing plate 101b. The slow axis of the phase plate 106b is shifted by 45° with respect to the polarization axis of the polarizing plate 101b but in a counter direction with respect to the slow axis of the phase plate 106a.

In the present example, quarter-wave plates are used as the phase plates 106a and 106b. As a result, the light exiting the liquid crystal display panel as the display element and passing through the phase plates 106a S and 106b is converted into circularly-polarized light such that the direction of polarization alternates by 90° for every row of pixels. A viewer 113 can view a 3D image by wearing circular-polarizing glasses 110 having polarizing plates 110a and 110b corresponding to the respective directions of circular polarization, even if the viewer's face is tilted in one way or another.

Next, the principle of the function of the phase plates 106a and 106b is described with reference to FIG. 2.

In general, a phase plate is composed of a birefringent film obtained by drawing an organic polymer material along one axis, and is used for providing light transmitted therethrough with a phase difference. The direction parallel to the direction of the uniaxial draw applied to the phase plate is referred to as the "slow axis" or "fast axis", depending on the kind of material.

Figure 2:
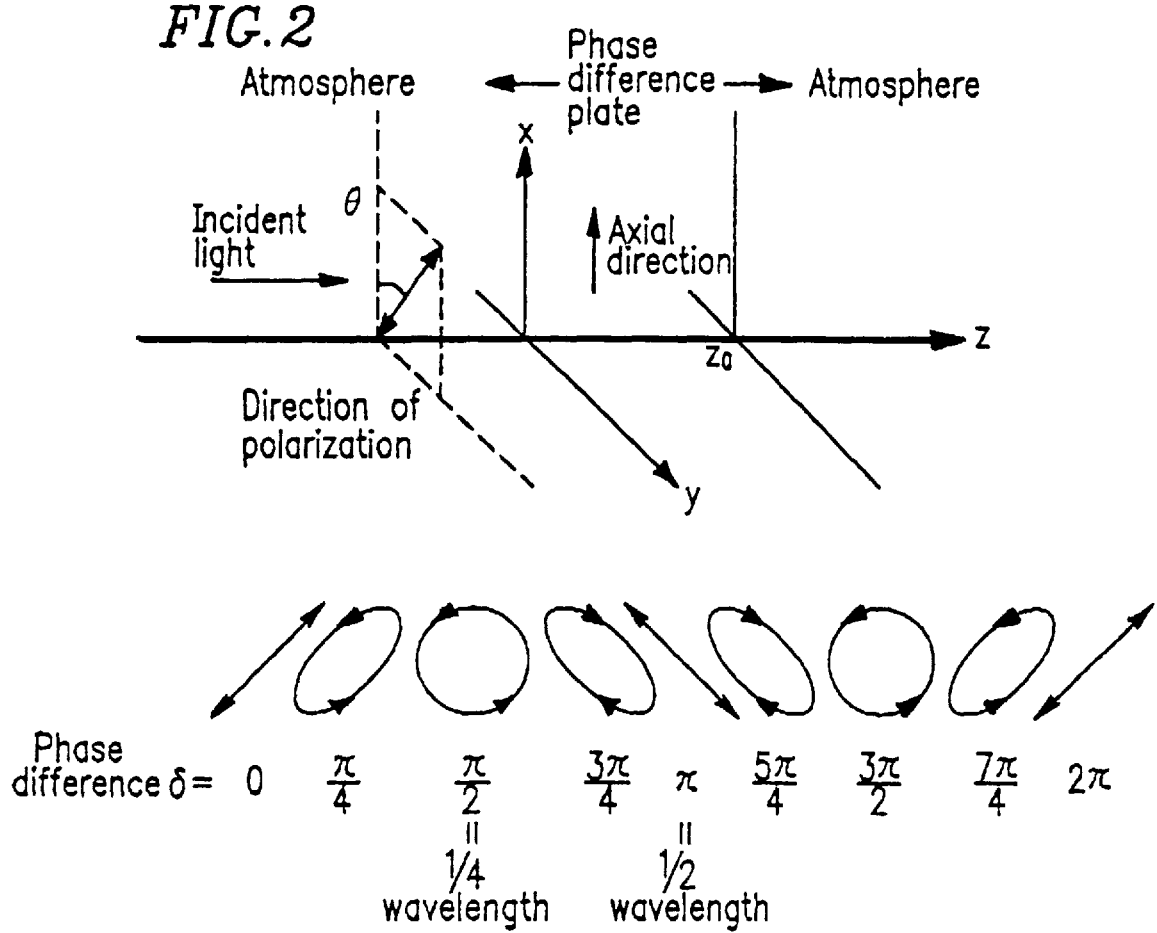
FIG. 2 is a diagram illustrating the action of a phase plate.

The change in the polarization state of linearly-polarized light entering at an angle of θ with respect to the direction (hereinafter referred to as the "axial direction") of the uniaxial draw applied to the phase plate as shown in FIG. 2 is described.

First, electric field components of the incident linearly-polarized light are separated into a component parallel to the axial direction of the phase plate and a component perpendicular to the axial direction of the phase plate. Within the phase plate, velocity components $v_\perp$ and $v_{//}$, which are respectively perpendicular to and parallel to the axial direction of the phase plate, are represented as $v_\perp=c/n_\perp$, $v_{//}=c/n_{//}$, respectively. Herein, $n_{//}$ represents the refractive index along the axial direction; $n_\perp$ represents the refractive index along the direction perpendicular to the axial direction (where $n_{//}>n_\perp$), and c represents the velocity of light in a vacuum space.

Therefore, with respect to the velocity of light along the z direction in FIG. 2, its electric field component parallel to the slow axis of the phase plate becomes smaller than its electric field component along the direction perpendicular to the slow axis of the phase plate. As a result, the change in the intensity of the electric field along the x direction occurs differently from along the y direction shown in FIG. 2. Thus, the incident linearly-polarized light is converted into circularly-polarized light or elliptically-polarized light.

For example, in the case where the phase plate has a phase difference of ¼ wavelength, if light which is linearly-polarized in a direction at an angle θ of 45° with respect to the axial direction enters the phase plate, the light exiting the phase plate is circularly-polarized in the counterclockwise direction. If light which is linearly-polarized in a direction at an angle θ of −45° with respect to the axial direction enters the phase plate, the light exiting the phase plate is circularly-polarized in the clockwise direction (i.e., in the opposite direction from the above-mentioned circularly-polarized light obtained in the case where θ=45°). In the case where the phase plate has a phase difference of ½ wavelength, the light exiting the phase plate is linearly-polarized in a direction at an angle of 2θ with respect to the direction of polarization of the incident linearly-polarized light. In the case where the phase plate has a phase difference between ¼ wavelength and ½ wavelength, incident linearly-polarized light is converted into elliptically-polarized light.

Herein, light which is circularly-polarized in the counterclockwise direction and light which is circularly-polarized in the clockwise direction are referred to as being "perpendicularly polarized" with respect to each other. Similarly, light which is linearly-polarized in a first direction can be "perpendicularly polarized" with other light which is linearly-polarized in a second direction perpendicular to the first direction. Similarly, if a polarization plane of light which is elliptically-polarized in the clockwise direction is perpendicular to a polarization plane of other light which is elliptically-polarized in the counterclockwise direction, they are "perpendicularly polarized" with respect to each other.

Although the axis of polarization of the polarizing plate 101b is shifted by 45° with respect to the slow axes of the phase plates 106a and 106b in the present example, the shift angle does not need to be accurately 45° but can be within the range of 45°+10°.

Next, a lenticular lens plate 109 is provided in front of the phase plates 106a and 106b (which are disposed in stripes) in such a manner that each cylindrical lens thereof corresponds to one stripe of the phase plate 106a or 106b. Accordingly, each cylindrical lens extends in parallel to the horizontal direction of the display screen (i.e., in parallel to the scanning lines), corresponding to each row of pixels.

On the other hand, a polarizing plate 101a having the same polarization axis over the entire surface is disposed adjacent to the TFT substrate 102a so that the polarization axis of the polarizing plate 101a lies perpendicular to the axis of polarization of the polarizing plate 101b. Thus, the image display device 100 according to the present example is completed.

Figure 3:
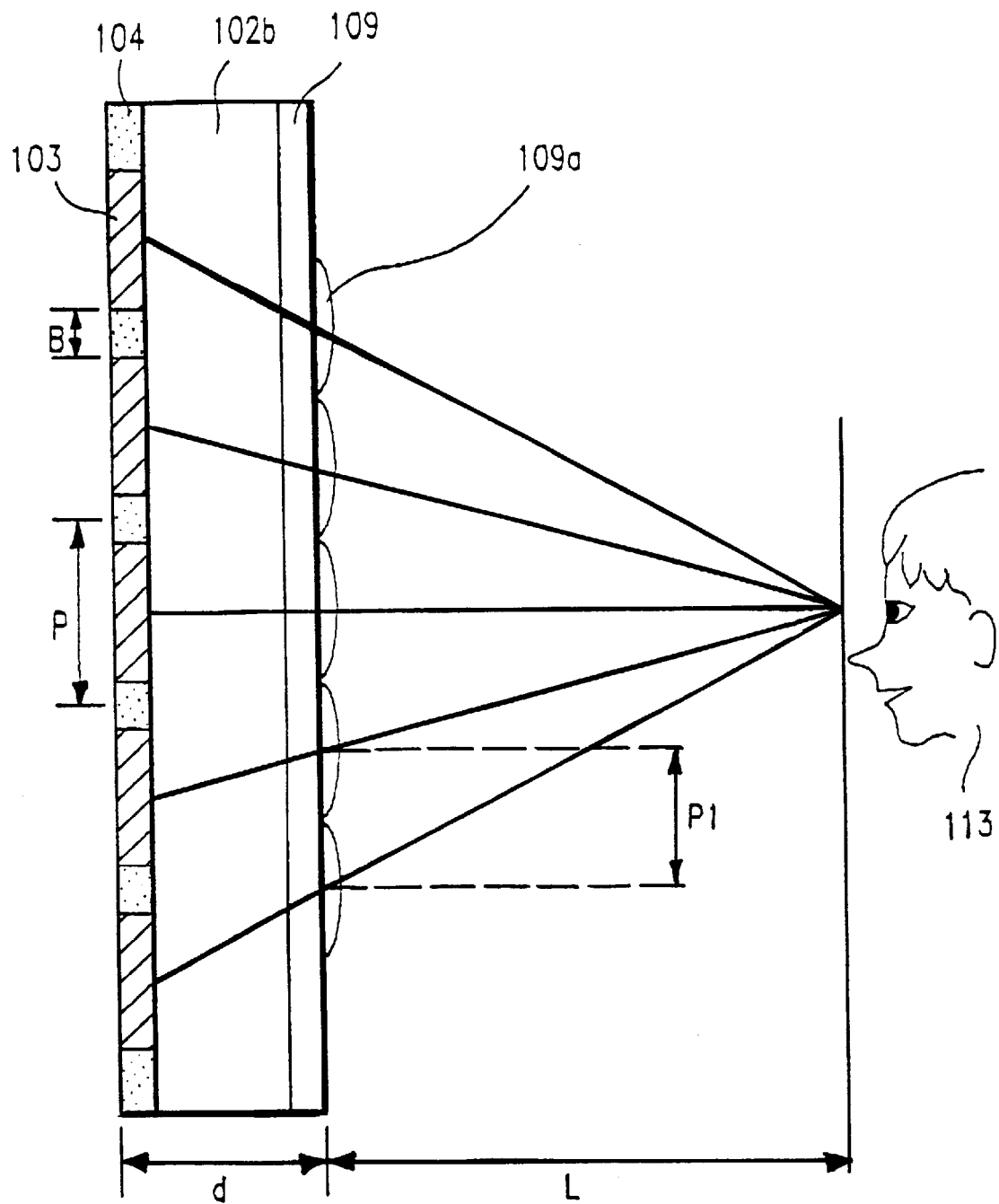
FIG. 3 is a diagram illustrating a pitch correction according to Example 1 of the invention.

In the present example, as shown in FIG. 3, the pitch P1 of the cylindrical lens 109a of the lenticular lens plate 109 is prescribed so as to prevent the occurrence of moire fringes due to the parallax between the pixels 103 and the cylindrical lens 109a.

More specifically, the pitch P1 of the cylindrical lens 109a is prescribed so as to satisfy the following equation (6):

$$P1 = PL/(d+L) \qquad \text{eq. (6)}$$

where P represents the pitch of the pixels 103 of the display element employed in the image display device 100; d represents the distance between the plane on which the pixels 103 are formed and the plane on which the cylindrical lenses 109a are formed, which is an adjusted distance for a vacuum space calculated from the actual distance in air: L represents the distance between the plane on which the cylindrical lenses 109a are formed and the viewer.

In the present example, the pitch P of the pixels 103 of the liquid crystal display panel employed as the display element of the display device 100 is 0.33 mm; the distance L between the plane on which the cylindrical lenses 109a are formed and the viewer is 350 mm; the actual thickness of the counter substrate 102b is 1.1 mm; the refractive index n of the counter substrate 102b is 1.52 (that is, the converted distance d between the plane on which the pixels 103 are formed and the plane on which the cylindrical lenses 109a are formed is 0.72 mm). Thus, the pitch P1 of the cylindrical lens 109a is prescribed to be 0.329 mm in accordance with eq.(6).

Figure 4:
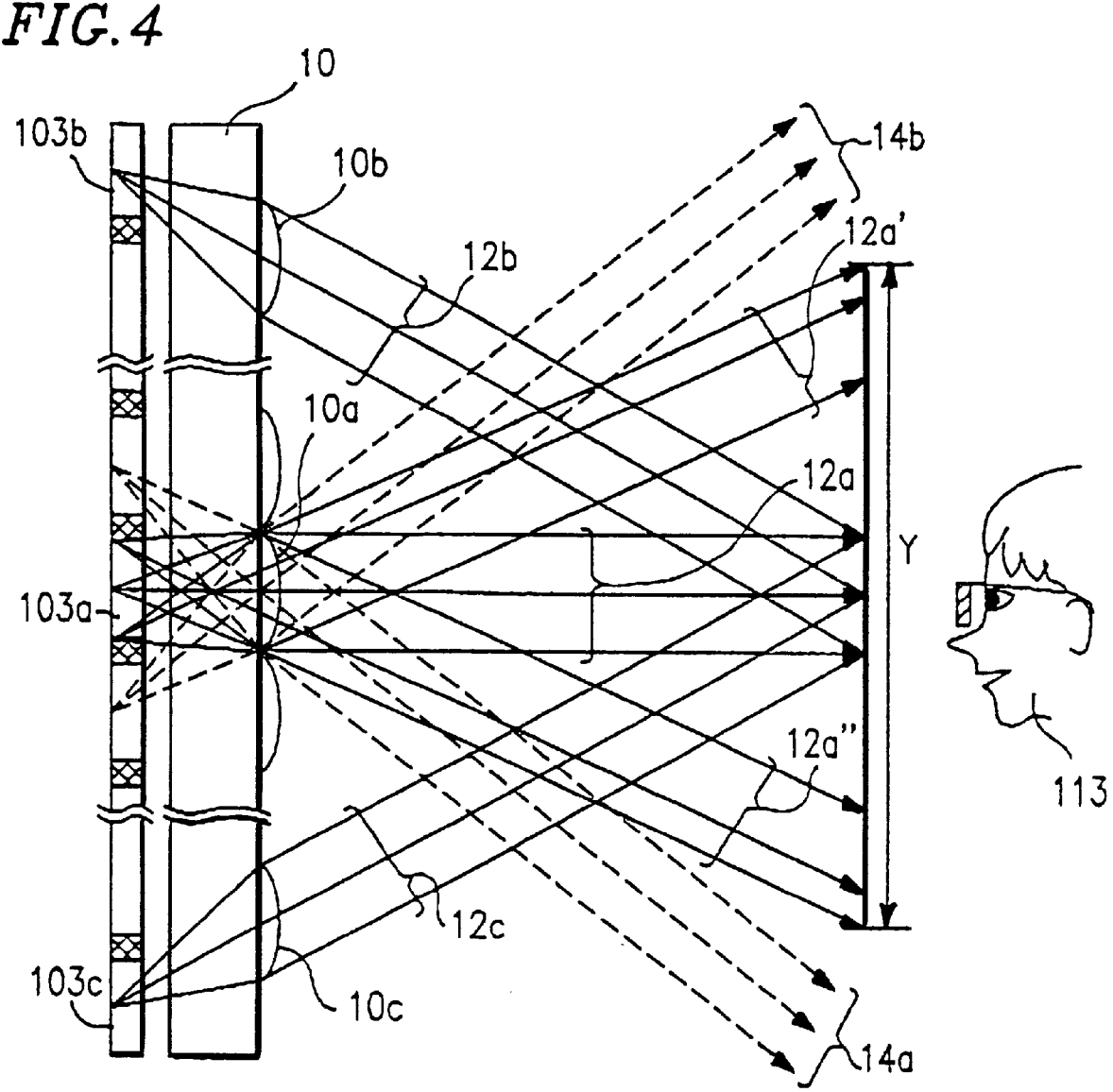
FIG. 4 is a diagram illustrating the action of a lenticular lens plate.

Next, the action of a lenticular lens plate 10 (which is identical with the lenticular lens plate 109 shown in FIGS. 1 and 3) is described with reference to FIG. 4. In FIG. 4, a pixel 103a disposed in the central portion of the display device, as well as pixels 103b and 103c on both sides of the display device is illustrated. Cylindrical lenses 10a, 10b, and 10c are provided so as to correspond to the pixels 103a, 103b, and 103c.

In FIG. 4, reference numeral 12a is used for indicating light exiting the center portion of the pixel 103a. Similarly, reference numerals 12a' and 12a" are used for indicating light exiting both ends of the pixel 103a, respectively. The light 12a exiting the center portion of the pixel 103a is collimated through the cylindrical lens 10a to reach the eyepoints of the viewer 113. The light 12a' and 12a" are also collimated through the cylindrical lens 10a. However, the light 12a' and 12a" does not reach the eyepoints of the viewer 113, but reach an upper position and a lower position of the eyepoints of the viewer 113, respectively. Thus, the pixel 103a is enlarged by the cylindrical lens 10a. In FIG. 4, an enlarged region is designated with the reference sign Y.

On the other hand, light 14a and the light 14b exiting the pixels adjoining the pixel 103a immediately above and below, respectively, are also collimated through the cylindrical lens 10a, but reach positions (not shown) which are different from the above-mentioned enlarged region Y.

Light 12b and light 12c which exit the center portions of the pixels 103b and 103c disposed on both sides of the display device, respectively, are collimated through respectively corresponding cylindrical lenses 10b and 10c to reach the eyepoints of the viewer 113, the pitch P1 of the cylindrical lenses being 0.392 mm in the present example.

Moreover, light exiting from both ends of each of the pixels 103b and 103c are also collimated through the corresponding cylindrical lens, but reach the upper position and the lower position of the viewer 113. Thus, the pixels 103b and 103c are enlarged by the corresponding cylindrical lenses 10b and 10c so that enlarged regions of the pixels 103b and 103c correspond to the above-mentioned enlarged region Y. Therefore, the viewer 113 can perceive the stereoscopic image within the enlarged region Y.

Furthermore, as shown in FIG. 5, the lenticular lens plate 109 according to the present example is located so that the focal length of each cylindrical lens is larger than the distance between the plane on which the lenticular lens plate 109 is formed and the plane on which the pixels 103 are formed, thereby preventing light entering a given cylindrical lens from being directed to a single point within its corresponding pixel. As a result, it is ensured that the viewer observes a portion of a pixel aperture, rather than the non-displaying portions, even when the viewer is situated to otherwise observe a non-displaying portion. Thus, so-called "black belts" are prevented from occurring in the sight of the viewer. The focal length of each cylindrical lens 109a is 0.745 mm in the present example.

Next, the size of the 3D-viewable zone achieved by the above-described image display device of the present example is described with reference to FIG. 6.

In FIG. 6, P represents the pitch of pixels 103 of an image display device; B represents the width of black stripes 104; d represents the distance (as adjusted into the distance in a vacuum space) between the plane on which the pixels 103 are formed and the plane on which a lenticular lens plate 109 is formed; y represents the width of the aperture of each pixel 103 as viewed through each cylindrical lens of the lenticular lens plate 109; L represents the distance between the lenticular lens plate 109 and the viewer 113; C and D represent both ends of one pixel 103 (defined as the center of one black strips 104 and the center of an adjoining black stripe 104); H represents a point on the plane on which a viewer 113 is situated where a line passing through point D intersects the plane; I represents a point on the plane on which the viewer 113 is situated where a line passing through point C intersects the plane; and G represents a point at which the lines C-I and D-H intersect each other. Under these conditions, the viewer 113 can vertically move between point H and point I without losing the proper 3D image. If the viewer 113 moves above point H or below point I, the viewer 113 may disadvantageously observe a pixel disposed above or below the pixel which is intended to be observed; that is, crosstalk may occur.

In other words, at the distance L from the lenticular lens plate 109, the viewer 113 can observe the 3D image within the range Yud (i.e., between point H and point I) along the vertical direction.

Next, since the triangle CDG and the triangle EFG are similar in shape, the 3D-viewable zone Yud within which the viewer 113 can vertically move without losing the proper 3D image is expressed as follows:

$$(P+B):y=(d+x):x \qquad \text{eq. (7)}$$

where x represents the distance from the lenticular lens plate 109 to the intersection G.

Since the triangle EFG and the triangle IHG are similar in shape, $$y:Yud=x:(L-x) \qquad \text{eq. (8)}$$

From eq. (7) and eq. (8), the following equation is obtained.

$$Yud \approx (P+B-y) \times L/d \qquad \text{eq. (9)}$$

In the present example, a liquid crystal display panel having a diagonal dimension of 10.4 inches (i.e., with a vertical dimension of 156 mm and a horizontal dimension of 208 mm), a pixel pitch P of 0.33 mm, and black stripes with a width B of 0.03 mm is used as a display element. A counter glass substrate 102b of the liquid crystal display panel has a thickness of 1.1 mm and a refractive index n of 1.52. Therefore, the distance d between the pixels 103 and the lenticular lens plate 109 is 0.72 mm as adjusted into the distance for a vacuum space. Furthermore, the image display device is designed so that the width y of the aperture of each pixel 103 as viewed through each cylindrical lens of the lenticular lens plate 109 is 0.03 mm and that the distance L between the image display device and the viewer 113 is 350 mm. In accordance with the image display device having such dimensions, the vertical dimension Yud of the 3D-viewable zone is derived to be 160 mm, according to eq.(9).

In contrast, the vertical dimension Yud of the 3D-viewable zone of a conventional 3D image display device constructed in accordance with the above dimensions is derived to be 14 mm according to eq.(3). Thus, in accordance with the image display device of the present example, the vertical dimension Yud of the 3D-viewable zone is effectively increased than that of conventional image display devices.

Next, the depth, or the dimension along the front-back direction, of the 3D-viewable zone provided by the above-described image display device of the present example is discussed. The viewer 113 can move without losing the proper 3D image within the range J-K shown in FIG. 6. The distance Yf along which the viewer 113 can move forward from the position defined by the optimum observation distance L with respect to the lenticular lens plate 109 without losing the proper 3D image, and the distance Yb along which the viewer 113 can move backward from the position defined by the optimum observation distance L with respect to the lenticular lens plate 109 without losing the proper 3D image are expressed by the following equations (10) and (11), respectively.

$$Yf=Yud \times L/(Hv+Yud) \qquad \text{eq. (10)}$$

$$Yb=Yud \times L/(Hv-Yud) \qquad \text{eq. (11)}$$

where Hv defines the vertical (i.e., in parallel to the signal lines) dimension of the display screen of the image display device.

In eq. (11), Yb takes a negative value when $Yud \geq Hv$, indicating that there is no limit to the backward dimension of the 3D-viewable zone.

In accordance with eq. (10) and eq. (11), the 3D-viewable zone Yf along which the viewer 113 can move forward from the position defined by the optimum observation distance L =350 mm without losing the proper 3D image is derived to be 175 mm. Since the distance L is prescribed so that $Yud \geq Hv$ in the present example, there is no limit to the backward dimension of the 3D-viewable zone.

In the present example, one row of pixels (arranged parallel to the scanning lines) defines a group of pixels that provide an image corresponding to one eye (i.e., right or left), as described above, The group of pixels for the right eye and the group of pixels for the left eye are provided so as to alternate along the column direction (i.e., along the direction parallel to the signal lines). Stripes of phase plates are provided on the front face of the liquid crystal display panel as the display element such that each stripe corresponds to one scanning line. Thus, the image for the right eye is separated from the image for the left eye. As a result, there, is no limit to the horizontal (or right-left) dimension of the 3D-viewable zone and when a viewer observes a 2D image displayed by the display device, the viewer can enjoy the image at a full resolution inherent to the employed liquid crystal display device. Furthermore, this arrangement of the group of pixels for the right eye and the group of pixels for the left eye can simplify the driving circuitry because the image signal for the right eye and the image signal for the left eye can simply be alternately switched with respect to every scanning line.

Moreover, according to the present example, the lenticular lens plate 109 is located so that the focal length of each cylindrical lens is larger than the distance between the plane on which the lenticular lens plate 109 is formed and the plane on which the pixels 103 are formed. As a result, so-called "black belts" are prevented from occurring in the sight of the viewer.

As described above, in accordance with the image display device of the present example, a polarizing plate 101*b* and phase plates 106*a* and 106*b* are disposed on the front face of display device in such a manner that the polarization direction of the light exiting each pixel for the right eye is perpendicular to the polarization direction of the light exiting each pixel for the left eye.

Moreover, microlenses for selectively directing either the light exiting a pixel for the right eye or the light exiting a pixel for the left eye to its corresponding eye are provided adjoining the phase plate. As a result, the 3D-viewable zone is expanded as compared to that of conventional 3D image display devices. As the microlens array, a lenticular lens plate having cylindrical lenses can be used in the case where the pixels are arranged so that one row of pixels (arranged in parallel to the scanning lines) defines either a group of pixels for the right eye or a group of pixels for the left eye, the two groups of pixels alternating with each other along the direction parallel to the signal lines. In this case, the cylindrical lenses are oriented so that each cylindrical lens corresponds to each group or row of pixels.

In addition, by prescribing the focal length of each cylindrical lens to be larger than the distance between the lenticular lens plate and its corresponding pixel, the non-displaying portions (i.e., "black stripes") present between that pixel and the pixel above or below can be made less conspicuous. As a result, a bright 3D image can be provided.

The cylindrical lenses of the lenticular lens plate 109 are arranged at a pitch which is not equal to the pixel pitch but has been appropriately determined based on the pixel pitch. As a result, moire fringes due to the parallax between the pixels 103 arranged in a matrix and the lenticular lens plate 109 are prevented from occurring.

Since one cylindrical lens is provided corresponding to one row of pixels arranged along the horizontal direction (i.e., in parallel to the scanning lines), the horizontal resolution of the 3D image does not decrease as compared to that inherent to the employed display element. Furthermore, since a group of pixels for the right eye and a group of pixels for the left eye are provided so as to alternate with respect to each scanning line, it is possible to supply an image signal for the right eye and an image signal for the left eye to the signal lines, the image signals being alternately switched at every horizontal (1H) period. As a result, the driving circuitry can be simplified.

Moreover, a viewer not wearing polarizing glasses can observe a 2D image using the image display device of the present example.

In the present example, the optimum observation distance L is prescribed so that the relationship Yud≧Hv is satisfied, where Hv again represents the vertical (i.e., along the direction parallel to the signal lines) length of the display element. Alternatively, the distance L can be prescribed so that Yud<Hv.

Although the phase difference of the phase plates 106*a* and 106*b* is prescribed to be ¼ wavelength, the phase difference of the phase plates 106*a* and 106*b* can be, for example, ½ wavelength. In this case, the phase plates need to be provided in stripes corresponding only to either the group of pixels for the right eye or the group of pixels for the left eye, thereby simplifying the production process of the phase plates.

Although an active matrix type liquid crystal display panel is used as the display element in the image display device of the present example, there is no limitation to the display element for providing an image for the right eye and an image for the left eye. For example, a simple matrix type liquid crystal display panel, a display device which emits light on its own, e.g., an EL (electroluminescence) device, a CRT (cathode ray tube), and a plasma display, or a plasma address liquid crystal display panel can also be used as the display element of the present example without undermining the effects of the present invention.

Although a TN display mode liquid crystal display panel incorporating a TN liquid crystal is employed in the present example, there is no limitation to the display mode of such a liquid crystal display panel. For example, one of various liquid crystal display modes can be employed, including: a hybrid electric field effect mode, a polymer-dispersed liquid crystal mode, an electric field induction birefringence mode, a ferroelectric liquid crystal mode, an anti-ferroelectric liquid crystal mode, a phase-transition mode utilizing a smectic liquid crystal having an electro-clinic effect, dynamic diffusion mode, a guest-host mode, and a liquid crystal complex film. When any non-polarization mode among such modes is used, the polarizing plate 110*a* can be omitted.

Although the polarizing plate 101*b*, the phase plates 106*a* and 106*b* and the lenticular lens plate 109 are disposed on the liquid crystal panel in that order according to the present example, it is also applicable to dispose the lenticular lens plate 109 upon the liquid crystal panel and then dispose the polarizing plate 101*b* and the phase plates 106*a* and 106*b* upon the lenticular lens plate 109.

Moreover, instead of the lenticular lens plate 109, it is also possible to employ any other angular limitation means for limiting the extent of the light exiting each group of pixels along the direction parallel to the signal lines, e.g., a light-intercepting plate having light-intercepting layers in parallel to the scanning lines, without undermining the above-described effects of the present invention.

Figure 7:
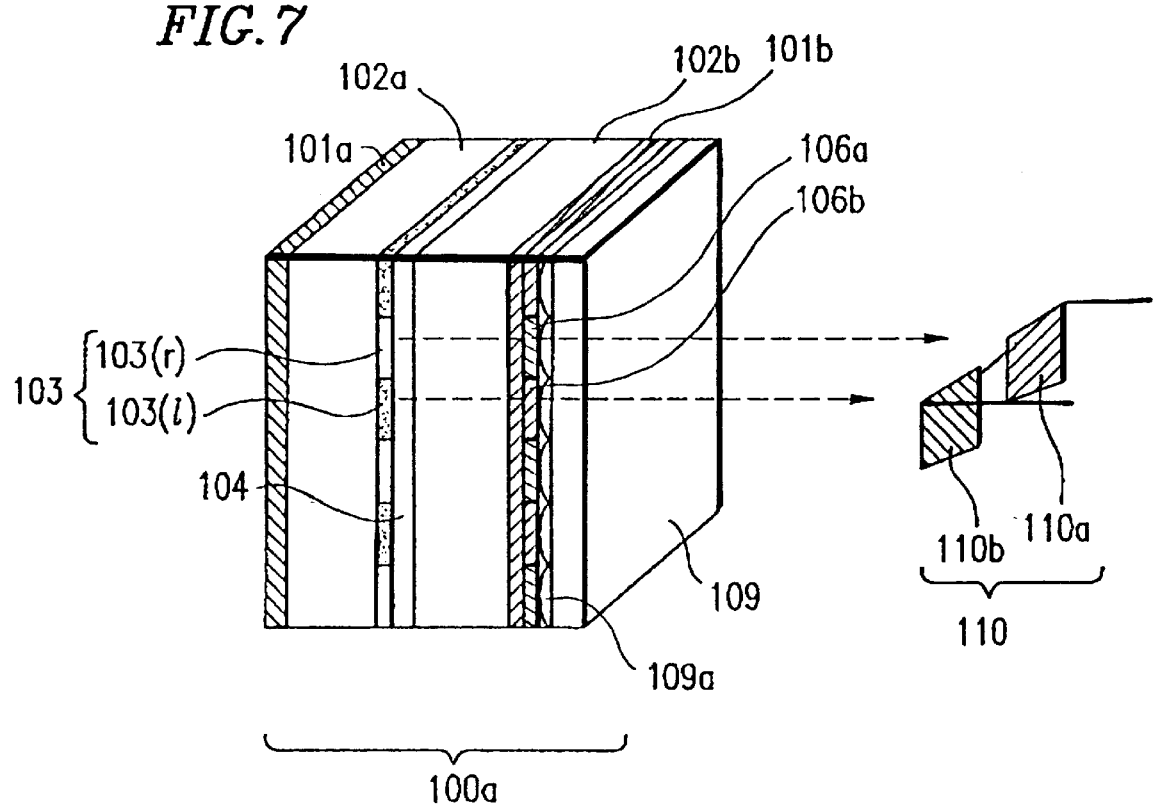
FIG. 7 is a cross-sectional view illustrating one variant of the image display device according to Example 1 of the present invention.

In the present example, the face of the lenticular lens plate 109 bearing the cylindrical lenses 109*a* is exposed to the viewer 113, as shown in FIG. 1. However, as shown in FIG. 7, it is also possible to dispose the lenticular lens plate 109 so that its face bearing the cylindrical lenses 109*a* opposes the phase plates 106*a* and 106*b*. In order to expand the 3D-viewable zone, the distance (thickness) between the display pixels, the phase plates and the lenses should be minimized. Since the cylindrical lenses 109*a* of the lenticular lens plate 109 are usually formed on a substrate made of a molded resin, the lenticular lens plate 109 inevitably includes a base portion which does not function as a lens on the side not bearing the lenses 109*a*. Therefore, in the arrangement where the face of the lenticular lens plate 109 bearing the lenses 109*a* does not oppose the phase plates 106*a* and 106*b*, the thickness of the counter substrate and the thickness (i.e., "substrate thickness") of the base portion of the lenticular lens plate not functioning as a lens may cause a parallax problem. Therefore, the 3D-viewable zone can be further expanded by disposing the lenticular lens plate 109 so that its face bearing the lenses 109*a* opposes the phase plates 106*a* and 106*b* as shown in FIG. 7.

Instead of forming lenticular lenses (i.e., cylindrical lenses 109*a*) directly on the phase plates 106*a* and 106*b*, the lenses 109*a* are formed on a separate substrate in the present example, thus forming the lenticular lens plate 109. Thus, it is possible to freely select the method and material for forming the lenticular lenses 109*a*. In other words, the material of the phase plates 106*a* and 106*b* does not affect or limit the process or material for forming the lenticular lenses 109*a*.

Although the lenticular lenses 109a are directly formed on a substrate, it is also possible to form phase plates 106a and 106b first on the substrate and the lenticular lenses 109a thereupon. In this case, the material of the lenses 109a may be somehow limited, but there is an advantage in that the phase plates 106a and 106b can be formed substantially close to the lenses 109a, whereby the 3D-viewable zone can be further expanded.

Although the respective filters of R, G, and B of the color filter are arranged in stripes, they may alternatively take a delta arrangements The above-described structure and its variants are similarly applicable to the following examples as well as Example 1.

EXAMPLE 2

Figure 8:
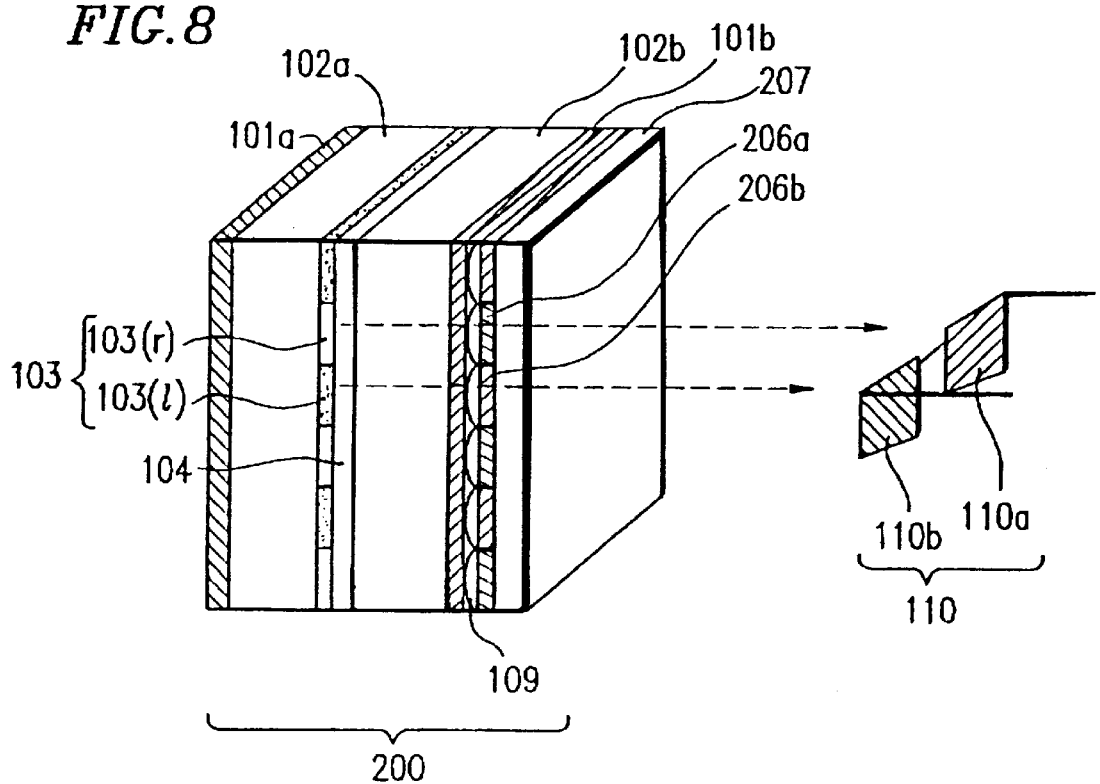
FIG. 8 is a cross-sectional view illustrating an image display device according to Example 2 of the present invention.

FIG. 8 is a cross-sectional view showing an image display device according to Example 2 of the present invention. The constituent elements in FIG. 8 which also appear in FIG. 1 are indicated by the same reference numerals as used therein, the descriptions thereof being omitted.

The construction of the image display device 200 according to Example 2 of the invention is described with reference to FIG. 8. The image display device 200 is identical with the image display device 100 of Example 1 except that stripes of phase plates 206a and 206b are disposed on a substrate 207, whereupon a cylindrical lens array 109 is formed, and that the phase plate 206a and 206b are formed by combining a half-wave plate and a quarter-wave plate. Therefore, the cylindrical lens array 109 is now interposed between a polarizing plate 101b and the phase plates 206a and 206b. A TFT type liquid crystal display panel is similarly employed in the image display device according to the present example.

Figure 9:
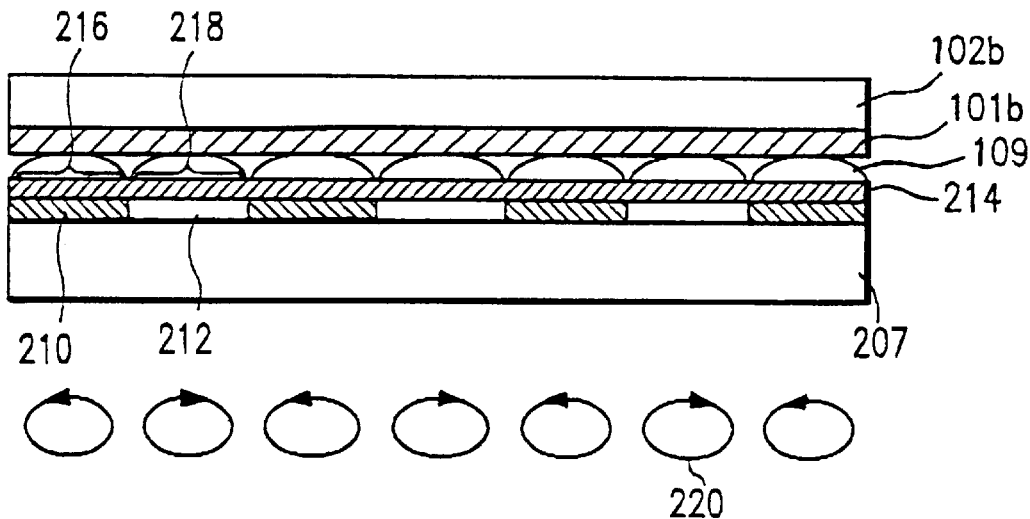
FIG. 9 is a cross-sectional view illustrating the arrangement of the phase plates shown in FIG. 8.

Hereinafter, the method for forming the stripe-shaped phase plates 206a and 206b according to the present example is described with reference to FIG. 9.

First, a patterned phase plate including portions 210 and 212 is formed through alternate patterning by photolithography along a direction parallel to the scanning lines (not shown) so that the portions 210 with a phase difference of ½ wavelength and the portions 212 with no phase difference are alternately formed on the substrate 207. Next, a quarter-wave plate 214 having a slow axis which is perpendicular to the slow axis of the portions 210 (having a phase difference of ½ wavelength) is formed over the entire surface of the substrate 207. As a result, regions 216 where the quarter-wave plate 214 is overlaid on the portions 210 (having a phase difference of ½ wavelength) define regions having a phase difference of ¼ wavelength, whereas regions 218 where the quarter-wave plate 214 is overlaid on the portions 212 (having no phase difference) define regions having a phase difference of ¼ wavelength but along a slow axis perpendicular to that of the regions 216. The regions 216 and 218 alternately extend along the direction parallel to the scanning lines. Therefore, either regions 216 or regions 218 correspond to the phase plate 206a in FIG. 8, with the other region corresponding to the phase plate 206b. The cylindrical lens array 109 is formed upon such phase plates 206a and 206b.

Thus, among the components of the linearly-polarized light exiting the polarizing plate 101b on a counter substrate 102b, one component passing through the regions 216 (where the quarter-wave plate 214 is overlaid on the ½ wavelength portions 210) is converted into circularly-polarized light, whereas one component passing through the regions 218 (where the quarter-wave plate 214 is overlaid on the portions 212 having no phase difference is circularly polarized in the counter direction. In other words, incident light is converted into two circularly-polarized light components which are "perpendicularly polarized" with respect to each other.

Thus, a viewer 113 wearing polarizing glasses 110 (having lenses corresponding to the respective circularly-polarized light components) can observe a 3D image.

As described above, in accordance with the image display device of the present example, the 3D-viewable zone can be expanded by providing polarizing plates and stripes of phase plates and further providing a lenticular lens array in the vicinity thereof.

In the present example, a combination of ½ wavelength phase difference and ¼ wavelength phase difference was employed. However, the combination of phase differences is not limited thereto, but can be any combination that produces output polarized light components that are "perpendicularly polarized" with respect to each other. For example, light passing through a member having a phase difference of ½ wavelength and a slow axis located at an angle of 22.5° with respect to the incident linearly-polarized light can be converted into linearly-polarized output light which is rotated by 45° from the incident linearly-polarized light. Similarly, light passing through a member having a phase difference of ½ wavelength and a slow axis located at an angle of −22.5° with respect to the incident linearly-polarized light can be converted into linearly-polarized output light which is rotated by −45° from the incident linearly-polarized light. By providing such members so as to alternately extend along the scanning line direction, output polarized light components that are "perpendicularly polarized" with respect to each other can be produced, so that the viewer 113 wearing polarizing glasses 110 having lenses corresponding to the such light components can observe a 3D image.

The above-described structure is not limited to Example 2 alone, but is applicable to any other example of the present invention.

EXAMPLE 3

Figure 10:
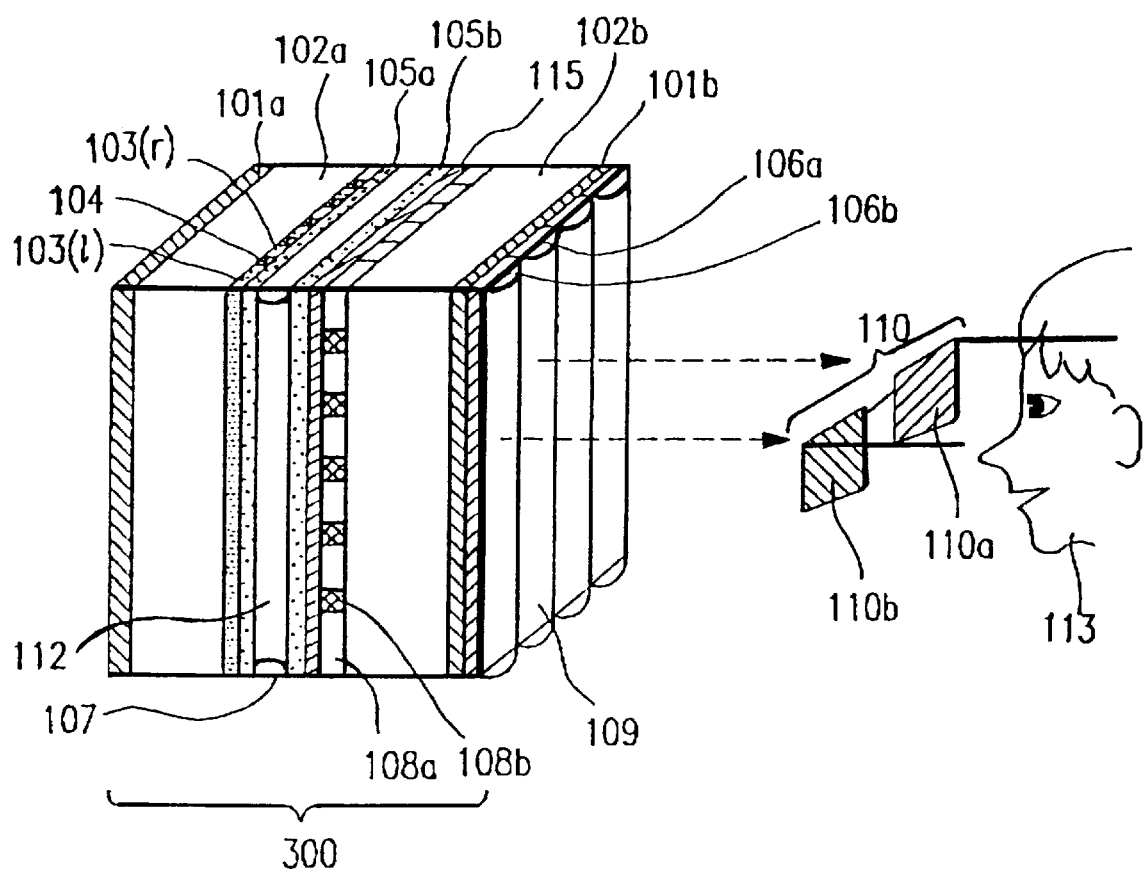
FIG. 10 is a cross-sectional view illustrating an image display device according to Example 3 of the present invention.

FIG. 10 is a cross-sectional view showing an image display device according to Example 3 of the present invention. The constituent elements in FIG. 10 which also appear in FIG. 1 are indicated by the same reference numerals as used therein, the descriptions thereof being omitted.

The image display device 300 is identical with the image display device 100 of Example 1 except that a column of pixels arrayed along a direction parallel to the signal lines (i.e., the column direction) defines either a group of pixels for the right eye or a group of pixels for the left eye, the two group of pixels (for the right eye and the left eye) alternating along a direction parallel to the scanning lines (i.e., the row direction), and that a lenticular lens plate is provided so that the respective cylindrical lenses thereof extend in parallel to the signal lines.

In the present example, as in Example 1, the pitch P1 of the cylindrical lenses of the lenticular lens plate 109 is prescribed so as to prevent the generation of moire stripes due to the parallax between the matrix of pixels 103 and the lenticular lens plate 109. In the present example, a liquid crystal display panel having a diagonal dimension of 10.4 inches, a pixel pitch P of 0.25 mm is used as the display element. A counter glass substrate 102b of the liquid crystal display panel has a thickness of 1.1 mm and a refractive index n of 1.52. The distance L between the lenticular lens plate 109 and the viewer is 350 mm. The pitch P1 of the cylindrical lenses is prescribed to be 0.249 mm in accordance with eq. (6). It should be noted that the focal length of the cylindrical lenses according to the present example is prescribed equal to the distance between the lenticular lens plate 109 and the face on which the pixels 103 are formed.

Next, the size of the 3D-viewable zone provided by the image display device of the present example is discussed with reference to FIG. 11.

Figure 11:
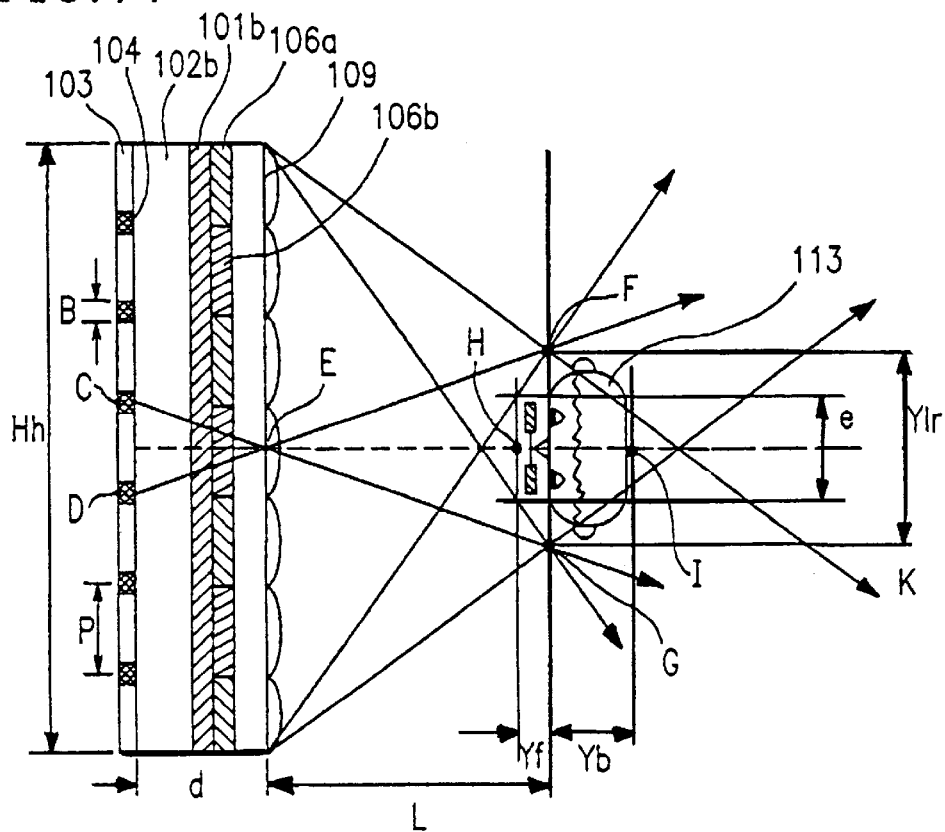
FIG. 11 is a diagram illustrating the 3D-viewable zone according to Example 3 of the invention.

In FIG. 11, the 3D-viewable zone Ylr which allows for the viewer's movement along the horizontal (or right-left) direction without losing the proper 3D image can be expressed by the following equation (12):

$$Ylr = (P+B) \times L/d \qquad \text{eq. (12)}$$

where P denotes the pitch of the pixels 103 of the image display device; B denotes the width of black stripes 104 present between adjoining pixels 103 along the direction parallel to the scanning lines (i.e., the row direction); d denotes the distance, as adjusted into the distance for a vacuum space, between the plane bearing the pixels 103 and the lenticular lens plate 109; and L denotes the distance between the lenticular lens plate 109 and the viewer 113.

The liquid crystal display panel employed in the present example has a diagonal dimension of 10.4 inches (i.e., with a vertical dimension of 156 mm and a horizontal dimension of 208 mm) and a pixel pitch P of 0.25 mm. The black stripes 104 have a width B of 0.02 mm. The counter glass substrate 102b of the liquid crystal display panel has the thickness of 1.1 mm and a refractive index n of 1.52. Therefore, the distance d between the plane bearing the pixels 103 and the lenticular lens plate 109 as adjusted into the distance for a vacuum is 0.72 mm. The distance L between the image display device and the viewer 113 is 350 mm. Under such conditions, the horizontal (right-left) dimension Ylr of the 3D-viewable zone is derived to be 130 mm, according to eq. (12).

In contrast, the horizontal dimension Ylr of the 3D-viewable zone of a conventional 3D image display device constructed with a liquid crystal display panel having the above-mentioned dimensions cannot exceed the interocular interval e=65 mm (on average) of the viewer 113. Thus, in accordance with the image display device of the present example, the horizontal (or right-left) dimension Ylr of the 3D-viewable zone is doubled as compared with that of conventional image display devices.

Moreover, as mentioned above, the cylindrical lenses of the lenticular lens plate are periodically located along the direction parallel to the scanning lines so as to correspond to either the group of pixels for the right eye or the group of pixels for the left eye (which are arrayed along the direction parallel to the signal lines). Therefore, no "black belts" occur in the sight of the viewer who is situated within the horizontal (or right-left) 3D-viewable zone Ylr.

Next, the depth, or the dimension along the front-back direction, of the 3D-viewable zone provided by the above-described image display device of the present example is discussed. Since the eyes of the viewer 113 are horizontally fixed at the interval e, the viewer 113 can move without losing the proper 3D image within the range H-I shown in FIG. 11. Accordingly, the distance Yf along which the viewer 113 can move forward from the position defined by the optimum observation distance L without losing the proper 3D image, and the distance Yb along which the viewer 113 can move backward from the position defined by the optimum observation distance L without losing the proper 3D image are expressed by the following equations (13) and (14), respectively.

$$Yf = eL/(Hh+Ylr) \qquad \text{eq. (13)}$$

$$Yb = eL/(Hh-Ylr) \qquad \text{eq. (14)}$$

where Hh defines the horizontal dimension of the image display device.

Figure 24:
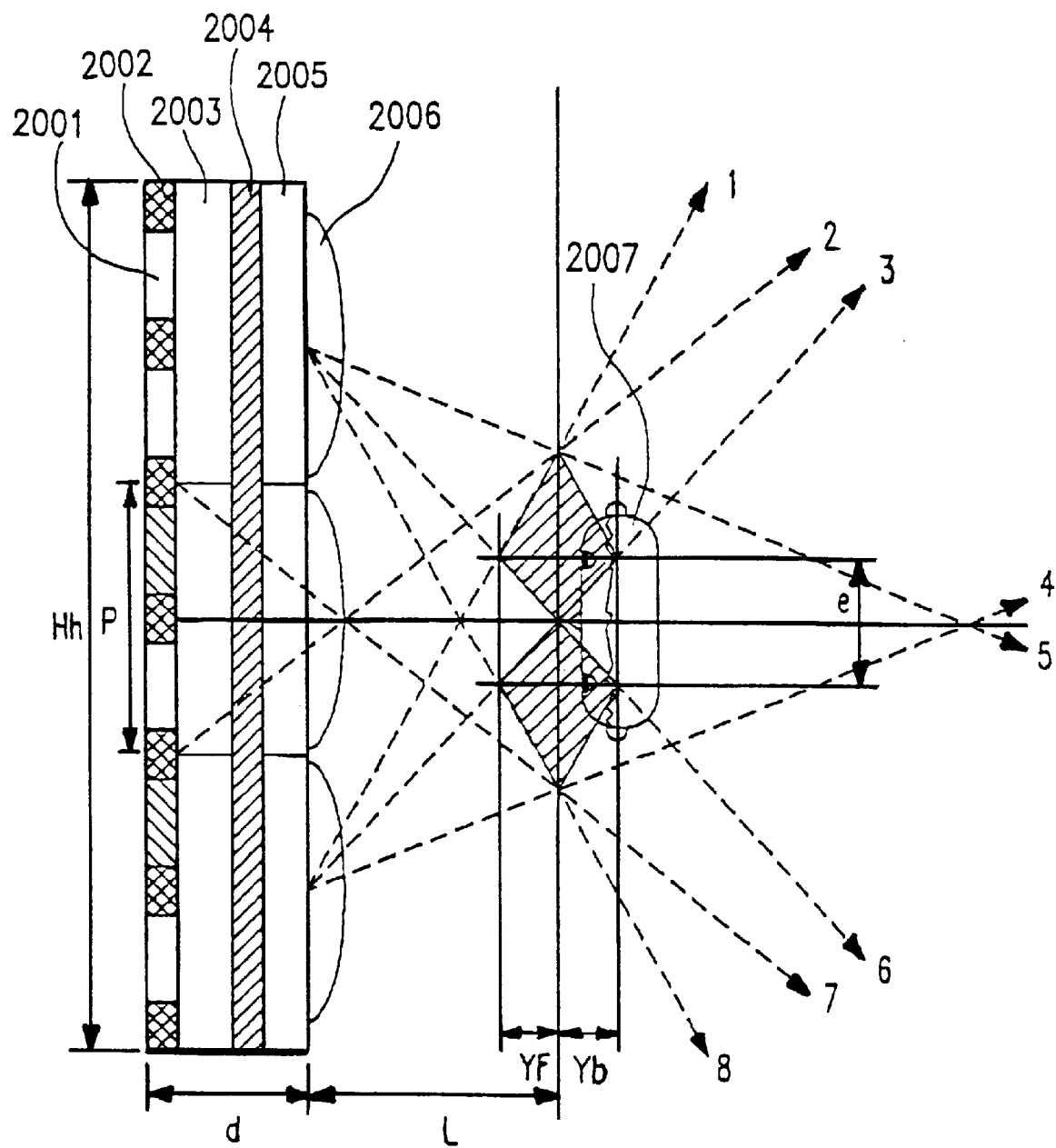
FIG. 24 is a diagram illustrating the depth (front-back) dimension of the 3D-viewable zone according to a conventional lenticular system.
Figure 25:
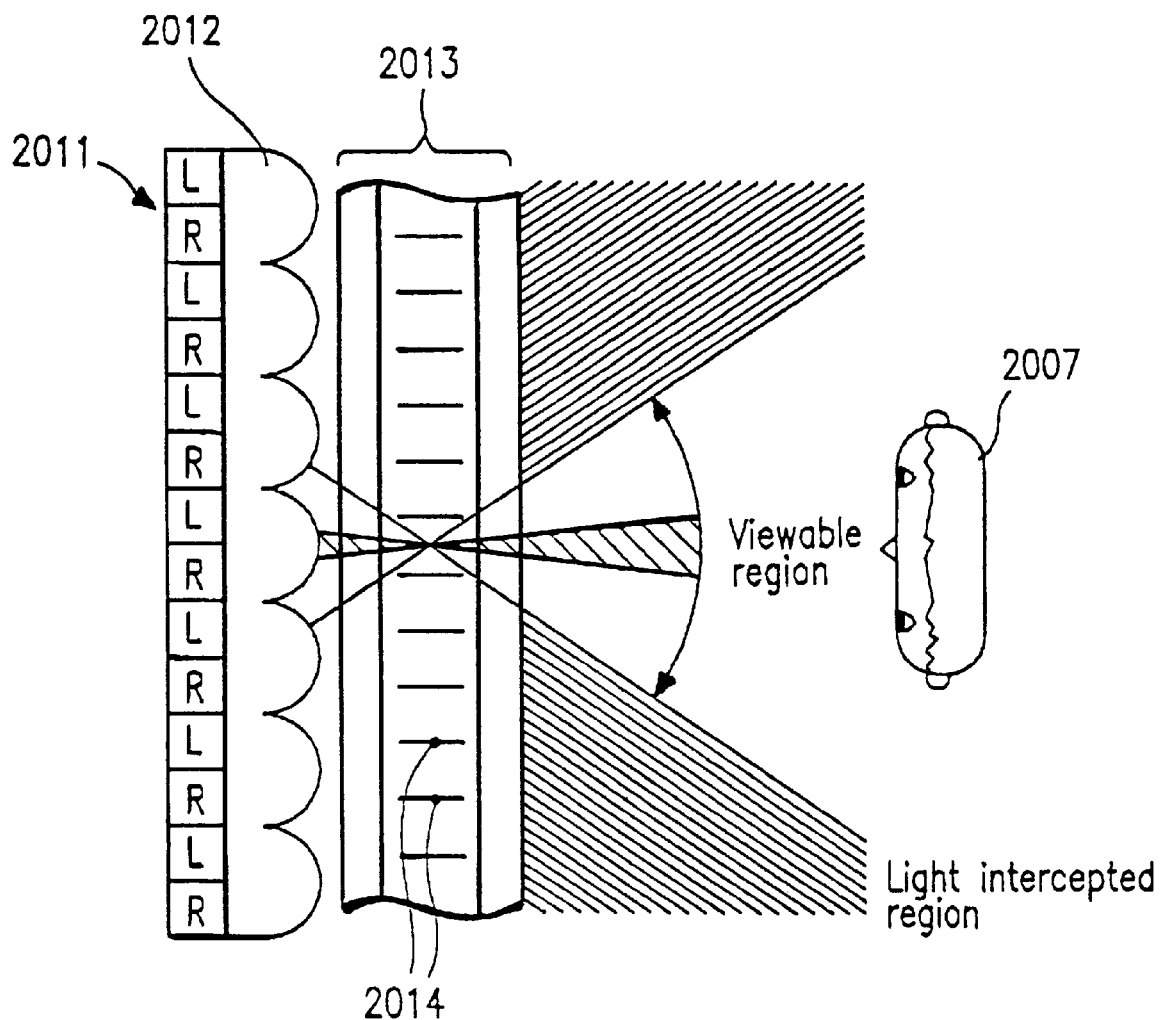
FIG. 25 is a schematic diagram illustrating the configuration of a conventional lenticular-type 3D image display device according to a conventional system (disclosed in Japanese Laid-Open Publication No.4-16092).
Figure 26:
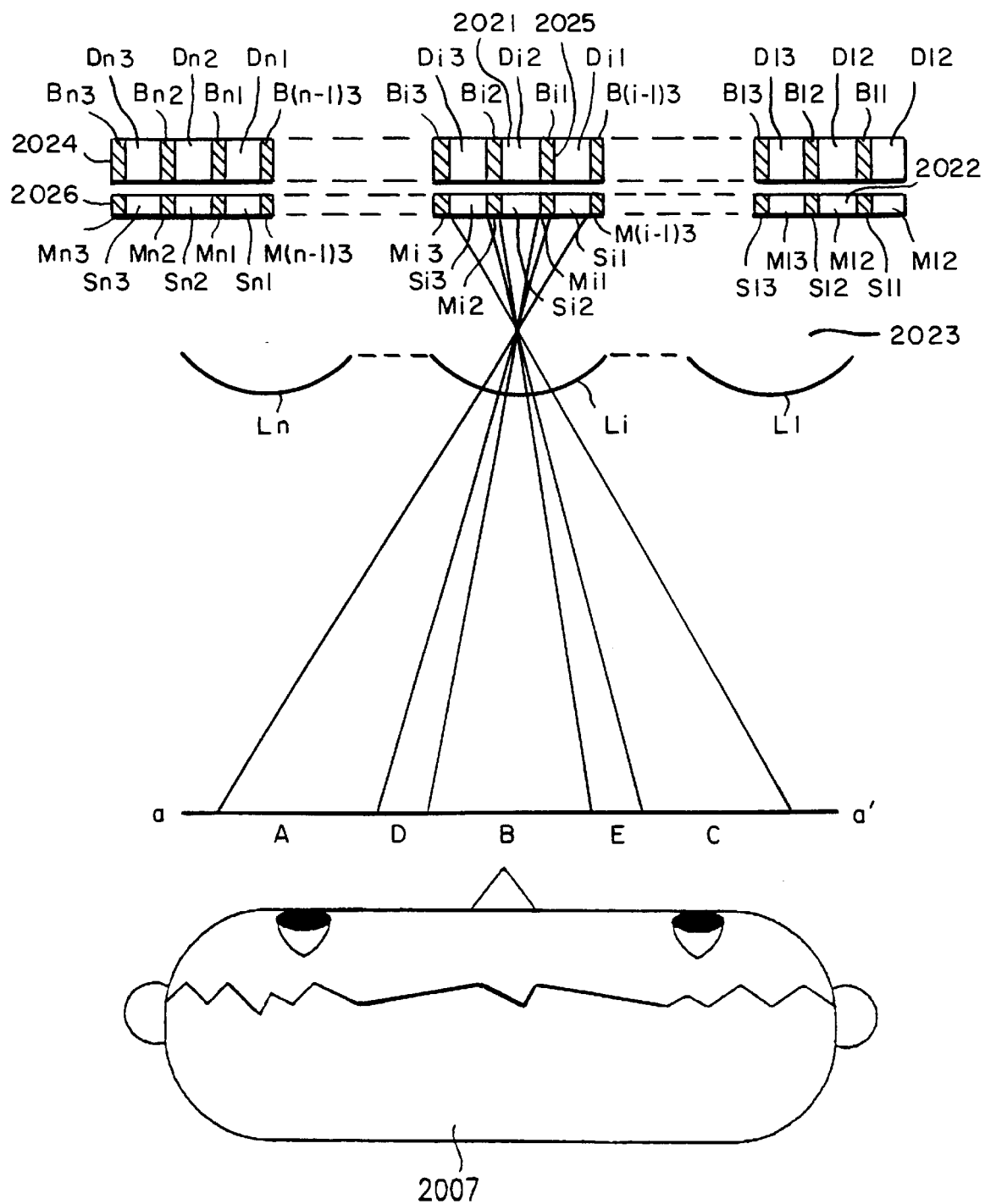
FIG. 26 is a schematic diagram illustrating the configuration of another conventional lenticular-type 3D image display device (disclosed in Japanese Laid-Open Publication No.6-335030).
Figure 27:
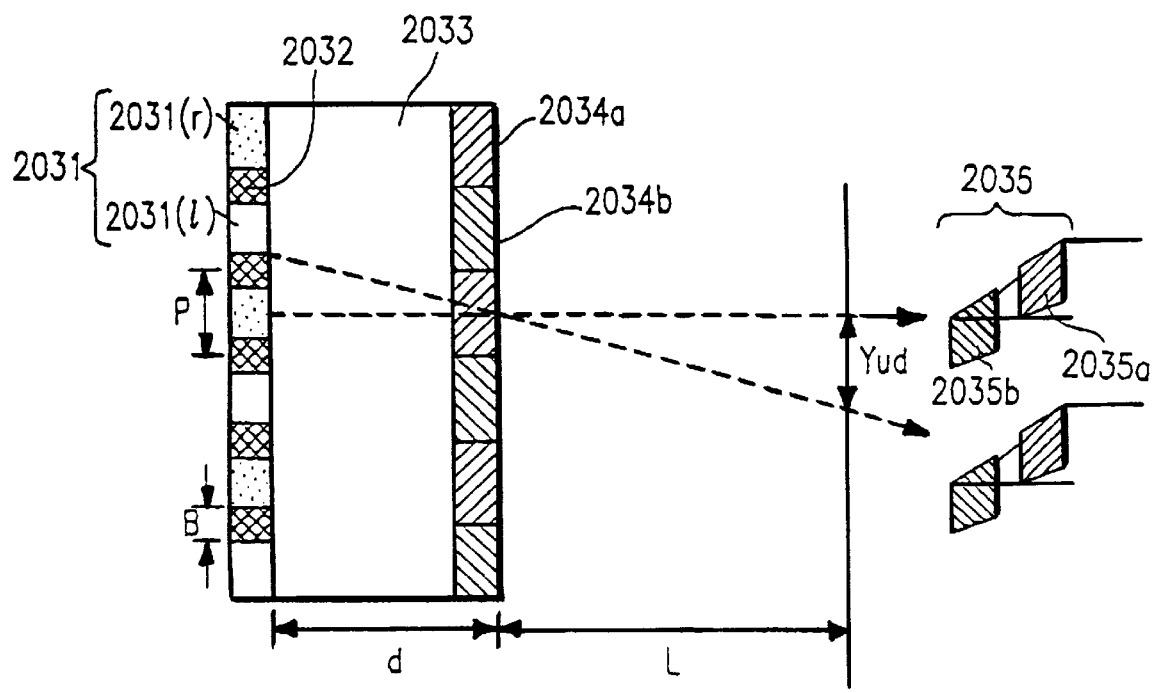
FIG. 27 is a schematic diagram illustrating the configuration of a conventional polarizing glass-type 3D image display device (disclosed in Japanese Laid-Open Publication No.58-184929).

In accordance with eq. (13) and eq. (14), the 3D-viewable zone Yf along which the viewer 113 can move forward from the position defined by the optimum observation distance L=350 mm without losing the proper 3D image is derived to be 67 mm. Similarly, the 3D-viewable zone Yb in backward direction is derived to be 291 mm. Thus, in accordance with the image display device of the present example, the 3D-viewable zone dimensions Yf and Yb along the front-back direction can be expanded as compared with the device shown in FIG. 24, for example.

In the present example, the signal lines are alternately taken out from the upper end or the lower end of the liquid crystal panel. The signal for the image for the right eye and the signal for the image for the left eye are separately provided from the upper end or the lower end of the liquid crystal panel.

As described above, in accordance with the image display device of the present example, a polarizing plate and phase plates are provided on the front face of a display device in such a manner that the light exiting the pixels for the right eye and the light exiting the pixels for the left eye take different polarization states, with a lenticular lens plate being provided adjacent to the phase plates so that the respective cylindrical lenses thereof correspond only to either the pixels for the right eye or the pixels for the left eye. Thus, according to the present example, the 3D-viewable zone can be expanded without allowing the viewer to observe any black belts when moving along the right-left direction. In contrast, conventional image display devices typically incorporate a lenticular lens plate such that each cylindrical lens thereof corresponds to two pixels, i.e., one for the right eye and one for the left eye, arrayed along the horizontal direction of the display screen, resulting in the problem in that non-displaying portions are magnified through the cylindrical lenses to be observed as black belts by a viewer moving along the right-left direction, which substantially restricted the 3D-viewable zone along the right-left direction.

Since the signal lines are alternately taken out from the upper end or the lower end of the liquid crystal panel, with the signal for the image for the right eye and the signal for the image for the left eye being supplied accordingly, the driving circuitry according to the present example can be simplified.

By designing the pitch of the cylindrical lenses in view of the pitch of the pixels of the liquid crystal display panel as the display element, the generation of moire stripes due to the parallax between the pixels and the lenticular lens plate can be prevented.

Moreover, a viewer not wearing polarizing glasses can observe a 2D image displayed by the image display device of the present example.

EXAMPLE 4

Figure 12:
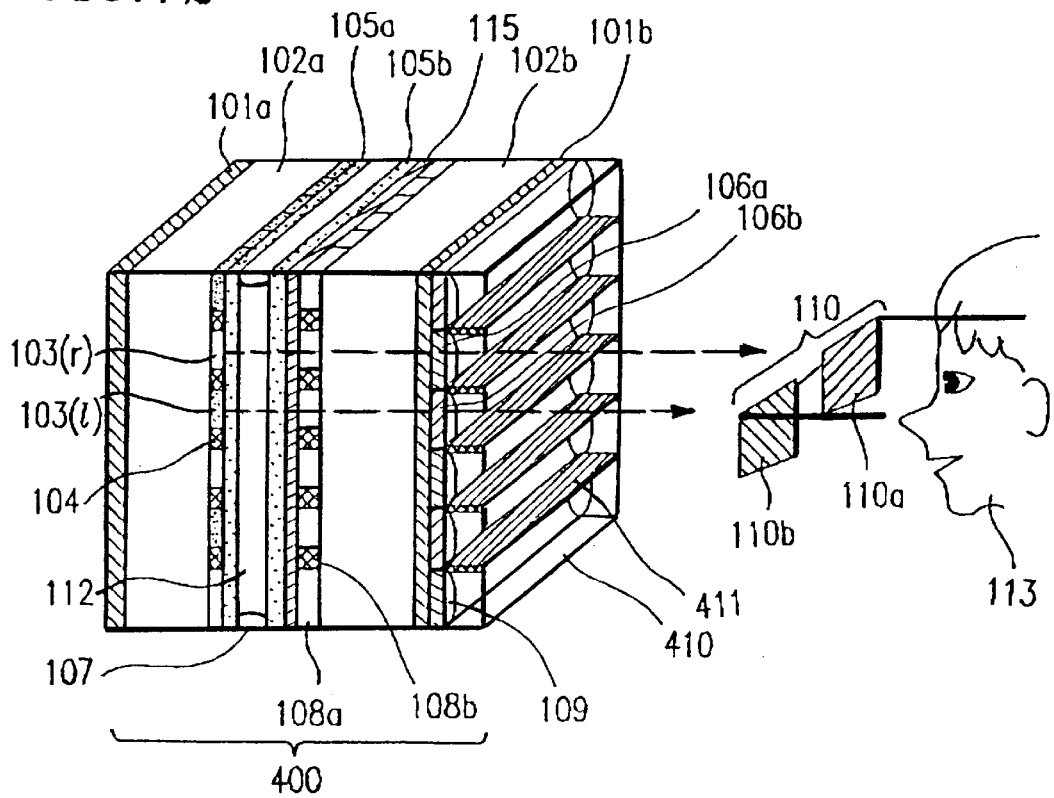
FIG. 12 is a cross-sectional view illustrating an image display device according to Example 4 of the present invention.

FIG. 12 is a cross-sectional view showing an image display device according to Example 4 of the present invention. The constituent elements in FIG. 12 which also appear in FIG. 1 or 5 are indicated by the same reference numerals as used therein, the descriptions thereof being omitted.

The image display device of the present example is identical with that of Example 1 except that a light shielding plate 410 is further provided in front of a lenticular lens plate 109 for restricting the angles of light components exiting the image display device.

The light shielding plate 410 includes a plurality of light shielding layers 411 formed orthogonally with respect to a plane on which the pixels 103 of the image display device are borne. Each light shielding layer 411 is located so as to correspond to each interface between adjoining cylindrical lenses of the lenticular lens plate 109, the light shielding layers 411 extending in parallel to the scanning lines. In the present example, the light shielding plate 410 is formed of a piece cut out from a composite including layers of a transparent resin film (thickness: 0.259 mm) and a black resin film (thickness: 0.05 mm) alternately pressed upon one another, the light shielding plate 410 having a thickness of 0.49 mm taken from the lenticular lens plate 109.

In the present example, the pitch P1 of the light shielding layers 411 of the light shielding plate 410 is prescribed so as to prevent the generation of moire fringes due to the parallax between the matrix of pixels 103, the lenticular lens plate 109 and the light shielding plate 410. In the present example, a liquid crystal display panel having a diagonal dimension of 4 inches, a pixel pitch P of 0.26 mm is used as the display element. A counter glass substrate of the liquid crystal display panel has a thickness of 1.59 mm and a refractive index of 1.52. The distance L between the display device and the viewer is 400 mm. The pitch P1 of the light shielding layers 411 is prescribed to be 0.259 mm in accordance with eq. (6).

Next, the size of the 3D-viewable zone provided by the image display device of the present example is discussed with reference to FIG. 13.

Figure 13:
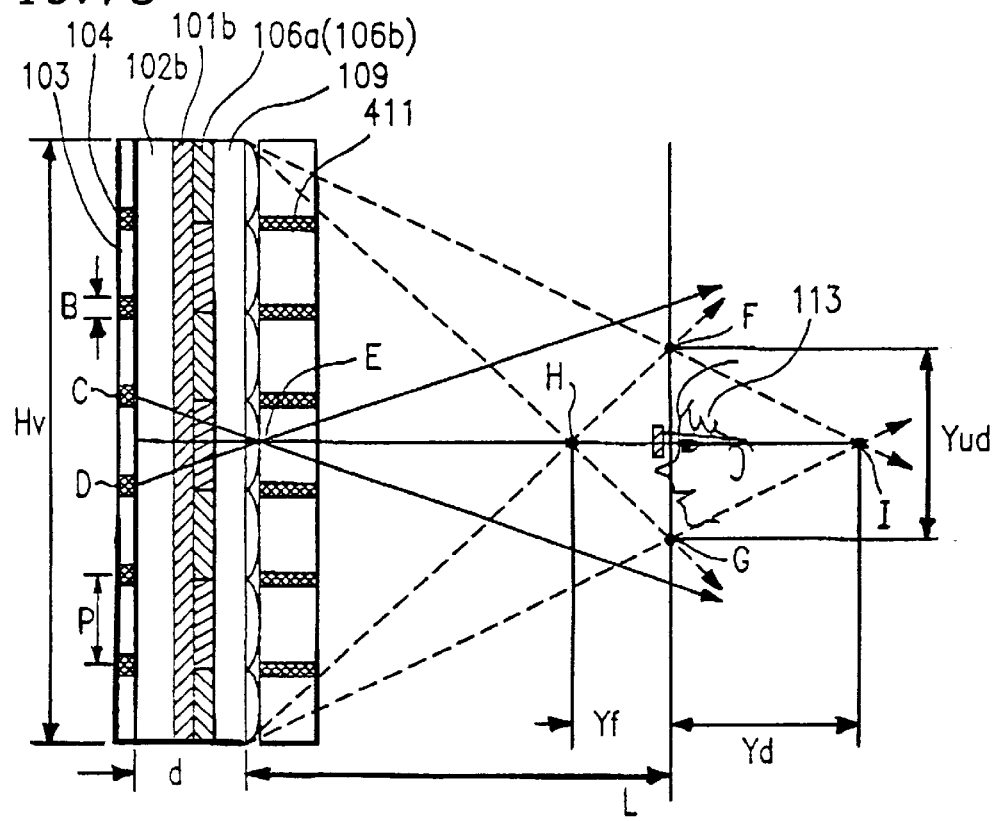
FIG. 13 is a diagram illustrating the 3D-viewable zone according to Example 4 of the invention.

In FIG. 13, the 3D-viewable zone Yud which allows for the viewer's movement along the vertical direction without losing the proper 3D image can be expressed by eq. (9), where P denotes the pitch of the pixels 103 of the liquid crystal display panel employed in the display device, B denotes the width of black stripes 104 present between adjoining pixels 103 along the direction parallel to the signal lines; d denotes the distance, as adjusted into the distance for a vacuum, between the plane bearing the pixels 103 and the light shielding plate 410; and L denotes the distance between the light shielding plate 410 and the viewer 113.

The liquid crystal display panel employed in the present example has a diagonal dimension of 4 inches (i.e., with a vertical dimension of 45 mm and a horizontal dimension of 60 mm) and a pixel pitch P of 0.26 mm. The black stripes 104 have a width B of 0.05 mm. The counter glass substrate of the liquid crystal display panel has a thickness d1 of 1.59 mm and a refractive index of 1.52. Therefore, the distance between the plane bearing the pixels 103 and the light shielding plate 410 as adjusted into the thickness for a vacuum is substantially equal to 1.04 mm. The distance L between the image display device and the viewer 113 is 400 mm. Under such conditions, the vertical dimension Yud of the 3D-viewable zone along which the viewer 113 can move without losing the proper 3D image is derived to be 118 mm, according to eq. (9). In contrast, the vertical dimension Yud of the 3D-viewable zone of a conventional 3D image display device constructed with a liquid crystal display panel having the above-mentioned dimensions is 14 mm. Thus, in accordance with the image display device of the present example, the vertical dimension Yud of the 3D-viewable zone can be expanded as compared with that of conventional image display devices.

With respect to the 3D-viewable zone dimensions Yf and Yb along the front-back direction (which can be expressed by eq. (10) and eq. (11), respectively), the forward dimension Yf of the 3D-viewable zone is derived to be 265 mm, whereas there is no limit to the backward dimension of the 3D-viewable zone. Thus, in accordance with the image display device of the present example, not only the vertical dimension Yud but also the forward dimension Yf and the backward dimension Yb of the 3D-viewable zone can be expanded as compared with those of conventional image display devices.

In the present example, as in Example 1, one row of pixels (arranged in parallel to the scanning lines) defines a group of pixels that provide an image corresponding to one eye (i.e., right or left), as described above, thereby separating the image for the right eye from the image for the left eye. As a result, there is no limit to the horizontal (or right-left) dimension of the 3D-viewable zone, and when a viewer observes a 2D image displayed by the display device, the viewer can enjoy the image at a full resolution inherent to the display device.

Although the light shielding layers of the light shielding plate are described to extend along the scanning line direction and in parallel to one another, the light shielding layers can be disposed obliquely with respect to the optical axis without undermining the effects of the present invention.

As described above, in accordance with the image display device of the present example, a polarizing plate and phase plates are provided on the front face of a display device in such a manner that the light exiting the pixels for the right eye and the light exiting the pixels for the left eye take different polarization states, with a lenticular lens plate being provided adjacent to the phase plates so that the respective cylindrical lenses thereof correspond to a row of pixels that are arrayed along a scanning line. Furthermore, a light shielding plate for restricting the angles of light components exiting each cylindrical lenses is further provided in front of the lenticular lens plate. As a result, in accordance with the image display device of the present example, there is no limit to the horizontal (or right-left) dimension of the 3D-viewable zone. Furthermore, not only the vertical dimension but also the forward dimension and the backward dimension of the 3D-viewable zone are expanded.

By providing the light shielding plate for restricting the angles of the light components exiting the image display device, the zones susceptible to crosstalk due to the vertical movement of the viewer can also be eliminated.

Since the pitches of the cylindrical lenses and the light shielding plate are determined in view of the pitch of the pixels of the employed display element, the generation of moire fringes due to the parallax between the matrix of pixels, the lenticular lens plate, and the light shielding plate can be prevented.

EXAMPLE 5

Figure 14:
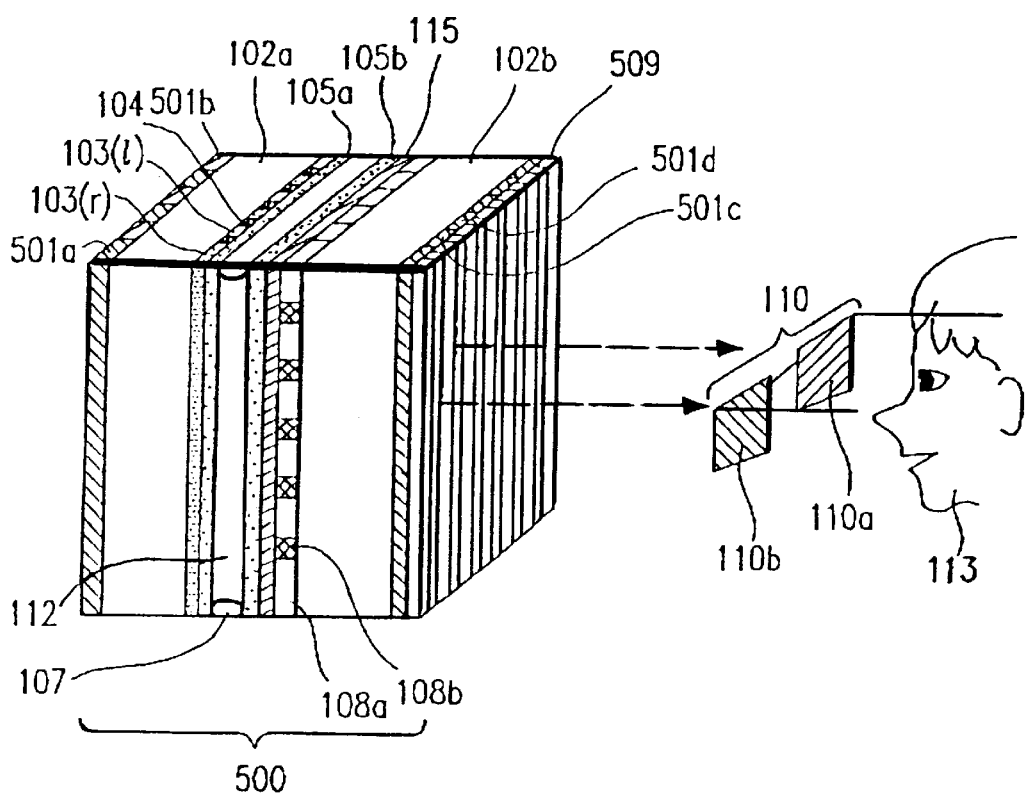
FIG. 14 is a cross-sectional view illustrating an image display device according to Example 5 of the present invention.

FIG. 14 is a cross-sectional view showing an image display device according to Example 5 of the present invention. The constituent elements in FIG. 14 which also appear in FIG. 1 are indicated by the same reference numerals as used therein, the descriptions thereof being omitted.

The image display device of the present example is similar to that of Example 1 except that: each column of pixels arrayed in a direction parallel to the signal lines defines either a group of pixels for the right eye or a group of pixels for the left eye, the two groups alternating along the direction parallel to the scanning lines; polarizing plates on both sides of the liquid crystal display device are formed in stripes extending along a direction parallel to the signal lines, thereby eliminating phase plates used in combination with polarizing plates; and a light shielding plate 509 is used instead of a lenticular lens plate.

In the image display device of the present example, polarizing plates 501a and polarizing plates 501b are provided on the side of a TFT substrate 102a facing away from a liquid crystal layer 112. The polarizing plates 501a and polarizing plates 501b alternately extend along the vertical direction of the display screen, thus corresponding to the respective signal lines. Stripes of polarizing plates 501c and 501d are provided on the side of a counter substrate 102b facing away from the liquid crystal layer 112. The polarization axes of the polarizing plates 501a and 501b are perpendicular with each other, and the polarization axes of the polarizing plates 501c and 501d are perpendicular with each other. Furthermore, the polarization axes of opposing polarizing plates are perpendicular with respect to each other. In other words, the polarization axes of the polarizing plates 501a and 501d are perpendicular with each other, and the axes of polarization of the polarizing plates 501b and 501c are perpendicular with each other. As a result, the image for the right eye and the image for the left eye are separately provided for the respective eyes of the viewer.

The light shielding plate 509 is a slitted plate having openings which are disposed periodically so as to correspond to the signal lines. Each opening of the light shielding plate 509 has the same width as the width of non-displaying portions 108b of the display device. In the present example, the light shielding plate 509 is formed so that its openings are disposed at a pitch P1 of 0.16 mm.

Next, the size of the 3D-viewable zone provided by the image display device 500 of the present example is discussed with reference to FIG. 15.

Figure 15:
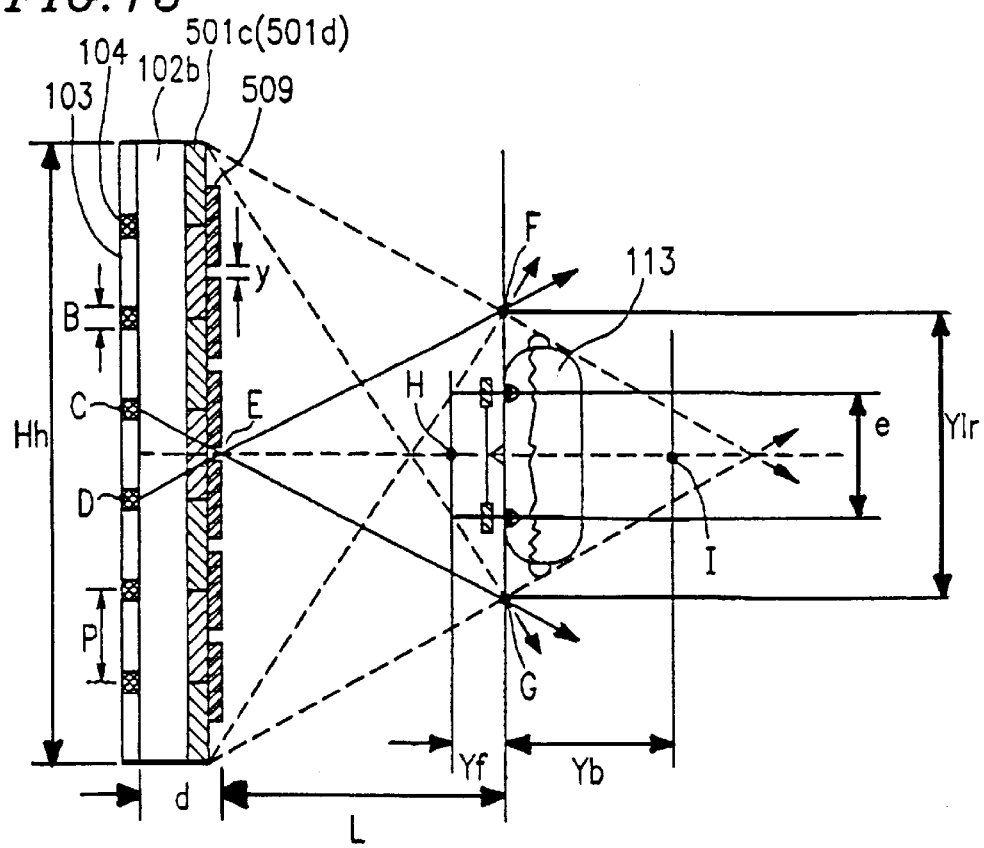
FIG. 15 is a diagram illustrating the 3D-viewable zone according to Example 5 of the invention.

In FIG. 15, the 3D-viewable zone Ylr which allows for the viewer's movement along the horizontal (or right-left) direction without losing the proper 3D image can be expressed by the following equation (15):

$$Ylr = (P + B - y) \times L / d \qquad \text{eq. (15)}$$

where P denotes the pitch of the pixels 103 of the liquid crystal panel employed in the image display device; B denotes the width of black stripes 104 present between adjoining pixels 103 along the direction parallel to the scanning lines (i.e., the row direction); d denotes the distance, as adjusted into the distance for a vacuum, between the plane bearing the pixels 103 and the slitted plate 509; and L denotes the distance between the slitted plate 509 and the viewer 113.

The liquid crystal display panel employed in the present example has a diagonal dimension of 4 inches (i.e., with a vertical dimension of 45 mm and a horizontal dimension of 60 mm) and a pixel pitch P of 0.16 mm. The black stripes 104 have a width B of 0.01 mm. The counter glass substrate 102b of the liquid crystal display panel has a thickness d1 of 1.1 mm and a refractive index n of 1.52. Therefore, the distance between the plane bearing the pixels 103 and the slitted plate 509 as adjusted into the distance for a vacuum is substantially equal to 0.72 mm. The width y of each opening of the slitted plate 509 is 0.01 mm. The distance L between the image display device and the viewer 113 is 400 mm. Under such conditions, the horizontal (right-left) dimension Ylr of the 3D-viewable zone along which the viewer 113 can move without losing the proper 3D image is derived to be 88 mm, according to eq. (15). Thus, in accordance with the image display device of the present example, the horizontal dimension Ylr of the 3D-viewable zone can be expanded as compared with that of conventional image display devices.

With respect to the 3D-viewable zone dimensions Yf and Yb along the front-back direction (which can be expressed by eq. (13) and eq. (14), respectively, as in Example 3), the forward dimension Yf of the 3D-viewable zone is derived to be 175 mm, whereas there is no limit to the backward dimension of the 3D-viewable zone.

In the present example, the polarizing plates 501a, 501b, 501c, and 501d are disposed in such a manner that the polarization axes of any opposing polarizing plates are perpendicular with respect to each other. However, the above-described effect of expansion of the 3D-viewable zone can also be obtained in the case where the polarization axes of opposing polarizing plates are laid parallel to each other. Instead of using stripe-shaped polarizing plates, it is also applicable to, as in Examples 1 to 3, provide a polarizing plate having the same polarization axis over the entire surface thereof on both the front face and the back face of the liquid crystal display panel, with stripe-shaped phase plates provided in front thereof.

In the present example, each column of pixels arrayed in a direction parallel to the signal lines defines a group of pixels for the right eye or a group of pixels for the left eye. Alternatively, each row of pixels arrayed in a direction parallel to the scanning lines may define a group of pixels for the right eye or a group of pixels for the left eye, provided with a slitted plate having a plurality of openings each extending in parallel and corresponding to each row of pixels. In this case there is an additional advantage of simplified driving circuitry.

As described above, in accordance with the image display device of the present example, polarizing plates are provided in front of the display device so as to provide light components that are "perpendicularly polarized" with respect to each other via the pixels for the right eye and the pixels for the left eye, with a slitted plate being provided adjacent to the polarizing plates as a means of angular restriction. As a result, the horizontal (or right-left) 3D-viewable zone along which the viewer can move without observing any black belts can be expanded, while also expanding the 3D-viewable zone along the vertical direction as well as the front-back direction.

By appropriately designing the pitch of the openings of the slitted light shielding plate in view of the pitch of the pixels of the employed liquid crystal display panel, the generation of moire fringes due to the parallax between the matrix of pixels and the light shielding plate can be prevented.

Moreover, a viewer not wearing polarizing glasses can observe a 2D image displayed by the image display device of the present example.

EXAMPLE 6

Figure 16:
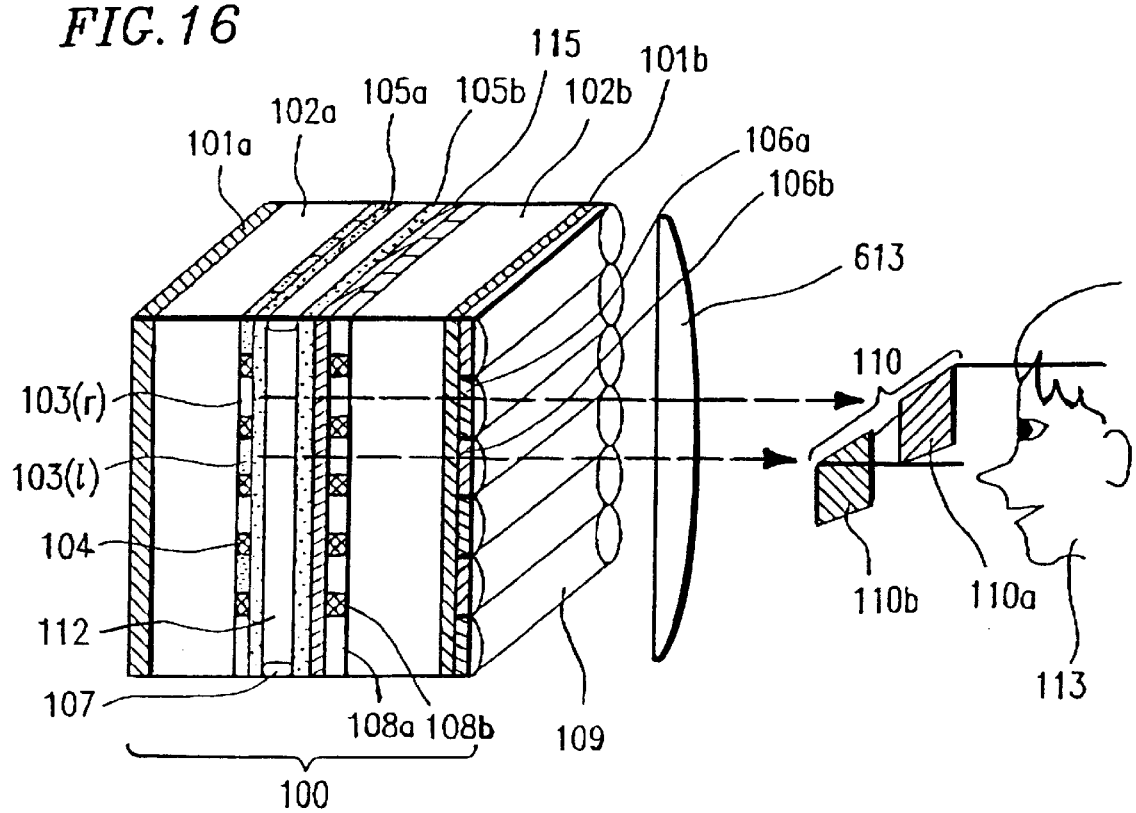
FIG. 16 is a cross-sectional view illustrating an image display device according to Example 6 of the present invention.

FIG. 16 is a cross-sectional view showing an image display device according to Example 6 of the present invention. The constituent elements in FIG. 16 which also appear in FIG. 1 are indicated by the same reference numerals as used therein, the descriptions thereof being omitted.

The image display device of the present example is similar to that of Example 1 except that a field lens 613 for converging the light exiting the pixels at the eyepoints of the viewer is provided in front of the lenticular lens plate 109 having cylindrical lenses corresponding to the scanning lines. The field lens 613 prevents the generation of moire fringes due to the parallax between the matrix of pixels and the lenticular lens plate 109. Therefore, the pitch P1 of the cylindrical lenses of the lenticular lens plate 109 can be set equal to the pitch P of the pixels of the display element, in contrast to Example 1. Accordingly, in the present example, the pitch P1 of the cylindrical lenses of the lenticular lens plate 109 and the pitch P of the pixels of the display element are both set to be 0.25 mm.

The 3D-viewable zone provided by the image display device of the present example is identical with that provided in Example 1. The descriptions thereof are omitted.

Thus, the image display device of the present example includes a polarizing plate and phase plates in front of the display device so as to provide light components that are "perpendicularly polarized" with respect to each other via the pixels for the right eye and the pixels for the left eye, with the lenticular lens plate 109 and the filed lens 613 being provided adjacent to the polarizing plate and phase plates. As a result, the 3D-viewable zone can be expanded.

Because of the field lens 613 provided in front of the lenticular lens plate 109, the generation of moire fringes due to the parallax between the pixels and the lenticular lens plate 109 is prevented even in the case where the pitch P1 of the cylindrical lenses of the lenticular lens plate 109 and the pitch P of the pixels of the display element are equal.

Furthermore, the optimum observation distance L can be easily adjusted by varying the focal length of the field lens 613.

The field lens 613 can also be adopted in any of Examples 2 through 5 to provide similar effects.

In Examples 1 to 6, each column (or row) of pixels arrayed in a direction parallel to the signal lines (or scanning lines) defines a group of pixels for the right eye or a group of pixels for the left eye. However, the above-described effects can also be attained in the case where the groups of pixels for the right eye or the groups of pixels for the left eye are arranged in a mosaic shape, with each group of pixels being constituted by one or more pixels. In this case, if a combination of polarizing plates and phase plates is used as an optical means for providing light components taking respectively different polarization states for the pixels for the right eye and the pixels for the left eye, the phase plates must be arranged in a mosaic shape corresponding to the arrangement of the groups of pixels. If only polarizing plates are employed in this case, as in Example 5, the polarizing plates on both the front face and the back face are arranged in a mosaic shape corresponding to the arrangement of the groups of pixels.

Moreover, in any of Examples 1 to 6, the lenticular lens plate can be replaced by a microlens array such that each microlens corresponds to one group of pixels.

EXAMPLE 7

Figure 17A:
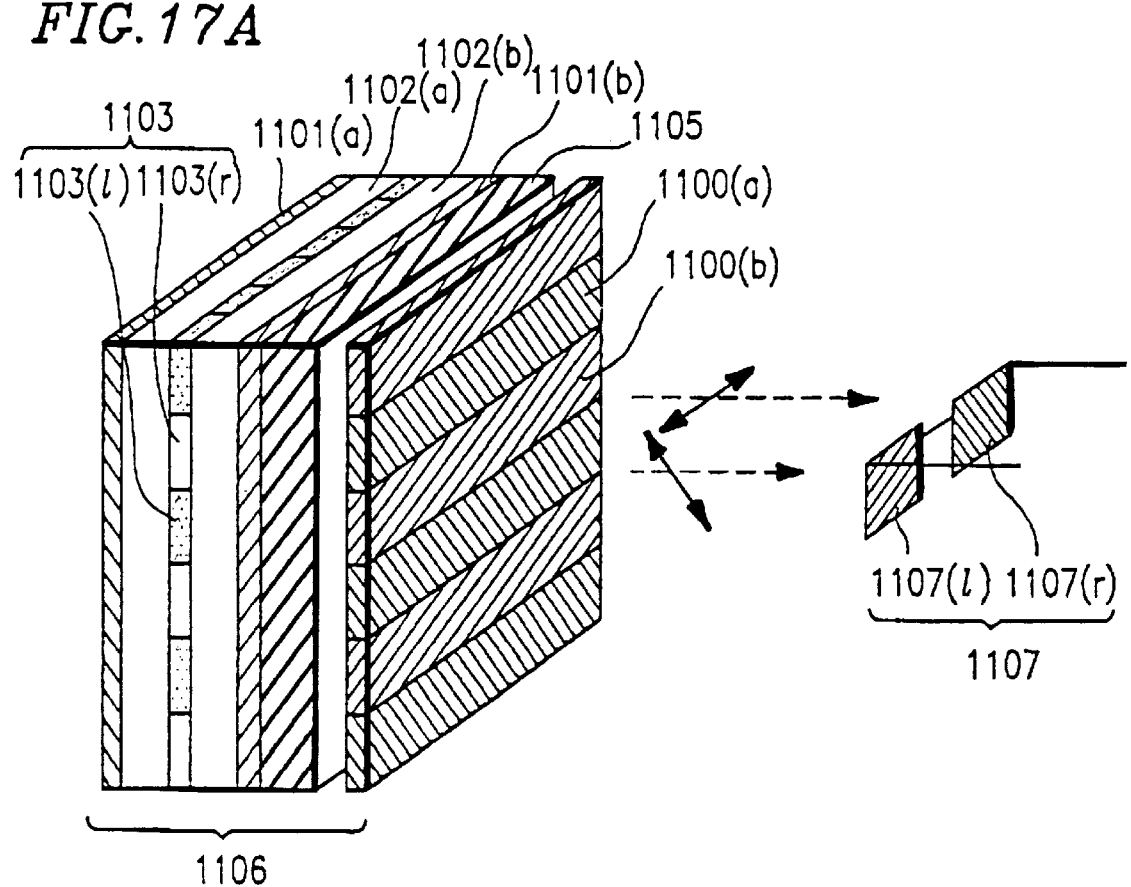
FIG. 17A is a cross-sectional view illustrating an image display device according to Example 7 of the present invention.

FIG. 17A is a cross-sectional view showing an image display device 1106 according to Example 7 of the present invention. The image display device 1106 of the present example includes a TFT liquid crystal display panel having substrates 1102(*a*) and 1102(*b*) and a matrix of a plurality of pixels 1103 interposed therebetween.

The pixels 1103 are grouped into pixels 1103(r) for the right eye and pixels 1103(l) for the left eye. The groups of pixels 1103(r) for the right eye and the groups of pixels 1103(l) for the left eye are disposed so as to alternately correspond to each scanning line.

In the present example, polarizing plates 1101(*a*) and 1101(*b*) are provided on the outer faces of the liquid crystal display panel so as to interpose the liquid crystal display panel. The polarizing plate 1101(*a*) on the substrate 1102(*a*) has the same polarization axis over the entire surface thereof. The polarizing plate 1101(*b*) provided on the front face of the other substrate (counter substrate) 1102*b* is disposed so that the polarization axis thereof is perpendicular to that of the polarizing plate 1101(*a*).

An array of graded index lenses 1105 is provided in front of the polarizing plate 1101(*b*). Each graded index lens forms an erect image of an object (i.e., a non-reversed image) with the same rate of magnification (i.e., the same size), described later. Furthermore, stripe-shaped phase plates 1100(*a*) and 1100(*b*) are provided in front of the graded index lens array 1105 so as to alternately correspond to every scanning line. Thus, the phase plates 1100(*a*) and 1100(*b*) correspond to the groups of pixels 1103(r) for the right eye and the groups of pixels 1103(l) for the left eye, respectively (or vice versa). Therefore, in accordance with the image display device 1106 of the present example, the horizontal resolution during the viewing of a 3D image is not reduced to ½ of the number of pixels of the liquid crystal display panel as the display element.

In the present example, quarter-wave plates are used as the phase plates 1100(*a*) and 1100(*b*). The slow axis of the phase plate 1100(*a*) is shifted by 45° with respect to the polarization axis of the polarizing plate 1101(*b*), The slow axis of the phase plate 1100(*b*) is shifted by 45° with respect to the polarization axis of the polarizing plate 1101(*b*) but in a counter direction with respect to the slow axis of the phase plate 1100(*a*).

Figure 18A:
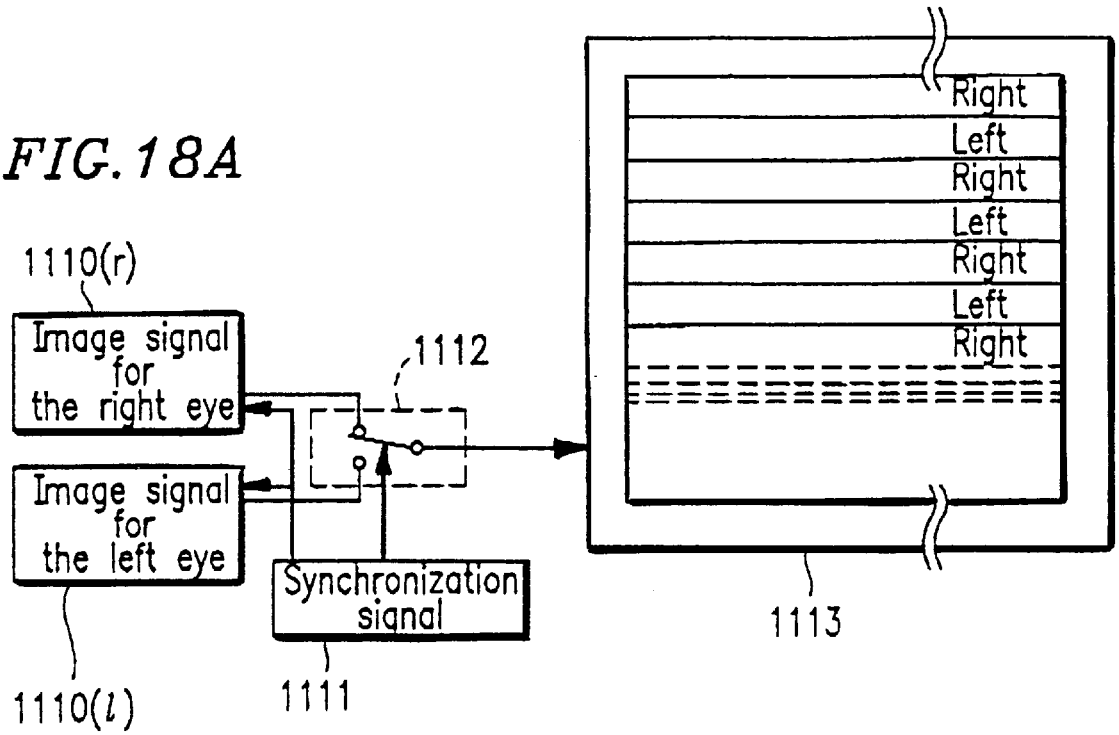
FIG. 18A is a block diagram illustrating an exemplary driving circuit according to Example 7 of the present invention.

In the image display device 1106 having the above-mentioned configuration, the image for the right eye and the image for the left eye are alternately displayed corresponding to every scanning line. Therefore, when a 3D image is displayed, as shown in FIG. 18A, the signal 1110(r) for the image for the right eye and the signal 1110(l) for the image for the left eye are alternately selected by means of a selector 1112, so that either the signal 1110(r) for the image for the right eye or the signal 1110(l) for the image for the left eye is supplied for every scanning line in synchronization with a horizontal synchronization signal 1111, the two signals 1110(r) and 1110(l) correspondingly alternating. Thus, the driving circuitry can be simplified according to the present example.

In the present example, the light exiting the liquid crystal display panel and passing through the polarizing plate 1101(*b*) and the phase plates 1100(*a*) and 1100(*b*) is converted into circularly-polarized light such that the direction of polarization alternates by 90° for every scanning line. Therefore, the viewer can view a 3D image by wearing circular-polarizing glasses 1107 having polarizing plates 1107(r) and 1107(l) corresponding to the respective directions of circular polarization, even if the viewer's face is tilted in one way or another.

Moreover, in the present example, the surfaces of the phase plates 1100(*a*) and 1100(*b*) are chemically or otherwise treated to form scattering surfaces. As a result, the light exiting the graded index lens array 1105 is effectively scattered on the surfaces of the phase plates 1100(*a*) and 1100(*b*) so as to increase the range of viewing angles, so that the viewer can easily observe a proper image even when viewing the image at an angle exceeding the outgoing angle of the graded index lens array 1105.

Figure 17B:
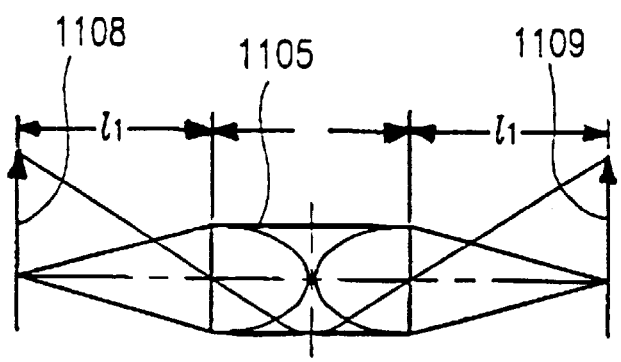
FIG. 17B is a diagram illustrating a graded index lens employed in Example 7 of the present invention.
Figure 17C:
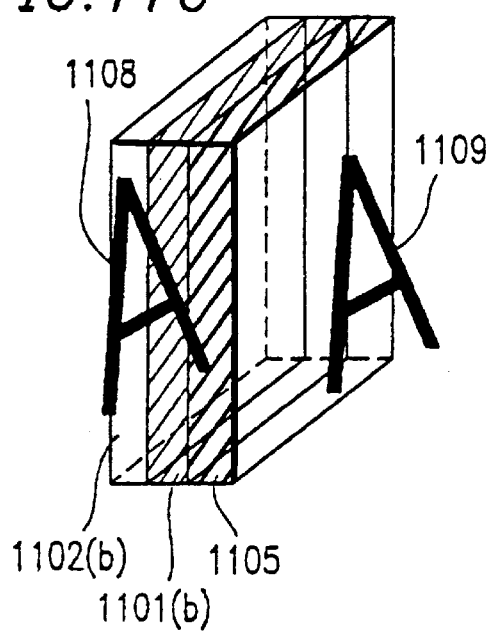
FIG. 17C is a diagram illustrating a non-reserved image bearing the same rate of magnification as the original image.

Next, the action of the graded index lens array 1105 with reference to FIG. 17B.

The graded index lens array 1105 includes an array of lens elements. Whereas a conventional lens forms an image through refraction of light based on the curvature of the input end face and/or the output end face, each lens element is a rod-like lens whose refractive index decreases from the central axis toward the peripheral portions, as shown in FIG. 17B, so that an image is formed by continuous refraction of light based on the distribution of refractive index in the rod-like lens. Therefore, the lens element functions as a lens even if both end faces thereof are planar, as disclosed in "THE OPTICAL CHARACTERISTICS OF SELFOC LENS ARRAY AND THEIR APPLICATIONS", Nishizawa, pp.85–96, Kogyo Zairyo Vol.28, No.10.

Each lens element of the graded index lens array 1105 functions to form an erect image (non-reversed image) 1109 of an object 1108 present in an appropriate region with the same rate of magnification (i.e., without being reversed, magnified, or reduced). Therefore, the pixels 1103 and the lens elements do not need to have a one-to-one correspondence with each other. It is not required to accurately position the graded index lens array 1105 with respect to the liquid crystal display panel.

In the present example, the length of the graded index lens array 1105 is prescribed so that it produces a non-reversed image of an image displayed by the pixel bearing the same rate of magnification as shown in FIG. 17B. As a result, the image displayed by each of the pixels 1103 of the liquid crystal display panel as the object 1108 is presented as an erect image (a non-reversed image) 1109 bearing the same rate of magnification. Moreover, the phase plates 1101(*a*) and 1101(*b*) are disposed on a plane on which the graded index lens array 1105 can form images in the present example. This produces the same effect as would be attained if the thickness of the counter substrate was made zero, thereby eliminating the parallax between the displayed image and the phase plates 1101(*a*) and 1101(*b*). Therefore, the image display device 1106 of the present example provides a 3D-viewable zone which is not bound by any restrictions along the vertical direction or along the front-back direction.

It might seem from eq. (3) to eg. (5) that a conventional system can even expand the 3D-viewable zone by prescribing the thickness of the counter substrate at a very small value. However, reducing the thickness of the counter substrate greatly reduces the strength of the liquid crystal display panel, thereby making it difficult to produce the liquid crystal display panel. Moreover, reducing the thickness of the counter substrate also makes it difficult to control the thickness of the display panel, thereby resulting in a considerable decrease in the display quality. Therefore, conventional systems cannot reduce the thickness of the counter substrate to substantially zero as in the case of the present invention, and therefore are subject to some restriction in the 3D-viewable zone they provide, due to the thickness of the counter substrate (glass substrate).

As described above, the image display device 1106 of the present example includes stripes of phase plates in front of the display device so as to provide light components that are "perpendicularly polarized" with respect to each other via the pixels for the right eye and the pixels for the left eye, with the graded index lens array 1105 being provided adjacent to the phase plates. As a result, the image displayed by each pixel is presented as a non-reversed image bearing the same rate of magnification on the side of the graded index lens array 1105 facing the viewer, whereby the 3D-viewable zone can be expanded free from the influence of parallax due to the substrates of the display device.

Furthermore, in the present example, each row of pixels along the scanning line direction defines a group of pixels for one eye so that the group of pixels for the right eye and the group of pixels for the left eye alternate along the direction parallel to the signal lines, with the phase plates 1100(*a*) and 1100(*b*) provided in front of the display device so that each stripe thereof corresponds to one scanning line, thereby separating the image for the right eye from the image for the left eye. Therefore, the horizontal resolution is not reduced to ½ of the number of pixels of the liquid crystal display panel used as the display element.

Figure 18B:
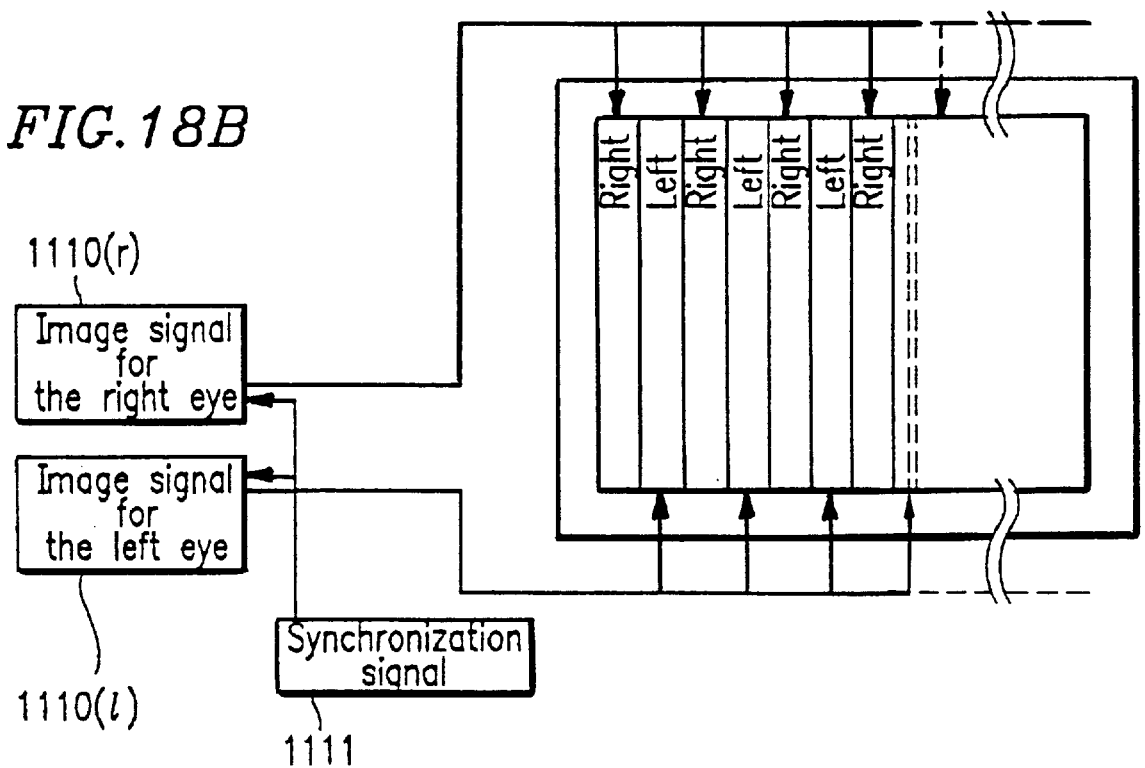
FIG. 18B is a block diagram illustrating another exemplary driving circuit according to Example 7 of the present invention.

In the present example, each row of pixels arrayed in a direction parallel to the scanning lines defines a group of pixels for the right eye or a group of pixels for the left eye, with the phase plates 1100(*a*) and 1100(*b*) being provided so that each stripe thereof corresponds to one scanning line. Alternatively, each column of pixels arrayed in a direction parallel to the signal lines may define a group of pixels for the right eye or a group of pixels for the left eye, with the phase plates 1100(*a*) and 1100(*b*) being provided so that each stripe thereof corresponds to one signal line. In such cases, as illustrated in the block diagram of FIG. 18B, the signal lines can be divided into an upper group and a lower group so that the image for the right eye and the image for the left eye are supplied from the upper end and the lower end, respectively, thereby simplifying the driving circuitry.

Moreover, by chemically or otherwise treating the surfaces of the phase plates 1100(*a*) and 1100(*b*) to form scattering surfaces, the range of viewing angles can be increased, thereby further expanding the 3D-viewable zone.

Moreover, a viewer not wearing polarizing glasses can observe a 2D image at a full resolution inherent to the display device.

In the present example, the polarizing plate 1101(*b*) is provided in front of the counter substrate 1102(*b*), with the graded index lens array 1105 being further provided in front thereof. However, there is no limit to the relative positions of these elements. For example, it is possible to adopt the configuration shown in FIG. 19, where the positions of the polarizing plate 1101(*b*) and the graded index lens array 1105 are exchanged so that the liquid crystal display panel as the display element, the graded index lens array 1105, the polarizing plate 1101(*b*), the phase plates 1100(*a*) and 1100(*b*) are disposed in this order.

In the present example, the phase plates 1100(*a*) and 1100(*b*) have a phase difference of ¼ wavelength. However, the phase difference is not limited thereto; for example, it may be ½ wavelength.

The graded index lens array 1105 is located external to the counter substrate 1102(*b*) in the present example. Alternatively, the graded index lens array 1105 can be utilized as the counter substrate 1102(*b*).

Although an active matrix type liquid crystal display panel is used as the display element in the image display device of the present example, there is no limitation to the display device for providing an image for the right eye and an image for the left eye. For example, a simple matrix type liquid crystal display panel, a display device which emits light on its own, e.g., an EL device, a CRT, and a plasma display, or a plasma address liquid crystal display panel can also be used without undermining the effects of the present example.

Although a TN display mode liquid crystal display panel incorporating a TN liquid crystal is employed in the present example, there is no limitation to the display mode of such a liquid crystal display device. For example, one of various liquid crystal display modes can be employed, including: a hybrid electric field effect mode, a polymer-dispersed liquid crystal mode, an electric field induction birefringence mode, a ferroelectric liquid crystal mode, an anti-ferroelectric liquid crystal mode, a phase-transition mode utilizing a smectic liquid crystal having an slectro-clinic effect, dynamic diffusion mode, a guest-host mode, and a liquid crystal complex film. When any non-polarization mode among such modes is used, the polarizing plate 1101(a) can be omitted.

The above-described structure and its variants are similarly applicable to the following examples as well as Example 7.

EXAMPLE 8

Hereinafter, the structure of a liquid crystal display device 1206 according to Example 8 of the invention and a method for producing the same are described with reference to FIG. 20A. FIG. 20A is a crosssectional view showing the image display device 1206. The constituent elements in FIG. 20A which also appear in FIG. 17A to 17C and 19 are indicated by the same reference numerals as used therein, the descriptions thereof being omitted.

The image display device of the present example is similar to that of Example 7 except that polarizing plates 1201(b) and 1201(c) are provided on both sides, rather than on only one side, of a graded index lens array 1105. The polarizing plate 1201(a) has the same polarization axis over the entire surface thereof, as does the polarizing plate 1101(a) of Example 7. The polarizing plates 1201(b) and 1201(c) are disposed so that their polarization axes are perpendicular to the axis of polarization of the polarizing plate 1201(a). In this configuration, too, an image 1208 displayed by a display element such as a liquid crystal display panel is "imaged" by the graded index lens array 1105 into a non-reversed image 1209 bearing the same rate of magnification.

By thus providing the polarizing plates 1201(b) and 1201(c) on both sides (i.e., both the light-entering side and the light-exiting side) of the graded index lens array 1105, it becomes possible to rectify the disturbance in the polarization state of light (i.e., light leakage) due to travelling through the graded index lens array 1105. As a result, the crosstalk due to leakage of light, which is 15% with only one polarizing plate provided on one side of the graded index lens array 1105, can be reduced to 0.1%, thereby improving the display quality of a 3D image.

As described above, the image display device 1206 of the present example includes polarizing plates having the same polarization axis over the entire surfaces thereof provided on both sides of the graded index lens array 1105, As a result, the disturbance in the polarization state of light travelling through the graded index lens array 1105 can be rectified on the light-exiting side of the graded index lens array 1105. As a result, the crosstalk due to leakage of light can be reduced, thereby improving the display quality of a 3D image.

EXAMPLE 9

Figure 21A:
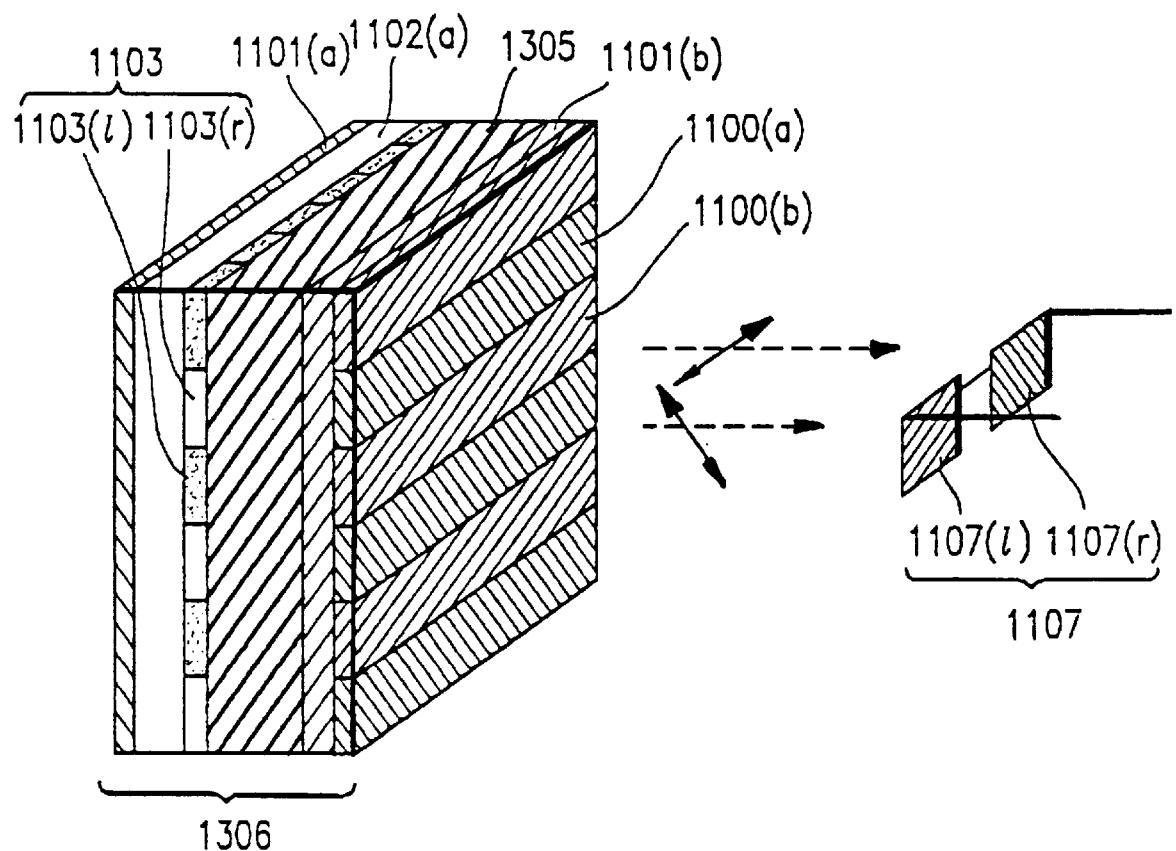
FIG. 21A is a cross-sectional view illustrating an image display device according to Example 9 of the present invention.
Figure 21B:
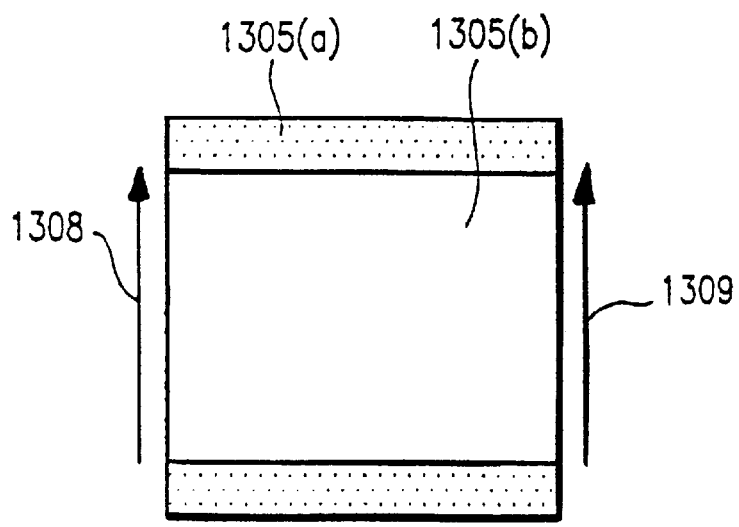
FIG. 21B is a diagram illustrating a fiber plate employed in Example 9 of the present invention.

Hereinafter, the structure of a liquid crystal display device 1306 according to Example 9 of the invention is described with reference to FIGS. 21A and 21B. FIG. 21A is a view showing the image display device 1306. FIG. 21B is a cross-sectional view showing a cross section of a fiber plate array employed in the image display device 1306. The constituent elements in FIGS. 21A and 21B which also appear in FIGS. 17A, 17B, 17C, 19, or 20A, 20B, and 20C are indicated by the same reference numerals as used therein, the descriptions thereof being omitted.

In Examples 7 and 8, a graded index lens array is used in conjunction with a counter substrate so as to attain the same effect as would be attained if the thickness of the counter substrate was zero. In the present example, however, the fiber plate array 1305 is used instead of a graded index lens array and a counter substrate, with a polarizing plate 1101(b) being provided in front of the fiber plate array 1305. The polarizing plate 1101(b) has the same polarization axis over the entire surface thereof. Furthermore, stripes of phase plates 1100(a) and 1100(b) are provided over the entire surface of the polarizing plate 1101(b). Otherwise the image display device 1306 of the present example is similar to the image display device of Example 7, and the description of such identical portions is omitted.

Next, the action of the fiber plate array 1305 is described with reference to FIG. 21B.

The fiber plate array 1305 is an array of optical fibers each including a core layer 1305(b) and a cladding layer 1305(a) surrounding the core layer 1305(b). The refractive index n1 of the core layer 1305 (b) is prescribed to be higher then the refractive index n2 of the cladding layer 1305(a), so that light can be totally reflected inside the core layer 1305(b) due to the difference in refractive index. As a result, an image (light) 1308 presented on the side of the fiber plate array 1305 facing pixels 1103 is transmitted to the other side of the fiber plate array 1305 (facing the viewer) through total reflection, thereby forming an image (light) 1309 which is not reversed and has the same size as that of the image 1308. Thus, by providing a polarizing and phase plates on the light-exiting face, the image (light) 1309 can be displayed as if the fiber plate array 1305 had a zero thickness.

Next, the 3D-viewable zone provided by the image display device of the present example is described with reference to FIG. 22.

Figure 22:
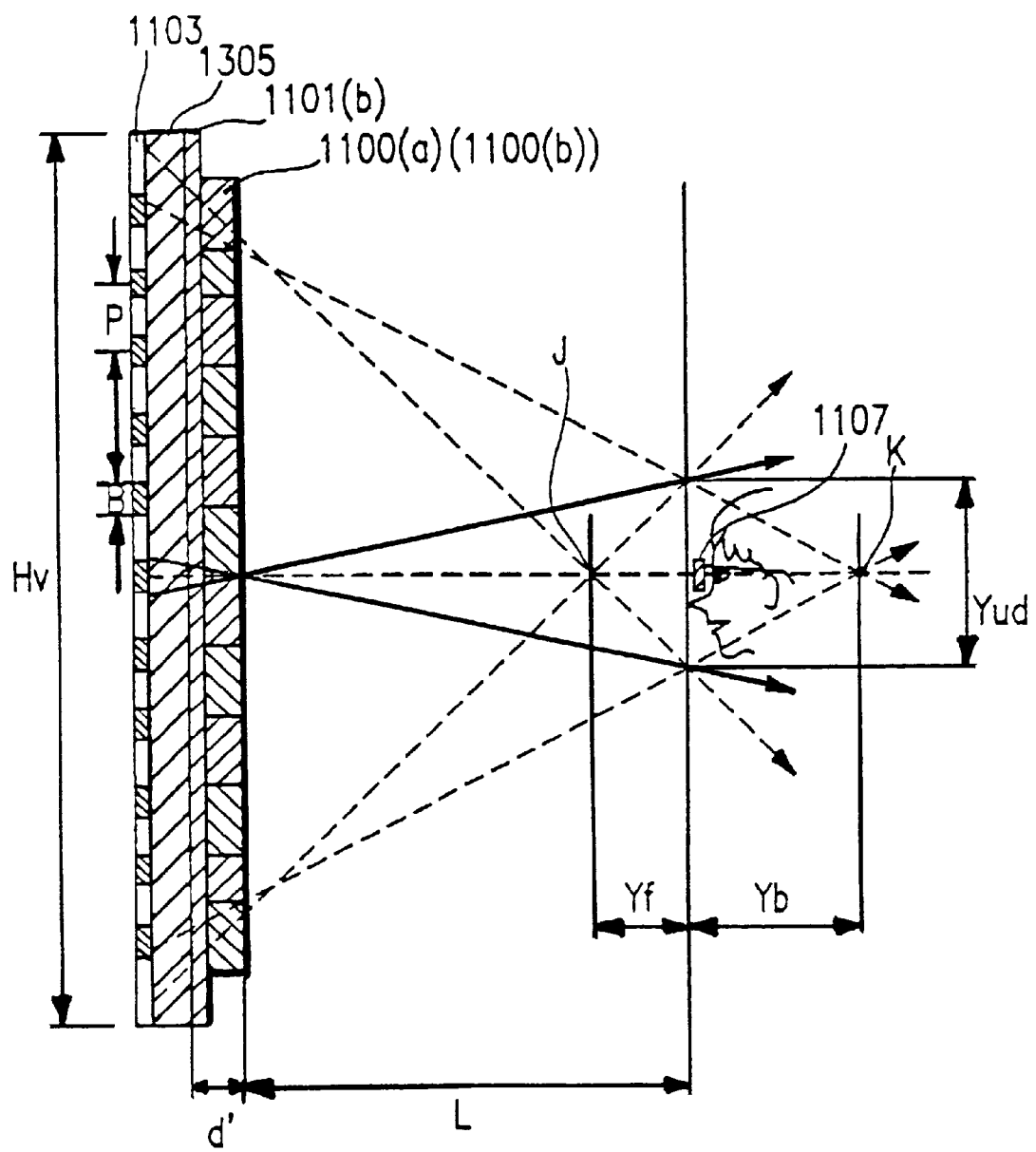
FIG. 22 is a diagram illustrating the 3D-viewable zone according to Example 9 of the invention.
Figure 23:
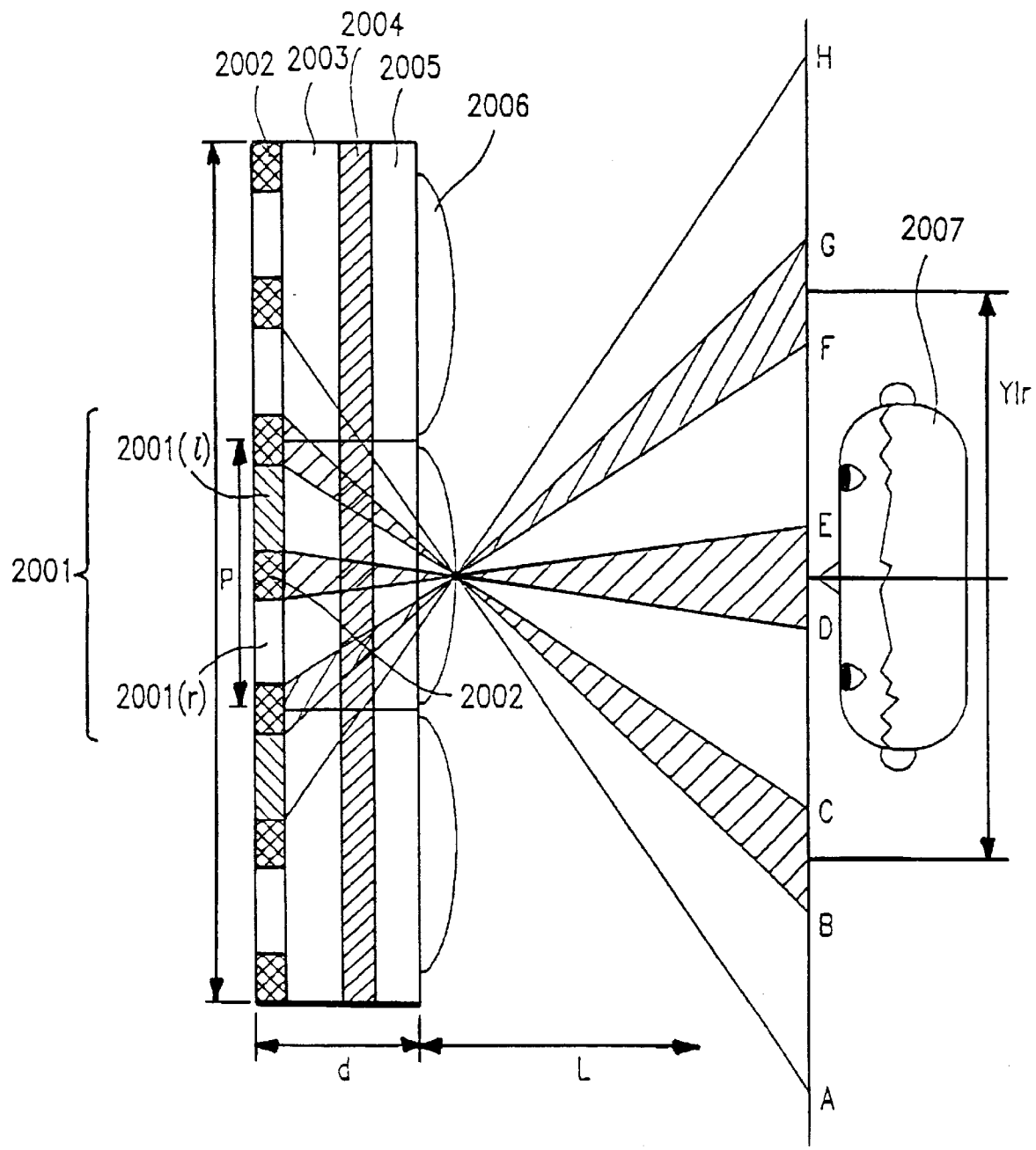
FIG. 23 is a diagram illustrating the horizontal (right-left) dimension of the 3D-viewable zone according to a conventional lenticular system.

In FIG. 22, the image displayed by the pixels 1103 is transmitted via the fiber plate array 1305 to be displayed as the image 1309 (see FIG. 21B) on the polarizing plate 1101(b).

The 3D-viewable zone Yud which allows for the viewer's movement along the vertical direction without losing the proper 3D image can be expressed by the following equation (16):

$$Yud = B \times L / d' \qquad \text{eq. (16)}$$

where P denotes the pitch of the display pixels 1103; B denotes the width of the non-displaying portions (black stripes) between pixels 1103; L denotes the distance between the display device and the viewer; and d' denotes the total thickness of the polarizing plate 1101(b) and the phase plates 1100(a) (or 1100(b)) as adjusted into the thickness for a vacuum.

Regarding the 3D-viewable zone along the front-back direction, the distance Yf along which the viewer 1107 is allowed to move forward from a position defined by the optimum observation distance L without losing the proper 3D image, and Yb denotes the distance along which the viewer 1107 is allowed to move backward from the position defined by the optimum observation distance L without losing the proper 3D image can be expressed by the following equations (17) and (18), respectively:

$$Yf = Yud \times L/(Hv+Yud) \qquad \text{eq. (17)}$$

$$Yb = Yud \times L/(Hv-Yud) \qquad \text{eq. (18)}$$

where Hv denotes the vertical (i.e., along the direction parallel to the signal lines) length of the liquid crystal display panel as the display element.

In eq. (18), Yb takes a negative value when Yud≧Hv, indicating that there is no limit to the backward dimension of the 3D-viewable zone.

The liquid crystal display panel employed in the present example has a diagonal dimension of 4 inches (i.e., with a vertical dimension Hv of 45 mm and a horizontal dimension Hh of 60 mm) and a pixel pitch P of 0.26 mm. The non-displaying portions (black stripes) have a width B of 0.05 mm. The polarizing plate 1101(*b*) and the phase plates 1100(*a*) (or 1100(*b*)) have a total thickness of 0.2 mm and a refractive index n of 1.52. The distance L between the phase plates 1100(*a*) and 1100(*b*) and the viewer is 350 mm. Under such conditions, the vertical dimension Yud of the 3D-viewable zone along which the viewer can move without losing the proper 3D image is derived to be 133 mm, according to eq. (16). The forward dimension Yf of the 3D-viewable zone is derived to be 261 mm, whereas there is no limit to the backward dimension of the 3D-viewable zone.

Figure 28:
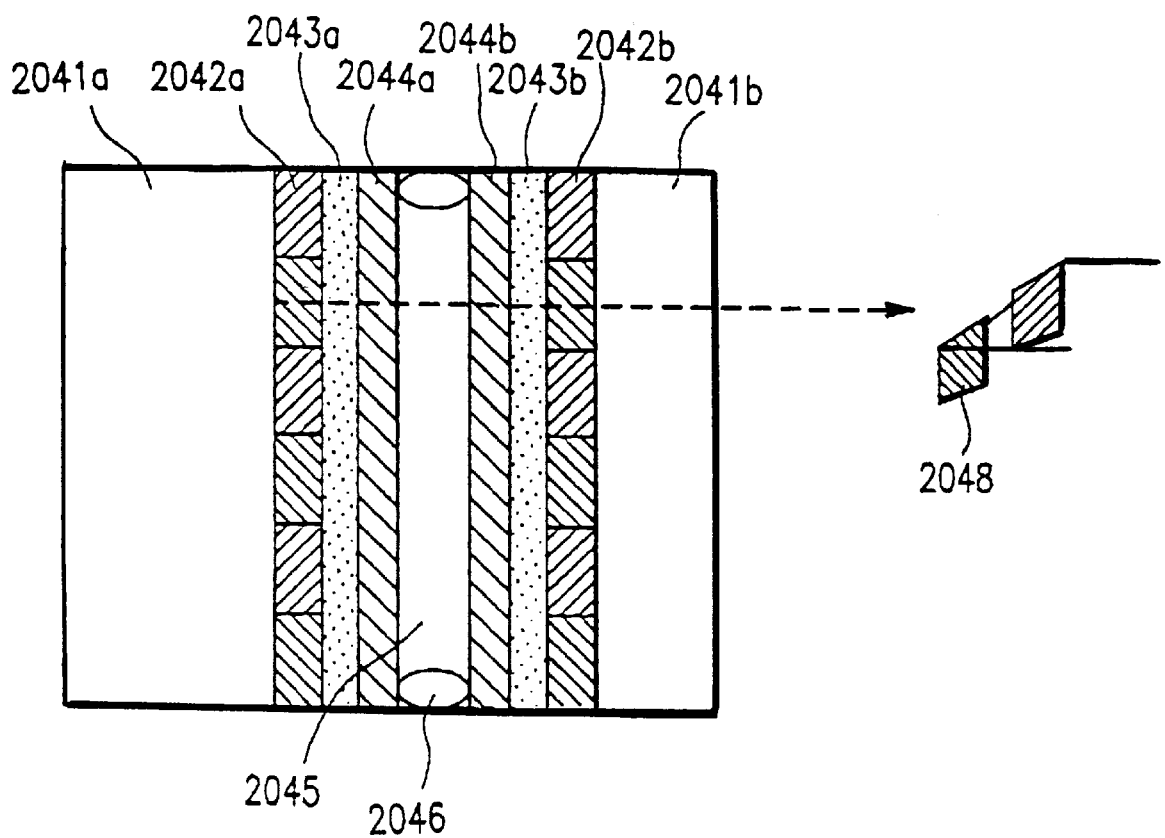
FIG. 28 is a schematic diagram illustrating the configuration of another conventional polarizing glass-type 3D image display device (disclosed in Japanese Laid-Open Publication No.62-135810).
Figure 29:
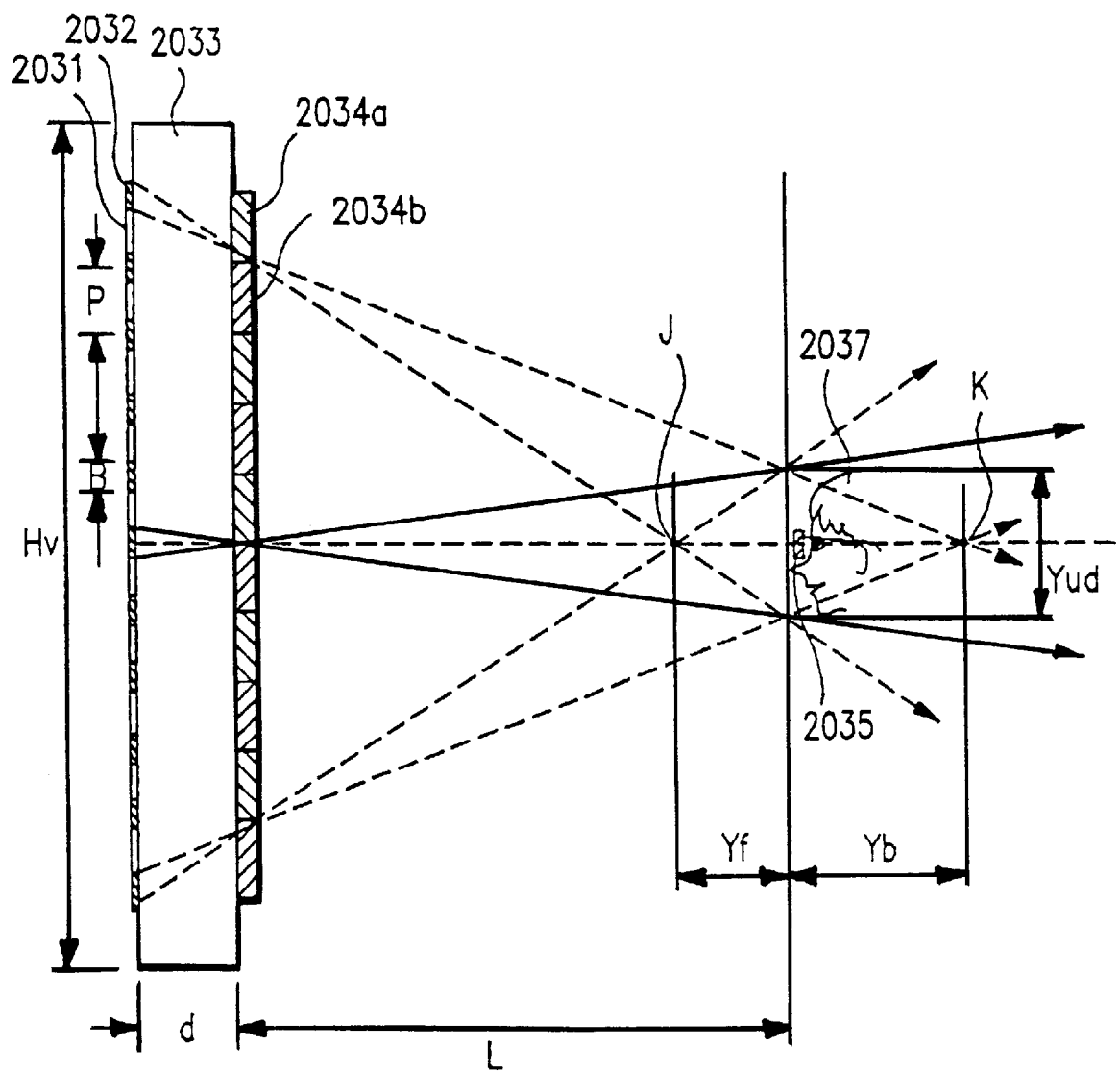
FIG. 29 is a diagram illustrating the 3D-viewable zone provided by the conventional image display device shown in FIG. 27.

In contrast, the 3D-viewable zone of a conventional 3D image display device shown in FIG. 28, constructed with a liquid crystal display panel having the above-mentioned dimensions, has a vertical dimension Yud of 24 mm, a forward dimension Yf of 121 mm, and a backward dimension Yb of 400 mm.

Thus, in accordance with the image display device of the present example, the vertical dimension Yud, the forward dimension Yf, and the backward dimension Yb of the of the 3D-viewable zone can be expanded as compared with those of conventional image display devices.

Moreover, in the present example, the light-exiting end face of the fiber plate array 1305 is chemically or otherwise treated to form a scattering surface. As a result, the viewer can observe a proper image at substantially the same resolution even when viewing the image at an angle exceeding the outgoing angle of the fiber plate array 1305. Thus, the 3D-viewable zone can be further expanded.

As describe above, the image display device 1306 of the present example includes a polarizing plate and phase plates in front of the liquid crystal display panel so as to provide light components that are "perpendicularly polarized" with respect to each other via the pixels for the right eye and the pixels for the left eye, with the fiber plate array 1305 being provided adjacent to one of the polarizing plate. As a result, an image of light exiting each pixel can be transmitted to the front face of the corresponding fiber plate 1305, thereby expanding the 3D-viewable zone.

By chemically or otherwise treating the light-existing end face of the fiber plate array 1305 to form a scattering surface, it becomes possible for the viewer to observe a proper image at substantially the same resolution even when viewing the image at an angle exceeding the outgoing angle of the fiber plate array 1305. Moreover, the phase plates 1100(*a*) and 1100(*b*) can also be chemically or otherwise treated to form scattering surfaces to increase the range of viewing angles, thereby further expanding the 3D-viewable zone.

Moreover, a viewer not wearing polarizing glasses can observe a 2D image at a full resolution inherent to the display device.

Although an active matrix type liquid crystal display panel is used as the display element in the image display device of the present example, there is no limitation to the display device for providing an image for the right eye and an image for the left eye. For example, a simple matrix type liquid crystal display panel, a display device which emits light on its own, e.g., an EL device, a CRT, and a plasma display, or a plasma address liquid crystal display panel can also be used without undermining the effects of the present example.

Although a TN display mode liquid crystal display panel incorporating a TN liquid crystal is employed in the present example, there is no limitation to the display mode of such a liquid crystal display device. For example, one of various liquid crystal display modes can be employed, including: a hybrid electric field effect mode, a polymer-dispersed liquid crystal mode, an electric field induction birefringence mode, a ferroelectric liquid crystal mode, an anti-ferroelectric liquid crystal mode, a phase-transition mode utilizing a smectic liquid crystal having an electro-clinic effect, dynamic diffusion mode, a guest-host mode, and a liquid crystal complex film. When any non-polarization mode among such modes is used, the polarizing plate 1101(*a*) can be omitted.

As described above, in accordance with the image display device of the present invention, the observation range of an image for the right eye and an image for the left eye, which are separated by means of a polarizing plate, is expanded by means of an array of microlenses. As a result, the horizontal and vertical dimensions of the 3D-viewable zone are increased, so that a large number of people wearing polarizing glasses can simultaneously enjoy 3D images.

The array of microlenses also functions to provide a bright 3D image.

Particularly, in one embodiment of the image display device of the present invention, a cylindrical lens is provided for every scanning line, thereby corresponding to a row of pixels along the direction parallel to the scanning lines. Therefore, within the 3D-viewable zone, no non-displaying portions are observed so that it is impossible for only one eye of the viewer to be situated in a non-displaying portion. As a result, the 3D-viewable zone is further expanded, whereby a high-quality 3D image can be provided.

Moreover, since a group of pixels for the right eye and a group of pixels for the left eye alternately correspond to every scanning line, a viewer can observe a 2D image at a full resolution inherent to the display device when the 2D image is displayed.

Since a group of pixels for the right eye and a group of pixels for the left eye alternately correspond to every scanning line, it is possible to supply an image signal for the right eye and an image signal for the left eye to the signal lines, the image signals being alternately switched at every horizontal (1H) period. As a result, the driving circuitry can be simplified.

In another embodiment of the invention, a cylindrical lens is provided for every signal line, thereby corresponding to a column of pixels along the direction parallel to the signal lines. Therefore, within the 3D-viewable zone, no non-displaying portions are observed so that it is impossible for only one eye of the viewer to be situated in a non-displaying portion. As a result, the 3D-viewable zone is further expanded, whereby a high-quality 3D image can be provided.

In still another embodiment of the invention, the observation range of an image for the right eye and an image for the left eye, which are separated by means of a polarizing plate, is expanded by means of an angular restriction means for the outgoing light. As a result, the horizontal (right-left)

and the vertical (up-down) dimensions of the 3D-viewable zone can be increased, so that a large number of people wearing polarizing glasses can simultaneously enjoy 3D images.

By using a light shielding plate as the angular restriction means for the outgoing light, it becomes possible to apply such means to a display panel with a complicated arrangement of pixels, whereby the production cost of the image display device can be reduced.

By using an angular restriction means for the outgoing light, it becomes possible to eliminate the sub-lobes, thereby providing a high-quality 3D image.

Particularly, in still another embodiment of the invention, a light shielding layer is provided for every scanning line, thereby corresponding to a row of pixels along the direction parallel to the scanning lines. Therefore, within the 3D-viewable zone, no non-displaying portions are observed so that it is impossible for only one eye of the viewer to be situated in a non-displaying portion. As a result, the 3D-viewable zone is further expanded, whereby a high-quality 3D image can be provided.

Moreover, since a group of pixels for the right eye and a group of pixels for the left eye alternately correspond to every scanning line, a viewer can observe a 2D image at a full resolution inherent to the display device when the 2D image is displayed.

Since a group of pixels for the right eye and a group of pixels for the left eye alternately correspond to every scanning line, it is possible to supply an image signal for the right eye and an image signal for the left eye to the signal lines, the image signals being alternately switched at every horizontal (1H) period. As a result, the driving circuitry can be simplified.

In still another embodiment of the invention, a light shielding layer is provided for every signal line, thereby corresponding to a column of pixels along the direction parallel to the signal lines. Therefore, within the 3D-viewable zone, no non-displaying portions (black stripes) are observed so that it is impossible for only one eye of the viewer to be situated in a non-displaying portion. As a result, the 3D-viewable zone is further expanded, whereby a high-quality 3D image can be provided.

In still another embodiment of the invention, a field lens is further provided. As a result, even in the case where the pitch of the respective lens elements of the microlens array or the respective openings of a light shielding plate is prescribed equal to the pitch of the pixels of the display panel, the generation of moire stripes due to the parallax between the pixel pitch and the lens pitch or the opening pitch is prevented. By varying the focal length of the side of the field lens that is closer to the viewer, the optimum observation distance from the display device to the viewer for observing a 3D image can be easily adjusted.

Alternatively, the image display device of the present invention prevents the generation of moire stripes due to the parallax between the pixel pitch and the particular optical element employed, by prescribing the pitch P1 of the micro lenses or the light shielding layers at a value expressed by $P1=P \times L/(L+d)$, where P denotes the pixel pitch of the display panel; L denotes the distance between the plane bearing the microlenses or the light shielding layers and the viewer; and d denotes the distance between the plane bearing the pixels of the display device and the plane bearing the micro lenses or the light shielding layers which is the distance adjusted for a vacuum from the actual distance in air.

As described above, an image display device according to the present invention includes: a matrix type display element including a plurality of pixels arrayed in a two-dimensional matrix and grouped into pixels for the right eye and pixels for the left eye as well as a means for separately supplying a driving signal for the groups of pixels for the right eye and the groups of pixels for the left eye; a first optical means provided in front of the matrix type display element, the first optical means converging light from the pixels arrayed in the matrix into a non-reversed image bearing the same rate of magnification; and a second optical means provided in the vicinity of the non-reversed image of the pixels bearing the same rate of magnification such that the light exiting the groups of pixels for the right eye and the light exiting the groups of pixels for the left eye take different polarization states. As a result, an image of light exiting the pixels of the matrix type display element is transmitted through the first optical element to be converged into a non-reversed image of the pixels bearing the same rate of magnification on the side of the display device facing the viewer, i.e., the second optical means. Thus, the crosstalk inherent to the viewing of a 3D image is substantially eliminated, thereby expanding the 3D-viewable zone.

In particular, an array of graded index lenses can be employed as the first optical means, thereby eliminating the need to ensure a one-to-one correspondence between the pixels and the elements of the lens array. As a result, the construction of the image display device can be simplified.

By providing at least one polarizing plate in front of and/or behind the first optical means, the polarizing plate(s) having the same axis of polarization over the entire surface thereof, it becomes possible to rectify the disturbance in the direction of polarization of the image of light (i.e., light leakage) travelling through the first optical means. As a result, crosstalk can be further reduced, thereby further improving the quality of the displayed 3D image By employing a phase difference layer having a pattern of phase difference corresponding to the arrangement of the pixels for the right eye and the pixels for the left eye, it becomes possible to produce light components that are "perpendicularly polarized" with respect to each other via the pixels for the right eye and the pixels for the left eye. Therefore, the horizontal resolution of the display device is not reduced. By configuring the display device so that each row of pixels arrayed in a direction parallel to the scanning lines (i.e., the horizontal direction of-the display screen) defines a group of pixels for the right eye or a group of pixels for the left eye, the driving circuitry can be simplified.

Furthermore, the second optical means can be chemically or otherwise treated to form a scattering surface to increase the range of viewing angles, thereby further expanding the 3D-viewable zone.

Alternatively, another image display device according to the present invention includes: a matrix type display element including a plurality of pixels arrayed in a two-dimensional matrix and grouped into pixels for the right eye and pixels for the left eye as well as a means for separately supplying a driving signal for the groups of pixels for the right eye and the groups of pixels for the left eye; a fiber plate provided on the light-exiting side of the matrix type display element; and a second optical means provided in the vicinity of the light-exiting end face of the fiber plate such that the light exiting the groups of pixels for the right eye and the light exiting the groups of pixels for the left eye take different polarization states. As a result, an image of light exiting the pixels of the matrix type display element can be transmitted through optical fibers to the side of the display device facing the viewer without decreasing its resolution. Thus, the crosstalk inherent to the viewing of a 3D image is substantially eliminated, thereby expanding the horizontal (right-left) and/or vertical (up-down) dimensions of the 3D-viewable zone.

In particular, by employing a phase difference layer having a pattern of phase difference corresponding to the arrangement of the pixels for the right eye and the pixels for the left eye as the second optical means, it becomes possible to produce light components that are "perpendicularly polarized" with respect to each other via the pixels for the right eye and the pixels for the left eye. Therefore, the horizontal resolution of the display device is not reduced. By configuring the display device so that each row of pixels arrayed in a direction parallel to the scanning lines (i.e., the horizontal direction of the display screen) defines a group of pixels for the right eye or a group of pixels for the left eye, the driving circuitry can be simplified.

Furthermore, the second optical means can be chemically or otherwise treated to form a scattering surface to increase the range of viewing angles, thereby further expanding the 3D-viewable zone.

Moreover, the light-exiting end face of the fiber plate can be chemically or otherwise treated to form a scattering surface to increase the range of viewing angles, thereby further expanding the 3D-viewable zone.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image display device comprising:
   a display element having a plurality of pixels arranged in columns and rows, the pixels being grouped into a plurality of right eye pixel groups and a plurality of left eye pixel groups, each of the right eye pixel groups and the left eye pixel groups including at least one pixel;
   a driver which supplies driving signals to the right eye pixel groups and the left eye pixel groups independently;
   an optical member for making a polarization state of light exiting from the right eye pixel groups different from a polarization state of light exiting from the left eye pixel groups; and
   an array of microlenses which is disposed in the vicinity of the optical member,
   wherein each of the microlenses collimates light exiting from a corresponding one group of the right eye pixel groups and the left eye pixel groups,
   wherein the array of microlenses has a pitch P1 satisfying the following relationship:

$$P1=P\times L/(L+d)$$

where d represents a distance, as adjusted for a vacuum, between a plane on which the pixels of the display element are disposed and a plane on which the array of microlenses is disposed; L represents a distance between the plane on which the array of microlenses is disposed and a viewer; and P represents a pitch of the pixels of the display element.

2. An image display device according to claim 1, wherein each group of the right eye pixel groups and the left eye pixel groups comprises one column of pixels, and the right eye pixel groups and the left eye pixel groups are disposed alternately in a row direction which is parallel to the rows of pixels, and
   wherein the array of microlenses is a lenticular lens plate having a plurality of cylindrical lenses which extend along the columns of pixels and are arranged in the row direction so that the cylindrical lenses are aligned with the columns of pixels, respectively.

3. An image display device according to claim 1, wherein each group of the right eye pixel groups and the left eye pixel groups comprises one row of pixels, and the right eye pixel groups and the left eye pixel groups are disposed alternately in a column direction which is parallel to the columns of pixels, and
   wherein the array of microlenses is a lenticular lens plate having a plurality of cylindrical lenses which extend along the rows of pixels and are arranged in the column direction so that the cylindrical lenses are aligned with the columns of pixels, respectively.

4. An image display device according to claim 1, wherein a focal length of the array of microlenses is larger than a distance between the display element and the array of microlenses.

5. An image display device according to claim 1, further comprising a field lens for converging a light ray parallel to an optical axis of light exiting from the display element.

6. An image display device according to claim 1, wherein the optical member comprises:
   a first phase plate for providing light exiting from the right eye pixel groups with a first polarization state;
   a second phase plate for providing light exiting form the left eye pixel groups with a second polarization state which is different from the first polarization state; and
   a polarizing plate disposed in the vicinity of the first phase plate and the second phase plate.

7. An image display device comprising:
   a display element having a plurality of pixels arranged in columns and rows, the pixels being grouped into a plurality of right eye pixel groups and a plurality of left eye pixel groups, each of the right eye pixel groups and the left eye pixel groups including at least one pixel;
   a driver which supplied driving signals to the right eye pixel groups and left eye pixel groups independently;
   an optical member for making a polarization state of light exiting from the right eye pixel groups different from a polarization state of light exiting from the left eye pixel groups; and
   an angular restriction means for limiting an outgoing angle of each group of the right eye pixel groups and the left eye pixel groups,
   wherein each group of the right eye pixel groups and the left eye pixel groups comprises one column of pixels, and the right eye pixel groups and the left eye pixel groups are disposed alternately in a row direction which is parallel to the rows of pixels;
   wherein the angular restriction means is a light shielding plate having a plurality of light shielding layers which extend along the columns of pixels and are arranged in the row direction so that the light shielding layers are aligned with the columns of pixels, respectively, and
   wherein the light shielding plate has a pitch P1 of the light shielding layers satisfying the following relationship:

$$P1=P\times L/(L+d)$$

where d represents a distance, as adjusted for a vacuum, between a plane on which the pixels of the display element are disposed and a plane on which the light shielding plate is disposed; L represents a distance between the plane on which the light shielding plate is disposed and a viewer; and P represents a pitch of the pixels of the display element.

8. An image display device comprising:

a display element having a plurality of pixels arranged in columns and rows, the pixels being grouped into a plurality of right eye pixel groups and a plurality of left eye pixel groups, each of the right eye pixel groups and the left eye pixel groups including at least one pixel;

a driver which supplied driving signals to the right eye pixel groups and left eye pixel groups independently;

an optical member for making a polarization state of light exiting from the right eye pixel groups different from a polarization state of light exiting from the left eye pixel groups; and an angular restriction means for limiting an outgoing angle of each group of the right eye pixel groups and the left eye pixel groups, wherein each group of the right eye pixel groups and the left eye pixel groups comprises one row of pixels, and the right eye pixel groups and the left eye pixel groups are disposed alternately in a column direction which is parallel to the columns of pixels, wherein the angular restriction means is a light shielding plate having a plurality of light shielding layers which extend along the rows of pixels and are arranged in the column direction so that the light shielding layers are aligned with the rows of pixels, respectively, and wherein the light shielding plate has a pitch P1 of the light shielding layers satisfying the following relationship:

$$P1 = P \times L / (L+d)$$

where d represents a distance, as adjusted for a vacuum, between a plane on which the pixels of the display element are disposed and a plane on which the light shielding plate is disposed; L represents a distance between the plane on which the light shielding plate is disposed and a viewer; and P represents a pitch of the pixels of the display element.

9. An image display device comprising:

a display element having a plurality of pixels arranged in columns and rows, the pixels being grouped into a plurality of right eye pixel groups and a plurality of left eye pixel groups, each of the right eye pixel groups and the left eye pixel groups including at least one pixel;

a driver which supplied driving signals to the right eye pixel groups and left eye pixel groups independently;

an optical member for making a polarization state of light exiting from the right eye pixel groups different from a polarization state of light exiting from the left eye pixel groups; and an angular restriction means for limiting an outgoing angle of each group of the right eye pixel groups and the left eye pixel groups, wherein each group of the right eye pixel groups and the left eye pixel groups comprises one column of pixels, and the right eye pixel groups and the left eye pixel groups are disposed alternately in a row direction which is parallel to the rows of pixels, wherein the angular restriction means is a slitted plate having a plurality of openings which extend along the columns of pixels and are arranged in the row direction so that the openings are aligned with the columns of pixels, respectively, and wherein the slitted plate has a pitch P1 of the openings satisfying the following relationship:

$$P1 = P \times L / (L+d)$$

where d represents a distance, as adjusted for a vacuum, between a plane on which the pixels of the display element are disposed and a plane on which the slitted plate is disposed; L represents a distance between the plane on which the slitted plate is disposed and a viewer; and P represents a pitch of the pixels of the display element.

10. An image display device comprising:

a display element having a plurality of pixels arranged in columns and rows, the pixels being grouped into a plurality of right eye pixel groups and a plurality of left eye pixel groups, each of the right eye pixel groups and the left eye pixel groups including at least one pixel;

a driver which supplied driving signals to the right eye pixel groups and left eye pixel groups independently;

an optical member for making a polarization state of light exiting from the right eye pixel groups different from a polarization state of light exiting from the left eye pixel groups; and an angular restriction means for limiting an outgoing angle of each group of the right eye pixel groups and the left eye pixel groups, wherein each group of the right eye pixel groups and the left eye pixel groups comprises one row of pixels, and the right eye pixel groups comprises one row of pixels, and the right eye pixel groups and the left eye pixel groups are disposed alternately in a column direction which is parallel to the columns of pixels, wherein the angular restriction means is a slitted plate having a plurality of openings which extend along the rows of pixels and are arranged in the column direction so that the openings are aligned with the rows of pixels, respectively, and wherein the slitted plate has a pitch P1 of the openings satisfying the following relationship:

$$P1 = P \times L / (L+d)$$

where d represents a distance, as adjusted for a vacuum, between a plane on which the pixels of the display element are disposed and a plane on which the slitted plate is disposed; L represents a distance between the plane on which the slitted plate is disposed and a viewer; and P represents a pitch of the pixels of the display element.

11. An image display device according to any one of claims 7–10, further comprising a field lens for converging a light ray parallel to an optical axis of light exiting from the display element.

12. An image display device according to any one of claims 7–10, wherein the optical member comprises:

a first phase plate for providing light exiting from the right eye pixel groups with a first polarization state;

a second phase plate for providing light exiting form the left eye pixel groups with a second polarization state which is different from the first polarization state; and a polarizing plate disposed in the vicinity of the first phase plate and the second phase plate.

13. An image display device comprising:

a display element having a plurality of pixels arranged in columns and rows, the pixels being grouped into a plurality of right eye pixel groups and a plurality of left eye pixel groups, each of the right eye pixel groups and the left eye pixel groups including at least one pixel;

a driver which supplies driving signals to the right eye pixel groups and left eye pixel groups independently;

a first optical member for forming a non-reversed image of a displayed image displayed by each of the pixels, the non-reversed image having the same size as that of the displayed image; and a second optical member for making a polarization state of light exiting from the right eye pixel groups different from a polarization state of light exiting from the left eye pixel groups, wherein the second optical member is disposed in the vicinity of a region where the non-reversed image is formed by the first optical member.

14. An image display device according to claim 13, wherein the first optical member is an array of graded index lenses.

15. An image display device according to claim 14, wherein the array of graded index lenses is a fiber plate array.

16. An image display device according to claim 13, further comprising at least one polarizing plate having a polarization axis which is the same over the entire surface of the polarizing plate, the polarizing plate being disposed in the vicinity of the first optical member.

17. An image display device according to claim 13, wherein the second optical member comprises a patterned phase plate including first phase regions and second phase regions which correspond to the right eye pixel groups and the left eye pixel groups, respectively, thereby the light exiting from the right eye pixel groups and the light exiting from the left eye pixel groups have polarizations perpendicular to each other.

18. An image display device according to claim 13, wherein the second optical member has a scattering surface.

19. An image display device according to claim 13, wherein the first optical member is a fiber plate disposed on a light exiting side of the display element, and the second optical member is disposed in the vicinity of a light exiting surface of the fiber plate.

20. An image display device according to claim 19, wherein the light exiting surface of the fiber plate is a scattering surface.

\* \* \* \* \*